ившвin US011211174B2

(12) United States Patent
Bashkirtsev et al.

(10) Patent No.: US 11,211,174 B2
(45) Date of Patent: Dec. 28, 2021

(54) FUEL ASSEMBLY

(71) Applicant: Thorium Power, Inc., McLean, VA (US)

(72) Inventors: Sergey Mikhailovich Bashkirtsev, Moscow (RU); Alexey Glebovich Morozov, Moscow (RU); Aaron Totemeier, Washington, DC (US)

(73) Assignee: THORIUM POWER, INC., McLean, VA (US)

( * ) Notice: Subject to any disclaimer, the term of this patent is extended or adjusted under 35 U.S.C. 154(b) by 357 days.

(21) Appl. No.: 16/235,063

(22) Filed: Dec. 28, 2018

(65) Prior Publication Data

US 2019/0139653 A1 May 9, 2019

Related U.S. Application Data

(62) Division of application No. 14/081,056, filed on Nov. 15, 2013, now Pat. No. 10,170,207.
(Continued)

(51) Int. Cl.
*G21C 3/06* (2006.01)
*G21C 3/34* (2006.01)
*G21C 3/08* (2006.01)
*G21C 3/328* (2006.01)
*G21C 3/28* (2006.01)
(Continued)

(52) U.S. Cl.
CPC ............... *G21C 3/06* (2013.01); *G21C 3/08* (2013.01); *G21C 3/328* (2013.01); *G21C 3/34* (2013.01); *G21C 3/28* (2013.01); *G21C 3/322* (2013.01); *G21C 3/326* (2013.01); *G21C 3/58* (2013.01); *G21C 21/10* (2013.01); *Y02E 30/30* (2013.01)

(58) Field of Classification Search
CPC . G21C 3/06; G21C 3/08; G21C 3/328; G21C 3/34; G21C 3/322; G21C 3/326; G21C 3/28; G21C 3/58
USPC .................................................. 376/435, 454
See application file for complete search history.

(56) References Cited

U.S. PATENT DOCUMENTS

| 2,780,517 A | 2/1957 | Fontana |
| 2,879,216 A | 3/1959 | Horwitz |

(Continued)

FOREIGN PATENT DOCUMENTS

| CN | 86108810 A | 8/1987 |
| CN | 1192820 A | 9/1998 |

(Continued)

OTHER PUBLICATIONS

Bol'sakov et al., "Experimental study of burnout in channels with twisted Fuel rods," Thermal Engineering, vol. 54, No. 5, 2007, pp. 386-389 [Cited in Parent].
(Continued)

*Primary Examiner* — Jack W Keith
*Assistant Examiner* — Daniel Wasil
(74) *Attorney, Agent, or Firm* — Squire Patton Boggs US LLP

(57) ABSTRACT

Nuclear fuel assemblies include non-symmetrical fuel elements with reduced lateral dimensions on their outer lateral sides that facilitate fitting the fuel assembly into the pre-defined envelope size and guide tube position and pattern of a conventional nuclear reactor. Nuclear fuel assemblies alternatively comprise a mixed grid pattern that positions generally similar fuel elements in a compact arrangement that facilitates fitting of the assembly into the conventional nuclear reactor.

10 Claims, 31 Drawing Sheets

Related U.S. Application Data

(60) Provisional application No. 61/821,918, filed on May 10, 2013.

(51) Int. Cl.

| | |
|---|---|
| G21C 3/322 | (2006.01) |
| G21C 3/326 | (2006.01) |
| G21C 3/58 | (2006.01) |
| G21C 21/10 | (2006.01) |

(56) References Cited

U.S. PATENT DOCUMENTS

| | | |
|---|---|---|
| 2,887,357 A | 5/1959 | Seaberg |
| 2,894,827 A | 7/1959 | Hyde |
| 2,898,185 A | 8/1959 | Boyd |
| 2,977,297 A | 3/1961 | Evans |
| 2,987,458 A | 6/1961 | Breden |
| 3,030,291 A | 4/1962 | Butter et al. |
| 3,034,975 A | 5/1962 | Beurtheret |
| 3,046,088 A | 7/1962 | Horn |
| 3,063,925 A | 11/1962 | Huet |
| 3,070,527 A | 12/1962 | Hurford et al. |
| 3,088,900 A | 5/1963 | Brown |
| 3,096,264 A | 7/1963 | Bauer |
| 3,105,035 A | 9/1963 | Weems |
| 3,133,867 A | 5/1964 | Frisch |
| 3,154,471 A | 10/1964 | Radkowsky |
| 3,177,123 A | 4/1965 | Huet |
| 3,197,376 A | 7/1965 | Balent et al. |
| 3,197,383 A | 7/1965 | Maillet |
| 3,208,912 A | 9/1965 | Jaye et al. |
| 3,219,535 A | 11/1965 | Robbins |
| 3,252,867 A | 5/1966 | Conley |
| 3,275,564 A | 9/1966 | Pascard |
| 3,282,335 A | 11/1966 | De Haller |
| 3,285,825 A | 11/1966 | Jens |
| 3,297,544 A | 1/1967 | Hooper |
| 3,308,031 A | 3/1967 | Pon |
| 3,308,033 A | 3/1967 | Alfille |
| 3,309,277 A | 3/1967 | Jaye |
| 3,322,644 A | 5/1967 | Benson |
| 3,335,060 A | 8/1967 | Diener |
| 3,339,631 A | 9/1967 | McGurty |
| 3,361,640 A | 1/1968 | Hassig et al. |
| 3,366,547 A | 1/1968 | Gumuchian |
| 3,378,453 A | 4/1968 | Gorker |
| 3,394,049 A | 7/1968 | Jones |
| 3,486,973 A | 12/1969 | Georges |
| 3,546,068 A | 12/1970 | Schluderberg |
| 3,567,582 A | 3/1971 | Van Dievoet |
| 3,577,225 A | 5/1971 | Shaffer |
| 3,637,931 A | 1/1972 | Donjon et al. |
| 3,640,844 A | 2/1972 | Shank et al. |
| 3,660,227 A | 5/1972 | Ackroyd et al. |
| 3,660,228 A | 5/1972 | Magladry |
| 3,671,392 A | 6/1972 | Beaudoin |
| 3,687,805 A | 8/1972 | Desbois |
| 3,714,322 A | 1/1973 | Bell et al. |
| 3,736,227 A | 5/1973 | Nakazato |
| 3,801,734 A | 4/1974 | West |
| 3,814,667 A | 6/1974 | Klumb |
| 3,847,736 A | 11/1974 | Bevilacqua |
| 3,853,703 A | 12/1974 | Anthony et al. |
| 3,859,165 A | 1/1975 | Radkowsky et al. |
| 3,956,147 A | 5/1976 | Becker et al. |
| 3,957,575 A | 5/1976 | Fauth, Jr. et al. |
| T947,011 I4 | 6/1976 | Radkowsky |
| 3,960,655 A | 6/1976 | Bohanan et al. |
| 3,971,575 A | 7/1976 | Lesham et al. |
| 3,998,692 A | 12/1976 | Bohanan et al. |
| 4,020,131 A | 4/1977 | Feraday |
| 4,029,740 A | 6/1977 | Ervin, Jr. |
| 4,059,539 A | 11/1977 | Potter et al. |
| 4,072,564 A | 2/1978 | Jabsen |
| 4,077,835 A | 3/1978 | Bishop et al. |
| 4,078,967 A | 3/1978 | Anthony |
| 4,111,348 A | 9/1978 | Laird et al. |
| 4,119,563 A | 10/1978 | Kadner et al. |
| 4,192,716 A | 3/1980 | Anthony |
| 4,193,953 A | 3/1980 | Langen et al. |
| 4,194,948 A | 3/1980 | Ledin |
| 4,202,793 A | 5/1980 | Bezzi et al. |
| 4,235,669 A | 11/1980 | Burgess et al. |
| 4,236,966 A | 12/1980 | Savin et al. |
| 4,268,357 A | 5/1981 | Formanek et al. |
| 4,273,613 A | 6/1981 | Radkowsky |
| 4,278,501 A | 7/1981 | Steinke |
| 4,285,771 A | 8/1981 | Downs |
| 4,292,278 A | 9/1981 | Elikan et al. |
| 4,298,434 A | 11/1981 | Anthony et al. |
| 4,304,631 A | 12/1981 | Walton et al. |
| 4,309,251 A | 1/1982 | Anthony et al. |
| 4,320,093 A | 3/1982 | Volesky et al. |
| 4,324,618 A | 4/1982 | Schluderberg |
| 4,344,912 A | 8/1982 | Rampolla |
| 4,381,284 A | 4/1983 | Gjertsen |
| 4,393,510 A | 7/1983 | Lang et al. |
| RE31,583 E | 5/1984 | Klumb et al. |
| 4,450,016 A | 5/1984 | Vesterlund et al. |
| 4,450,020 A | 5/1984 | Vesterlund |
| 4,474,398 A | 10/1984 | Tolino et al. |
| 4,495,136 A | 1/1985 | Camden, Jr. et al. |
| 4,499,047 A | 2/1985 | Borrman et al. |
| 4,507,259 A | 3/1985 | Cowell et al. |
| 4,508,679 A | 4/1985 | Matzner et al. |
| 4,540,545 A | 9/1985 | Kondo |
| 4,544,522 A | 10/1985 | Curulla et al. |
| 4,551,300 A | 11/1985 | Feutrel |
| 4,560,532 A | 12/1985 | Barry et al. |
| 4,572,816 A | 2/1986 | Gjertsen et al. |
| 4,578,240 A | 3/1986 | Cadwell |
| 4,579,711 A | 4/1986 | Mishima et al. |
| 4,584,167 A | 4/1986 | Carelli |
| 4,587,078 A | 5/1986 | Azekura et al. |
| 4,589,929 A | 5/1986 | Steinberg |
| 4,615,862 A | 10/1986 | Huckestein |
| 4,645,642 A | 2/1987 | Leclercq et al. |
| 4,652,425 A | 3/1987 | Ferrari et al. |
| 4,659,538 A | 4/1987 | Leclercq |
| 4,664,880 A | 5/1987 | Bryan |
| 4,666,664 A | 5/1987 | Doshi |
| 4,670,213 A | 6/1987 | Wilson et al. |
| 4,671,924 A | 6/1987 | Gjertsen et al. |
| 4,671,927 A | 6/1987 | Alsop |
| 4,678,619 A | 7/1987 | Radkowsky |
| 4,678,627 A | 7/1987 | Rylatt |
| 4,678,632 A | 7/1987 | Ferrari |
| 4,680,443 A | 7/1987 | Vere et al. |
| 4,684,495 A | 8/1987 | Wilson et al. |
| 4,684,503 A | 8/1987 | Shallenberger |
| 4,692,304 A | 9/1987 | Gjertsen |
| 4,699,758 A | 10/1987 | Shallenberger et al. |
| 4,699,761 A | 10/1987 | Gjertsen et al. |
| 4,702,883 A | 10/1987 | Wilson et al. |
| 4,716,015 A | 12/1987 | Carlson |
| 4,746,488 A | 5/1988 | Pradal et al. |
| 4,749,519 A | 6/1988 | Koehly et al. |
| 4,749,544 A | 6/1988 | Crowther et al. |
| 4,762,676 A | 8/1988 | Gjertsen et al. |
| 4,765,909 A | 8/1988 | Rourke et al. |
| 4,818,474 A | 4/1989 | Malhouitre et al. |
| 4,820,473 A | 4/1989 | Ohashi et al. |
| 4,828,792 A | 5/1989 | Leclercq et al. |
| 4,832,905 A | 5/1989 | Bryan et al. |
| 4,842,814 A | 6/1989 | Takase et al. |
| 4,859,400 A | 8/1989 | Curzon |
| 4,879,086 A | 11/1989 | Luce et al. |
| 4,880,607 A | 11/1989 | Horton et al. |
| 4,900,507 A | 2/1990 | Shallenberger et al. |
| 4,918,710 A | 4/1990 | Bard |
| 4,938,921 A | 7/1990 | Mardon et al. |
| 4,942,016 A | 7/1990 | Marlowe et al. |
| 4,954,293 A | 9/1990 | Cailly et al. |

(56) References Cited

U.S. PATENT DOCUMENTS

| | | |
|---|---|---|
| 4,957,695 A | 9/1990 | Rudolph |
| 4,968,476 A | 11/1990 | Radkowsky |
| 4,986,957 A | 1/1991 | Taylor |
| 4,986,960 A | 1/1991 | Larson |
| 4,997,596 A | 3/1991 | Proebstle et al. |
| 5,002,726 A | 3/1991 | Johansson |
| 5,009,837 A | 4/1991 | Nguyen et al. |
| 5,009,839 A | 4/1991 | King |
| 5,019,327 A | 5/1991 | Fanning et al. |
| 5,019,333 A | 5/1991 | Isobe et al. |
| 5,024,426 A | 6/1991 | Busch et al. |
| 5,024,807 A | 6/1991 | Hatfield et al. |
| 5,024,809 A | 6/1991 | Taylor |
| 5,024,810 A | 6/1991 | Bachman |
| 5,026,516 A | 6/1991 | Taylor |
| 5,030,412 A | 7/1991 | Yates et al. |
| 5,032,351 A | 7/1991 | Johansson |
| 5,035,869 A | 7/1991 | Furuya |
| 5,037,605 A | 8/1991 | Riordan, III |
| 5,053,191 A | 10/1991 | Bryan et al. |
| 5,069,864 A | 12/1991 | Johansson |
| 5,073,336 A | 12/1991 | Taylor |
| 5,085,827 A | 2/1992 | Johansson et al. |
| 5,089,210 A | 2/1992 | Reese et al. |
| 5,089,220 A | 2/1992 | Nylund |
| 5,089,221 A | 2/1992 | Johansson et al. |
| 5,091,145 A | 2/1992 | Petit |
| 5,093,075 A | 3/1992 | Chevereau et al. |
| 5,094,802 A | 3/1992 | Riordan, III |
| 5,110,539 A | 5/1992 | Perrotti et al. |
| 5,112,571 A | 5/1992 | Orii et al. |
| 5,128,097 A | 7/1992 | Fukasawa et al. |
| 5,135,710 A | 8/1992 | Grattier et al. |
| 5,135,728 A | 8/1992 | Karraker |
| 5,136,619 A | 8/1992 | Capossela et al. |
| 5,141,701 A | 8/1992 | Bryan |
| 5,147,597 A | 9/1992 | Roofthooft et al. |
| 5,147,600 A | 9/1992 | Kadono et al. |
| 5,149,491 A | 9/1992 | Congdon et al. |
| 5,164,050 A | 11/1992 | Bertaud et al. |
| 5,183,629 A | 2/1993 | Canat et al. |
| 5,186,891 A | 2/1993 | Johansson et al. |
| 5,188,797 A | 2/1993 | Bryan |
| 5,192,495 A | 3/1993 | Caldwell et al. |
| 5,194,216 A | 3/1993 | McDaniels, Jr. |
| 5,200,142 A | 4/1993 | DeMario et al. |
| 5,202,085 A | 4/1993 | Aoyama et al. |
| 5,209,899 A | 5/1993 | Johansson et al. |
| 5,211,908 A | 5/1993 | Verdier |
| 5,219,519 A | 6/1993 | Matzner |
| 5,221,515 A | 6/1993 | Thiebaut et al. |
| 5,223,211 A | 6/1993 | Inagaki et al. |
| 5,241,570 A | 8/1993 | Challberg |
| 5,243,635 A | 9/1993 | Bryan |
| 5,247,550 A | 9/1993 | Perkins et al. |
| 5,259,009 A | 11/1993 | Patterson et al. |
| 5,259,010 A | 11/1993 | Brown et al. |
| 5,263,071 A | 11/1993 | Farkas et al. |
| 5,265,139 A | 11/1993 | Yanagi et al. |
| 5,267,291 A | 11/1993 | Matzner et al. |
| 5,271,053 A | 12/1993 | Bryan |
| 5,272,741 A | 12/1993 | Masuhara et al. |
| 5,272,742 A | 12/1993 | Attix et al. |
| 5,274,685 A | 12/1993 | Yates |
| 5,276,721 A | 1/1994 | Beuerlein |
| 5,278,882 A | 1/1994 | Garde et al. |
| 5,278,883 A | 1/1994 | Patterson et al. |
| 5,282,231 A | 1/1994 | Adams et al. |
| 5,283,812 A | 2/1994 | Verdier |
| 5,283,821 A | 2/1994 | Karoutas |
| 5,286,946 A | 2/1994 | Will |
| 5,289,514 A | 2/1994 | Lippert et al. |
| 5,297,176 A | 3/1994 | Altman et al. |
| 5,297,177 A | 3/1994 | Inagaki et al. |
| 5,299,246 A | 3/1994 | Bryan |
| 5,301,218 A | 4/1994 | Taylor, Jr. et al. |
| 5,307,393 A | 4/1994 | Hatfield |
| 5,328,524 A | 7/1994 | Hertz |
| 5,340,447 A | 8/1994 | Bertaud et al. |
| 5,341,407 A | 8/1994 | Rosenbaum et al. |
| 5,345,483 A | 9/1994 | Johansson et al. |
| 5,347,560 A | 9/1994 | Lippert et al. |
| 5,349,618 A | 9/1994 | Greenspan |
| 5,373,541 A | 12/1994 | Mardon et al. |
| 5,375,154 A | 12/1994 | Matzner et al. |
| 5,377,246 A | 12/1994 | Taylor, Jr. et al. |
| 5,383,228 A | 1/1995 | Armijo et al. |
| 5,384,814 A | 1/1995 | Matzner et al. |
| 5,386,439 A | 1/1995 | Leroy et al. |
| 5,386,440 A | 1/1995 | Kashiwai et al. |
| 5,390,220 A | 2/1995 | Zuloaga, Jr. et al. |
| 5,390,221 A | 2/1995 | Dix et al. |
| 5,390,222 A | 2/1995 | Rau et al. |
| 5,403,565 A | 4/1995 | Delloye et al. |
| 5,404,383 A | 4/1995 | Nylund |
| 5,417,780 A | 5/1995 | Adamson et al. |
| 5,420,901 A | 5/1995 | Johansson |
| 5,420,902 A | 5/1995 | Dressel et al. |
| 5,434,897 A | 7/1995 | Davies |
| 5,434,898 A | 7/1995 | Barkhurst |
| 5,436,946 A | 7/1995 | Curulla et al. |
| 5,436,947 A | 7/1995 | Taylor |
| 5,437,747 A | 8/1995 | Adamson et al. |
| 5,438,598 A | 8/1995 | Attix |
| 5,440,599 A | 8/1995 | Rodack et al. |
| 5,444,748 A | 8/1995 | Beuchel et al. |
| 5,452,334 A | 9/1995 | Reparaz et al. |
| 5,469,481 A | 11/1995 | Adamson et al. |
| 5,473,650 A | 12/1995 | Johansson |
| 5,481,577 A | 1/1996 | Yates et al. |
| 5,481,578 A | 1/1996 | Matzner |
| 5,483,564 A | 1/1996 | Matzner et al. |
| 5,488,634 A | 1/1996 | Johansson et al. |
| 5,488,644 A | 1/1996 | Johansson |
| 5,490,189 A | 2/1996 | Schechter |
| 5,490,190 A | 2/1996 | Hopkins et al. |
| 5,517,540 A | 5/1996 | Marlowe et al. |
| 5,517,541 A | 5/1996 | Rosenbaum et al. |
| 5,519,745 A | 5/1996 | Proebstle et al. |
| 5,519,746 A | 5/1996 | Dalke et al. |
| 5,519,748 A | 5/1996 | Adamson et al. |
| 5,524,032 A | 6/1996 | Adamson et al. |
| 5,526,387 A | 6/1996 | Johansson et al. |
| 5,528,640 A | 6/1996 | Johansson et al. |
| 5,530,729 A | 6/1996 | Gustafsson |
| 5,538,701 A | 7/1996 | Avens et al. |
| 5,539,791 A | 7/1996 | Garzarolli et al. |
| 5,539,792 A | 7/1996 | Buttner et al. |
| 5,539,793 A | 7/1996 | Johansson et al. |
| 5,546,437 A | 8/1996 | Matzner et al. |
| 5,572,560 A | 11/1996 | Brown |
| 5,577,081 A | 11/1996 | Yaginuma |
| 5,578,145 A | 11/1996 | Adamson et al. |
| 5,596,615 A | 1/1997 | Nakamura et al. |
| 5,600,694 A | 2/1997 | Broders |
| 5,606,724 A | 2/1997 | Wai et al. |
| 5,609,697 A | 3/1997 | Moinard et al. |
| 5,618,356 A | 4/1997 | Adamson et al. |
| 5,620,536 A | 4/1997 | Dahlback |
| 5,622,574 A | 4/1997 | Charquet |
| 5,648,995 A | 7/1997 | Mardon et al. |
| 5,666,389 A | 9/1997 | Andersson et al. |
| 5,674,330 A | 10/1997 | Charquet et al. |
| 5,675,621 A | 10/1997 | Croteau et al. |
| 5,681,404 A | 10/1997 | Adamson et al. |
| 5,699,396 A | 12/1997 | Taylor |
| 5,702,544 A | 12/1997 | Mardon et al. |
| 5,711,826 A | 1/1998 | Nordstrom |
| 5,726,418 A | 3/1998 | Duthoo |
| 5,727,039 A | 3/1998 | Harmon et al. |
| 5,732,116 A | 3/1998 | Petit |
| 5,737,375 A | 4/1998 | Radkowsky |
| 5,740,218 A | 4/1998 | Frederickson et al. |
| 5,748,694 A | 5/1998 | King |

(56) References Cited

U.S. PATENT DOCUMENTS

| | | |
|---|---|---|
| 5,768,332 A | 6/1998 | Van Swam |
| 5,774,514 A | 6/1998 | Rubbia |
| 5,774,517 A | 6/1998 | Palavecino et al. |
| 5,778,035 A | 7/1998 | Nylund |
| 5,787,142 A | 7/1998 | Van Swam |
| 5,805,657 A | 9/1998 | Heubeck |
| 5,808,271 A | 9/1998 | Duthoo |
| 5,826,163 A | 10/1998 | Saraceno et al. |
| 5,832,050 A | 11/1998 | Rebeyrolle et al. |
| 5,838,753 A | 11/1998 | Van Swam et al. |
| 5,844,957 A | 12/1998 | Johannesson et al. |
| 5,852,645 A | 12/1998 | Romary et al. |
| 5,854,818 A | 12/1998 | Van Swam et al. |
| 5,859,887 A | 1/1999 | Richards |
| 5,864,593 A | 1/1999 | Radkowsky |
| 5,878,100 A | 3/1999 | Johannesson et al. |
| 5,892,807 A | 4/1999 | Van Swam |
| 5,901,193 A | 5/1999 | Dahlback et al. |
| 5,926,517 A | 7/1999 | Van Swam |
| 5,940,464 A | 8/1999 | Mardon et al. |
| 5,949,837 A | 9/1999 | Radkowsky |
| 5,949,839 A | 9/1999 | Nylund |
| 6,002,735 A | 12/1999 | Van Swam |
| 6,010,671 A | 1/2000 | Kimura |
| 6,026,136 A | 2/2000 | Radkowsky |
| 6,033,493 A | 3/2000 | Hertz et al. |
| 6,088,420 A | 7/2000 | Yokoyama et al. |
| 6,110,437 A | 8/2000 | Schall et al. |
| 6,130,927 A | 10/2000 | Kang et al. |
| 6,167,105 A | 12/2000 | Koon et al. |
| 6,192,098 B1 | 2/2001 | Van Swam |
| 6,205,196 B1 | 3/2001 | Yamashita et al. |
| 6,226,342 B1 | 5/2001 | Micko et al. |
| 6,228,337 B1 | 5/2001 | Ioffe |
| 6,229,868 B1 | 5/2001 | Nylund et al. |
| 6,236,701 B1 | 5/2001 | Nylund |
| 6,236,702 B1 | 5/2001 | Chun et al. |
| 6,243,433 B1 | 6/2001 | Adamson et al. |
| 6,278,757 B1 | 8/2001 | Yokomizo et al. |
| 6,278,759 B1 | 8/2001 | Yoon et al. |
| 6,310,931 B1 | 10/2001 | Gustafsson et al. |
| 6,320,924 B1 | 11/2001 | Croteau |
| 6,327,324 B2 | 12/2001 | Nylund |
| 6,339,205 B1 | 1/2002 | Nakayama |
| 6,385,271 B2 | 5/2002 | Nylund |
| 6,393,087 B1 | 5/2002 | Oh et al. |
| 6,400,788 B1 | 6/2002 | Hirano et al. |
| 6,421,407 B1 | 7/2002 | Kang et al. |
| 6,429,403 B1 | 8/2002 | Nakayama |
| 6,434,209 B1 | 8/2002 | Groeneveld et al. |
| 6,473,482 B1 | 10/2002 | Steinke |
| 6,488,783 B1 | 12/2002 | King et al. |
| 6,516,043 B1 | 2/2003 | Chaki et al. |
| 6,519,309 B1 | 2/2003 | Van Swam |
| 6,522,710 B2 | 2/2003 | Smith et al. |
| 6,539,073 B1 | 3/2003 | Smith et al. |
| 6,542,566 B2 | 4/2003 | Adamson et al. |
| 6,542,567 B1 | 4/2003 | Mayet et al. |
| 6,544,361 B1 | 4/2003 | Diz et al. |
| 6,608,880 B2 | 8/2003 | Smith et al. |
| 6,608,881 B2 | 8/2003 | Oh et al. |
| 6,621,885 B2 | 9/2003 | Brichet |
| 6,665,366 B2 | 12/2003 | Aujollet et al. |
| 6,690,758 B1 | 2/2004 | Elkins |
| 6,707,872 B2 | 3/2004 | Yoon et al. |
| 6,714,619 B2 | 3/2004 | Oh et al. |
| 6,721,384 B2 | 4/2004 | Oh et al. |
| 6,728,329 B2 | 4/2004 | Hirano et al. |
| 6,744,842 B2 | 6/2004 | Schmidt et al. |
| 6,758,917 B2 | 7/2004 | King et al. |
| 6,807,246 B1 | 10/2004 | Kim et al. |
| 6,819,733 B2 | 11/2004 | Broders et al. |
| 6,845,138 B2 | 1/2005 | Chun et al. |
| 6,847,695 B2 | 1/2005 | Kageyama et al. |
| 6,863,745 B1 | 3/2005 | Charquet et al. |
| 6,884,304 B1 | 4/2005 | Charquet |
| 6,888,911 B2 | 5/2005 | Stabel-Weinheimer et al. |
| 6,888,912 B2 | 5/2005 | Morel et al. |
| 6,901,128 B2 | 5/2005 | Mori et al. |
| 6,909,766 B2 | 6/2005 | Kido et al. |
| 6,925,138 B2 | 8/2005 | Nakamaru et al. |
| 6,934,350 B1 | 8/2005 | Challberg et al. |
| 6,943,315 B2 | 9/2005 | Cho et al. |
| 6,960,326 B1 | 11/2005 | Webb et al. |
| 6,991,731 B2 | 1/2006 | Koegler |
| 7,037,390 B2 | 5/2006 | Miyahara et al. |
| 7,085,340 B2 | 8/2006 | Goldenfield et al. |
| 7,087,206 B2 | 8/2006 | Bond et al. |
| 7,127,024 B2 | 10/2006 | Garzarolli et al. |
| 7,169,370 B2 | 1/2007 | Mesmin et al. |
| 7,192,563 B2 | 3/2007 | Singh et al. |
| 7,195,745 B2 | 3/2007 | Brandel et al. |
| 7,309,473 B2 | 12/2007 | Caranoni et al. |
| 7,323,153 B2 | 1/2008 | Amamoto et al. |
| 2002/0075988 A1 | 6/2002 | Hirano et al. |
| 2002/0080908 A1 | 6/2002 | Nakamaru et al. |
| 2002/0122762 A1 | 9/2002 | Fukasawa et al. |
| 2003/0026381 A1 | 2/2003 | Ukai et al. |
| 2005/0031067 A1 | 2/2005 | Mori et al. |
| 2005/0069075 A1 | 3/2005 | D'Auvergne |
| 2005/0105677 A1 | 5/2005 | Yoon et al. |
| 2005/0157836 A1 | 7/2005 | Broach et al. |
| 2005/0226358 A1 | 10/2005 | Bonnamour et al. |
| 2005/0238131 A1 | 10/2005 | Hellandbrand et al. |
| 2006/0045231 A1 | 3/2006 | Lee et al. |
| 2006/0153327 A1 | 7/2006 | Jiang et al. |
| 2006/0171498 A1 | 8/2006 | D'Auvergne |
| 2006/0233685 A1 | 10/2006 | Janes |
| 2006/0251205 A1 | 11/2006 | Balog |
| 2006/0283790 A1 | 12/2006 | Elkins et al. |
| 2007/0036260 A1 | 2/2007 | Fetterman et al. |
| 2007/0080328 A1 | 4/2007 | Zavodchikov et al. |
| 2007/0133734 A1 | 6/2007 | Fawcett et al. |
| 2007/0165766 A1 | 7/2007 | Aleshin et al. |
| 2007/0183556 A1 | 8/2007 | Labarriere et al. |
| 2007/0201605 A1 | 8/2007 | Ishii et al. |
| 2007/0206717 A1 | 9/2007 | Conner et al. |
| 2007/0211843 A1 | 9/2007 | Smith et al. |
| 2007/0242793 A1 | 10/2007 | Song et al. |
| 2008/0013667 A1 | 1/2008 | Oh et al. |
| 2008/0130820 A1 | 6/2008 | Ukai et al. |
| 2008/0144762 A1 | 6/2008 | Holden et al. |
| 2008/0152068 A1 | 6/2008 | Aktas et al. |
| 2008/0152069 A1 | 6/2008 | Aktas et al. |
| 2008/0179042 A1 | 7/2008 | Evans et al. |
| 2009/0252278 A1 | 10/2009 | Bashkirtsev et al. |
| 2011/0311016 A1 | 12/2011 | Bashkirtsev et al. |
| 2013/0114777 A1 | 5/2013 | Goszczynski |
| 2013/0322591 A1 | 12/2013 | Bashkirtsev et al. |
| 2016/0035441 A1 | 2/2016 | Totemeier et al. |

FOREIGN PATENT DOCUMENTS

| | | |
|---|---|---|
| CN | 1230280 A | 9/1999 |
| CN | 1351352 A | 5/2002 |
| CN | 1945751 A | 4/2007 |
| CN | 101299351 A | 11/2008 |
| CN | 102301430 A | 12/2011 |
| CN | 102543224 A | 7/2012 |
| CN | 102947890 A | 2/2013 |
| DE | 1464481 A1 | 1/1969 |
| DE | 1514124 A1 | 9/1969 |
| EP | 0080853 A2 | 6/1983 |
| EP | 0620558 A1 | 10/1994 |
| EP | 0871958 A2 | 10/1998 |
| EP | 2 372 717 A1 | 10/2011 |
| FR | 1444002 A | 7/1966 |
| FR | 2632657 A1 | 12/1989 |
| GB | 853511 A | 11/1960 |
| GB | 876 021 A | 8/1961 |
| GB | 876399 A | 8/1961 |
| GB | 887713 A | 1/1962 |
| GB | 904 140 A | 8/1962 |
| GB | 920343 A | 3/1963 |

(56) References Cited

FOREIGN PATENT DOCUMENTS

| | | |
|---|---|---|
| GB | 1 031 678 A | 6/1966 |
| GB | 1043782 A | 9/1966 |
| GB | 1068964 A | 5/1967 |
| GB | 1 126 396 A | 9/1968 |
| GB | 1 282 767 A | 7/1972 |
| GB | 1 287 767 A | 9/1972 |
| GB | 2229172 A | 9/1990 |
| JP | 34-001962 B1 | 2/1956 |
| JP | S38-005344 B | 5/1963 |
| JP | S39-009943 | 6/1964 |
| JP | S41-002279 B | 2/1966 |
| JP | S41-021399 B | 12/1966 |
| JP | S42-012028 | 7/1967 |
| JP | S43-020223 | 8/1968 |
| JP | S 53-40187 A | 4/1978 |
| JP | 58-021194 A | 2/1983 |
| JP | 58 187891 A | 11/1983 |
| JP | 59-23830 | 2/1984 |
| JP | S 61-181993 A | 8/1986 |
| JP | S62-168091 A | 7/1987 |
| JP | 2018328 | 1/1990 |
| JP | H02 66494 A | 3/1990 |
| JP | 2221893 | 11/1990 |
| JP | H06-094869 A | 4/1994 |
| JP | H06-201872 A | 7/1994 |
| JP | 63-134520 | 6/1998 |
| JP | 11-183674 A | 7/1999 |
| JP | 11-508367 A | 7/1999 |
| JP | H11-511553 A | 10/1999 |
| JP | 11-352272 A | 12/1999 |
| JP | 3094195 B2 | 10/2000 |
| JP | 2001-500265 A | 1/2001 |
| JP | 2002-122687 A | 4/2002 |
| JP | 2003-248079 A | 9/2003 |
| JP | 2004-020463 A | 1/2004 |
| JP | 2006-284487 A | 10/2006 |
| JP | 2007-507700 A | 3/2007 |
| JP | 2007-507702 A | 3/2007 |
| JP | 2008-170454 A | 7/2008 |
| JP | 04-303796 B2 | 7/2009 |
| JP | 2009-162739 A | 7/2009 |
| JP | 2011-508877 A | 3/2011 |
| JP | 2012-514197 A | 6/2012 |
| JP | 2013-526709 A | 6/2013 |
| KR | 100654961 B1 | 12/2006 |
| KR | 10-2010-0129798 | 12/2010 |
| RU | 2170956 C1 | 7/2001 |
| RU | 2176826 C2 | 12/2001 |
| RU | 2222837 C2 | 1/2004 |
| RU | 2246142 C1 | 2/2005 |
| RU | 2267175 C2 | 12/2005 |
| RU | 2294570 C1 | 2/2007 |
| RU | 2 389 089 C2 | 5/2010 |
| RU | 2389089 C1 | 5/2010 |
| WO | 1985/001826 A1 | 4/1985 |
| WO | 93/16477 A1 | 8/1993 |
| WO | 97/08711 A2 | 3/1997 |
| WO | 2002/010074 A1 | 2/2002 |
| WO | 2009/082254 A1 | 7/2009 |
| WO | 2010/074592 A1 | 7/2010 |
| WO | 2011/143293 A1 | 11/2011 |

OTHER PUBLICATIONS

International Preliminary Report on Patentability issued in International Application No. PCT/US2011/035859 dated Nov. 22, 2012 [Cited in Parent].
International Preliminary Report on Patentability issued in International Application No. PCT/US2012/020878 dated Aug. 25, 2013 [Cited in Parent].
International Search Report and Written Opinion issued in International Application No. PCT/US2011/036034 dated Sep. 21, 2011 [Cited in Parent].
Chinese Office Action dated Aug. 19, 2013 in related Chinese Patent Application No. 200880132741.8 [Cited in Parent].
Japanese Office Action dated Oct. 1, 2013 in related Japanese Patent Application No. 2011-543460. [Cited in Parent].
Examination Report dated Sep. 17, 2013 in related Australian Application No. 2008365658. [Cited in Parent].
Korean Office Action dated Feb. 25, 2014 in related Korean Patent Application No. 10-2010-7026035. [Cited in Parent].
Korean Office Action dated Feb. 25, 2014 in related Korean Patent Application No. 10-2010-7016627. [Cited in Parent].
Canadian Office Action dated Mar. 12, 2014 in related Canadian Patent Application No. 2,710,432. [Cited in Parent].
Examination Report dated Feb. 14, 2014 in related Australian Patent Application No. 2011250906. [Cited in Parent].
Buongiorno et al., Core Design Options for High Power Density BWRs (MIT-NFC-PR-089), Nuclear Fuel Cycle (NFC) Technology and Policy Program, Dec. 2006. [Cited in Parent].
Buongiorno et al., Core Design Options for High Power Density BWRs (MIT-NFC-PR-097), Nuclear Fuel Cycle (NFC) Technology and Policy Program, Nov. 2007. [Cited in Parent].
Buongiorno et al., Core Design Options for High Power Density BWRs (MIT-NFC-PR-102), Nuclear Fuel Cycle (NFC) Technology and Policy Program, Sep. 2008. [Cited in Parent].
Carpenter et al., High Performance Fuel Design for Next Generation PWRs: Final Report (MIT-NFC-PR-082), Nuclear Fuel Cycle (NFC) Technology and Policy Program, Jan. 2006. [Cited in Parent].
Diakov, C., "Feasibility of converting Russian icebreaker reactors from HEU to LEU fuel," Science and Global Security, vol. 14, pp. 33-48, Routledge Taylor & Francia Group, 2006 [Cited in Parent].
European Search Report issued in European Patent Application No. 08172834 dated Aug. 19, 2009 [Cited in Parent].
European Search Report issued in European Patent Application No. 10166457 dated Aug. 11, 2010 [Cited in Parent].
Halber et al., "Energy Futures," MIT Energy Initiative, 2009, ISSN 1942-4671, Massachusetts Institute of Technology, pp. 5-7 [Cited in Parent].
International Preliminary Report on Patentability issued in International Application No. PCT/RU2008/000801 dated Jul. 5, 2011 [Cited in Parent].
International Search Report issued in International Application No. PCT/RU2007/000732 dated Jul. 10, 2008 [Cited in Parent].
International Search Report issued in International Application No. PCT/RU2008/000801 dated Sep. 3, 2009 [Cited in Parent].
Supplementary European Search Report issued in European Patent Application No. 08879222.1 dated Apr. 16, 2013 [Cited in Parent].
Office Action issued in U.S. Appl. No. 13/139,677 dated Mar. 10, 2014. [Cited in Parent].
International Search Report and Written Opinion dated Sep. 15, 2014 in International Patent Application No. PCT/US2014/036437. [Cited in Parent].
Notice of Reasons for Rejection dated Oct. 7, 2014 in related Japanese Patent Application No. 2011-543460. [Cited in Parent].
Reasons for Rejection dated Dec. 24, 2014 in Korean Patent Application No. 10-2011-7016736. [Cited in Parent].
Notice of Reasons for Rejection dated Feb. 3, 2015 in Japanese Patent Application No. 2013-510271. [Cited in Parent].
Translation of Examination Report dated Jan. 20, 2015 in Ukranian Patent Application No. a201213992. [Cited in Parent].
Decision for Grant and Partial English Translation dated Apr. 28, 2015 in Japanese Patent Application No. 2011-543460. [Cited in Parent].
Notice of Reasons for Rejection and Organized Translation dated Nov. 4, 2015 in Japanese Patent Application No. 2013-510271. [Cited in Parent].
International Search Report dated Feb. 10, 2016 in International Patent Application No. PCT/US2015/050454. [Cited in Parent].
Written Opinion dated Feb. 10, 2016 in International Patent Application No. PCT/US2015/050454. [Cited in Parent].
Notice of Allowance dated Feb. 22, 2016 in Chinese Patent Application No. 201180023785.9. [Cited in Parent].
Decision of Grant (and partial English translation) dated Mar. 15, 2016 in Japanese Patent Application No. 2014-114955. [Cited in Parent].

(56) References Cited

OTHER PUBLICATIONS

Notice of Reasons for Rejection (and English translation) dated Mar. 15, 2016 in Japanese Patent Application No. 2015-094071. [Cited in Parent].
Extended European Search Report dated May 4, 2016 in European Patent Application No. 16153633.9. [Cited in Parent].
Japanese Decision for Grant dated Aug. 2, 2016 in Japanese Patent Application No. 2013-510271. [Cited in Parent].
Japanese Decision for Grant dated Aug. 2, 2016 in Japanese Patent Application No. 2015-094071. [Cited in Parent].
Chinese Office Action and English Translation dated Nov. 28, 2016 in Chinese Patent Application No. 201480036401.0. [Cited in Parent].
Akabori, "Interdiffusion in the U-Zr system at d-phase compositions," Journal of Alloys and Compounds 271-273 (1998), pp. 597-601. [Cited in Parent].
Kouhsen, "Preparation and Thermochemical Stability of Uranium-Zirconium-Carbonitrides," Journal of Nuclear Materials 61 (1976), pp. 88-98. [Cited in Parent].
Simnad, "The U-ZrHx Alloy: Its Properties and use in TRGIA Fuel," Nuclear Engineering and Design 64 (1981), pp. 403-422. [Cited in Parent].
Office Action dated Mar. 10, 2017 in U.S. Appl. No. 13/695,792. [Cited in Parent].
Notification of Reasons for Refusal dated Jun. 5, 2017 in Japanese Patent Application No. 2016-171063. [Cited in Parent].
First Office Action dated Jun. 2, 2017 in Chinese Patent Application No. 2016102180563. [Cited in Parent].
Patent Search Report dated May 24, 2017 in Chinese Patent Application No. 2016102180563. [Cited in Parent].
Office Action dated Oct. 18, 2017 in U.S. Appl. No. 14/856,084. [Cited in Parent].
Tayal et al., "A 61-Element Fuel Design (HAC) For Very High Burnups," Conference on CANDU Fuel, Oct. 1995, (1995), pp. 5A-20-5A-30. [Cited in Parent].
Conboy et al., "Experimental Investigation of Hydraulics and Lateral Mixing for Helical-Cruciform Fuel Rod Assemblies," Nuclear Technology, vol. 182, Jun. 2013, (2013), pp. 259-273. [Cited in Parent].
Notification of Reasons for Refusal issued in counterpart Japanese Patent Application No. 2016-512961 dated Oct. 24, 2017 [Cited in Parent].
Office Action dated Mar. 8, 2018 in U.S. Appl. No. 14/856,084 [Cited in Parent].
Conboy, "Thermal-Hydraulic Analysis of Cross-Shaped Spiral Fuel in High Power Density BWRs," Doctoral Dissertation, MIT, 2007 [Cited in Parent].
Decision to Grant Patent issued in counterpart Japanese Patent Application No. 2016-512961 dated Jun. 5, 2018 [Cited in Parent].
Notice of Submission in related Korean Patent Application No. 10-2012-7029003, dated Sep. 4, 2018. [Cited in Parent].
Feng, "Innovative Fuel Designs for High Power Density Pressurized Water Reactor", MIT, 2005 [Cited in Parent].
Koo, et al., "Behavior of unirradiated Zr based uranium metal fuel under reactivity initiated accident conditions", Nuclear Engineering and Design, 238, pp. 1592-1600, 2008. [Cited in Parent].
Lee et al., "Thermal stability of co-extruded U-Zr/Zr-Nb alloys", Journal of Nuclear Materials, 373, pp. 275-279, 2008. [Cited in Parent].
McDeavitt et al., "Thoria-Based Cermet Nuclear Fuel: Cermet Fabrication and Behavior Estimates", 10th International Conference on Nuclear Engineering, 2002. [Cited in Parent].
Van Duyn, "Evaluation of the Mechanical Behavior of a Metal-Matrix Dispersion Fuel for Plutonium Burning", Georgia Institute of Technology, 2003. [Cited in Parent].
Notice of Submission of Opinion issued in counterpart Korean Application No. 10-2017-7024393 dated Sep. 28, 2018 [Cited in Parent].
Reason of Request for Revocation in counterpart Korean Patent Application No. 10-2012-7029003, received Sep. 12, 2018 [Cited in Parent].
Office Action dated Jun. 9, 2016 in U.S. Appl. No. 14/081,056. [Provided in IFW].
Office Action dated Oct. 18, 2016 in U.S. Appl. No. 14/081,056. [Provided in IFW].
Office Action dated Mar. 20, 2017 in U.S. Appl. No. 14/081,056. [Provided in IFW].
Office Action dated Jul. 24, 2017 in U.S. Appl. No. 14/081,056. [Provided in IFW].
Office Action dated Mar. 29, 2018 in U.S. Appl. No. 14/081,056 [Provided in IFW].
Trial Decision on the Reason for Revocation in counterpart Korean Patent Application No. 10-2012-7029003, dated Jan. 22, 2019.
Extended European Search Report dated Jun. 18, 2019 in European Patent Application No. 19156631.4.
Examination Report No. 1 dated Jun. 26, 2019 in Australian Patent Application No. 2018203144.
Notice of Reasons for Refusal dated Jul. 16, 2019 in Japanese Patent Application No. 2017-512054.
Decision to Refuse a Patent dated Jul. 31, 2019 in Korean Patent Application No. 10-2017-7024393.

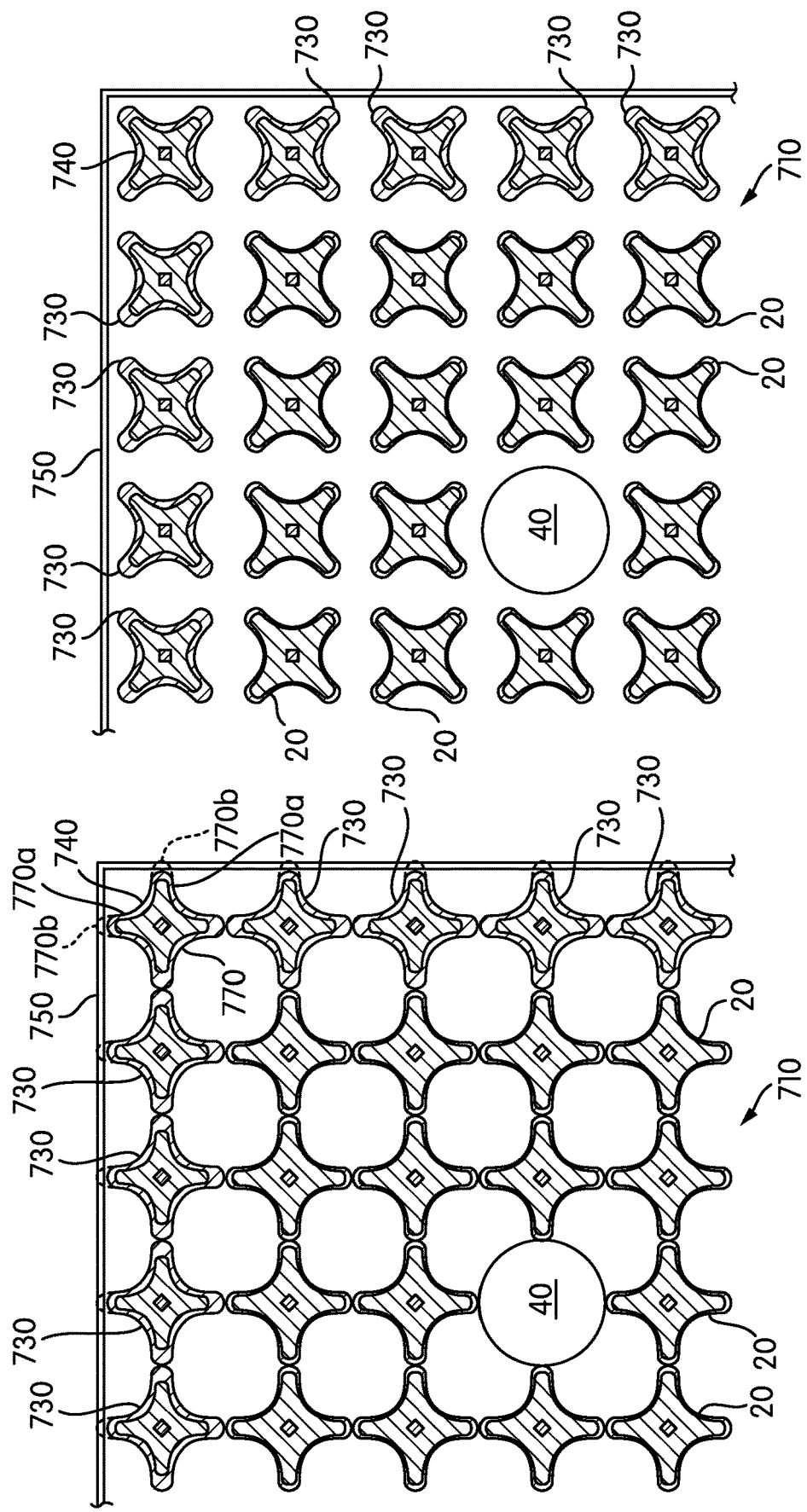

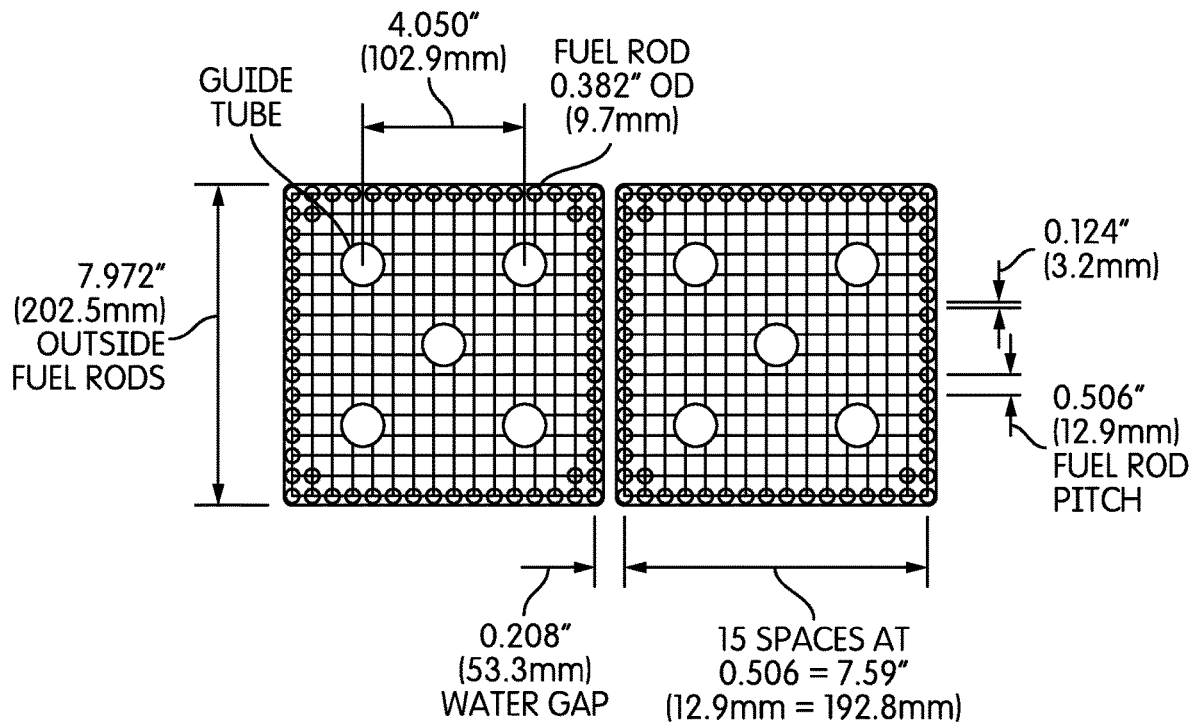
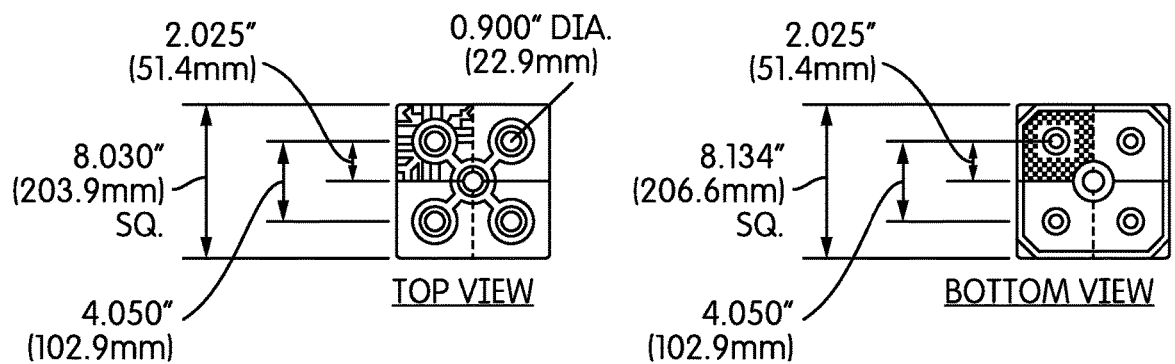
FIG. 39
(PRIOR ART)

PVNGS UPDATED FSAR

FUEL SYSTEM DESIGN

Table 4.2-1
TYPICAL MECHANICAL DESIGN PARAMETERS
(Sheet 1 OF 4)

| Core Arrangement | |
|---|---|
| Number of fuel assemblies in core, total | 241 |
| Number of CEAs | 89 |
| Number of fuel rod locations | 56,876 |
| Spacing between fuel assemblies, fuel rod surface to surface, inches | 0.208 |
| Spacing, outer fuel rod surface to core Shroud, inches | 0.214 |
| Hydraulic diameter, nominal channel, feet | 0.0393 |
| Total flow area (excluding guide tubes), $ft^2$ | 60.9 |
| Total core area, $ft^2$ | 112.3 |
| Core equivalent diameter, inches | 143.6 |
| Core circumscribed diameter, inches | 152.46 |
| Total fuel loading, kg U (assuming all rod locations are fuel rods) | $1.07 \times 10^5$ |
| Total fuel weight, lb $UO_2$ (assuming all rod locations are fuel rods) | $2.67 \times 10^5$ |
| Total weight of Zircaloy and ZIRLO, lb | 72,500[a] |
| Fuel volume (including dishes), $ft^3$ | 410.8 |
| Fuel Assemblies | |
| Fuel rod array square | 16 x 16 |
| Fuel rod pitch, inches | 0.506 |
| Spacer grid | |
|     Type | Leaf spring |
|     Material | Zircaloy |
|     Number per assembly | 10[b] | a. Weight assumes all assemblies are of PVNGS Unit 2 Batch N design. Actual weight varies from core-to-core.
b. Beginning with Batch P3R, reload assemblies have 9 Zircaloy spacer grids.

FIG. 41
(PRIOR ART)

Table 4.2-1
TYPICAL MECHANICAL DESIGN PARAMETERS
(Sheet 2 OF 4)

| Fuel Assemblies (Continued) | |
|---|---|
| Bottom spacer grid | |
|    Type | GUARDIAN™ or Leaf spring |
|    Material | Inconel |
|    Number per assembly | 1 |
| Top spacer grid (beginning with Batch P3R) | |
|    Type | Leaf spring |
|    Material | Inconel |
|    Number per assembly | 1 |
| Overall dimensions | |
|    Outside rod to outside rod, inches | 7.972 x 7.972 |
| Fuel Rod | |
|    Fuel rod material (sintered pellet) | $UO_2$ or $UO_2$-$Er_2O_3$ |
|    Pellet diameter, inches | 0.3255 |
|    Pellet length, inches | 0.390 |
|    Pellet density, g/cm$^3$ | 10.58 |
|    Pellet theoretical density, g/cm$^3$ | 10.96 |
|    Pellet density (% theoretical) | 96.5 |
|    Stack height density, g/cm$^3$ | 10.43 |
|    Clad material | Zircaloy or ZIRLO™ |
|    Clad ID, inches | 0.332 |
|    Clad OD (nominal), inches | 0.382 |
|    Clad thickness (nominal), inches | 0.025 |
|    Diametral gap (cold, nominal), inches | 0.0065 |
|    Active length, inches | 150 |
|    Plenum length, inches | varies |

FIG. 42
(PRIOR ART)

Table 4.2-1
TYPICAL MECHANICAL DESIGN PARAMETERS
(Sheet 3 OF 4)

| Control Element Assemblies (CEA) | Full-strength | Part-strength |
|---|---|---|
| Number | 76 | 13 |
| Absorber elements, number per assembly | 12 and 4 | 4 |
| Type | Cylindrical rods | Cylindrical rods |
| Clad material | Inconel 625 | Inconel 625 |
| Clad thickness, inches nominal | 0.035 | 0.035 |
| Clad OD, inches nominal | 0.816 | 0.816 |
| Diametral gap, inches nominal | 0.009 | 0.009 |
| Elements | | |
|    Poison material | $B_4C$/felt metal and reduced dia. $B_4C$ | Inconel 625 |
|    Poison length, inches | 135-1/2/12/1/2 | 150.0 (including tip of finger) |
|    Poison Diameter, inches | 0.737/0.664 or 0.737/0.674 ($B_4C$ pellet) | 0.737 (Inconel 625 slugs) |
|    $B_4C$ pellet | | |
|    Density, % of theoretical density of 2.52 g/cm³ | 73 | N/A |
|    Weight % boron, minimum | 77.5 | N/A |
| Burnable Poison Rod, Original Design[b] | | |
| Absorber material | $Al_2O_3$-$B_4C$ | |
| Pellet diameter, inches | 0.307 | |
| Pellet length, inches, min. | 0.875(1") and 0.500(0.5") | |
| Pellet density (% theoretical), min. | 93(1") and 91(0.5") | |
| Theoretical density, $Al_2O_3$, g/cm³ | 3.94 | |
| | 2.52 | |

(b) Reload core designs may utilize erbium oxide ($Er_2O_3$), admixed with $UO_2$ fuel, in lieu of $Al_2O_3$-$B_4C$ poison rods. The reload design poison rods are mechanically similar to $UO_2$ fuel rods.

FIG. 43
(PRIOR ART)

Table 4.2-1
TYPICAL MECHANICAL DESIGN PARAMETERS
(Sheet 4 OF 4)

| Burnable Poison Rod, Original Design[b] (Continued) | |
|---|---|
| Clad material | Zircaloy-4 |
| Clad ID, inches | 0.332 |
| Clad OD, inches | 0.382 |
| Clad thickness (nominal), inches | 0.025 |
| Diametrical gap (cold, nominal), inches | 0.025 |
| Active length, inches | 136.0 |
| Plenum length, inches | varies |

June 2003  4.2-54  Revision 12

FIG. 44
(PRIOR ART)

FUEL ASSEMBLY

CROSS REFERENCE

This application is a divisional application of U.S. patent application Ser. No. 14/081,056 filed Nov. 15, 2013, which claims the benefit of priority from U.S. Provisional Application No. 61/821,918, filed May 10, 2013, titled "FUEL ASSEMBLY," the entire contents of the foregoing applications are hereby incorporated by reference herein.

BACKGROUND OF THE INVENTION

1. Field of the Invention

The present invention relates generally to nuclear fuel assemblies used in the core of a nuclear reactor, and relates more specifically to metal nuclear fuel elements.

2. Description of Related Art

U.S. Patent Application Publication No. 2009/0252278 A1, the entire contents of which are incorporated herein by reference, discloses a nuclear fuel assembly that includes seed and blanket sub-assemblies. The blanket sub-assembly includes thorium-based fuel elements. The seed sub-assembly includes Uranium and/or Plutonium metal fuel elements used to release neutrons, which are captured by the Thorium blanket elements, thereby creating fissionable U-233 that burns in situ and releases heat for the nuclear power plant.

PCT Publication No. WO2011/143293 (A1), the entire contents of which are incorporated herein by reference, discloses a variety of fuel assemblies and fuel elements that utilize extruded, spiral (i.e., helically twisted) fuel elements with metal or ceramic fuel.

SUMMARY OF EMBODIMENTS OF THE INVENTION

The surface area of the cylindrical tube of conventional fuel rods limits the amount of heat that can be transferred from the rod to the primary coolant. To avoid overheating the fuel rod in view of the limited surface area for heat flux removal, the amount of fissile material in these uranium oxide fuel rods or mixed oxide (plutonium and uranium oxide) fuel rods has conventionally been substantially limited.

One or more embodiments of the present invention overcome various disadvantages of conventional uranium oxide fuel rods by replacing them with all metal, multi-lobed, powder metallurgy co-extruded fuel rods (fuel elements). The metal fuel elements have significantly more surface area than their uranium oxide rod counterparts, and therefore facilitate significantly more heat transfer from the fuel element to the primary coolant at a lower temperature. The spiral ribs of the multi-lobed fuel elements provide structural support to the fuel element, which may facilitate the reduction in the quantity or elimination of spacer grids that might otherwise have been required. Reduction in the quantity or elimination of such spacer grids advantageously reduces the hydraulic drag on the coolant, which can improve heat transfer to the coolant. Because the metal fuel elements may be relatively more compact than their conventional uranium oxide fuel rod counterparts, more space within the fuel assembly is provided for coolant, which again reduces hydraulic drag and improves heat transfer to the coolant. The higher heat transfer from the metal fuel rods to the coolant means that it is possible to generate more heat (i.e., power), while simultaneously maintaining the fuel elements at a lower operating temperature due to the considerably higher thermal conductivity of metals versus oxides. Although conventional uranium oxide or mixed oxide fuel rods typically are limited to fissile material loading of around 4-5% due to overheating concerns, the higher heat transfer properties of the metal fuel elements according to various embodiments of the present invention enable significantly greater fissile material loadings to be used while still maintaining safe fuel performance. Ultimately, the use of metal fuel elements according to one or more embodiments of the present invention can provide more power from the same reactor core than possible with conventional uranium oxide or mixed oxide fuel rods.

The use of all-metal fuel elements according to one or more embodiments of the present invention may advantageously reduce the risk of fuel failure because the metal fuel elements reduce the risk of fission gas release to the primary coolant, as is possible in conventional uranium oxide or mixed oxide fuel rods.

The use of all-metal fuel elements according to one or more embodiments of the present invention may also be safer than conventional uranium oxide fuel rods because the all-metal design increases heat transfer within the fuel element, thereby reducing temperature variations within the fuel element, and reducing the risk of localized overheating of the fuel element.

One or more embodiments provides an axially elongated fuel element for use in a fuel assembly of a nuclear reactor. The fuel element includes: a kernel including fissionable material; and a cladding enclosing the kernel. A ratio of an axial length of the fuel element to a circumscribed diameter of the fuel element is at least 20:1. An axial centerline of the fuel element is offset from an axial center of mass of the fuel element.

According to one or more of these embodiments, the fuel element has a multi-lobed profile that forms spiral ribs, wherein the spiral ribs include fissionable material.

According to one or more of these embodiments, the multi-lobed profile includes concave areas between adjacent lobes.

According to one or more of these embodiments, at least one circumferential side of the cladding is laterally reduced in size (e.g., shortened) relative to at least one other circumferential side of the cladding.

According to one or more of these embodiments, an axial center of mass of the kernel is disposed at the axial centerline, and wherein an axial center of mass of the cladding is offset from the axial centerline.

One or more embodiments provides a fuel assembly for use in a core of a nuclear power reactor. The assembly includes a frame including a lower nozzle that is shaped and configured to mount to the nuclear reactor internal core structure; and a plurality of elongated, extruded fuel elements supported by the frame. Each of said plurality of fuel elements includes a fuel kernel including fuel material disposed in a matrix of metal non-fuel material, the fuel material including fissile material, and a cladding surrounding the fuel kernel. Each of the fuel elements has a multi-lobed profile that forms spiral ribs. The plurality of fuel elements provide all of the fissile material of the fuel assembly. Each of the plurality of fuel elements is disposed in a different grid position of a grid pattern defined by the frame such that a subset of the plurality of fuel elements are disposed along an outer perimeter of the grid pattern. At least one outer side of the cladding on at least some of the fuel elements disposed along an outer perimeter of the grid pattern are laterally reduced in size.

According to one or more of these embodiments, the frame includes a shroud such that all of the plurality of fuel elements are disposed inside the shroud, and the laterally reduced outer sides of the cladding contact the shroud.

According to one or more of these embodiments, in a cross section of the fuel assembly that is perpendicular to an axial direction of the fuel elements, an area of each of the fuel kernels of the at least some of the fuel elements disposed along an outer perimeter of the grid pattern is smaller than an area of at least one of the fuel kernels of in a remainder of the plurality of fuel elements.

According to one or more of these embodiments, each of the plurality fuel elements is separated from adjacent fuel elements by a common centerline-to-centerline distance, and a circumscribed diameter of each of the plurality of fuel elements equals the centerline-to-centerline distance.

According to one or more of these embodiments, the fuel material includes ceramic fuel material disposed in the matrix of metal non-fuel material.

According to one or more of these embodiments, the cladding is at least 0.4 mm thick throughout each of the plurality of fuel elements.

According to one or more of these embodiments, the fuel assembly is thermodynamically designed and physically shaped for operation in a conventional land-based nuclear power reactor of a conventional nuclear power plant having a reactor design that was in actual use before 2013. The frame is shaped and configured to fit into the land-based nuclear power reactor in place of a conventional uranium oxide fuel assembly for said reactor.

According to one or more of these embodiments, the spiral ribs of adjacent ones of the plurality of fuel elements periodically contact each other over the axial length of the fuel elements, such contact helping to maintain the spacing of the fuel elements relative to each other.

According to one or more of these embodiments, a portion of the fuel assembly that supports the subset of the elongated fuel elements is inseparable from a portion of the fuel assembly that supports the rest of the plurality of fuel elements.

According to one or more of these embodiments, the grid pattern defines a 17×17 pattern of grid positions, and guide tubes occupy grid positions at row, column positions: 3,6; 3,9; 3,12; 4,4; 4;14; 6,3; 6,15; 9,3; 9,15; 12,3; 12,15; 14,4; 14,14; 15,6; 15,9; and 15,12.

One or more embodiments provides a fuel assembly for use in a core of a nuclear power reactor. The assembly includes: a frame including a lower nozzle that is shaped and configured to mount to the nuclear reactor internal core structure; and a plurality of elongated fuel elements supported by the frame, each of said plurality of fuel elements including fissile material. As viewed in a cross section that is perpendicular to an axial direction of the fuel assembly, the plurality of fuel elements are arranged into a mixed grid pattern that includes a first grid pattern and a second grid pattern. The second grid pattern is different from the first grid pattern.

According to one or more of these embodiments, the plurality of fuel elements includes non-overlapping first, second, and third subsets, each subset including a plurality of the fuel elements. The plurality of fuel elements of the first subset are disposed within respective grid positions defined by the first grid pattern. The plurality of fuel elements of the second subset are disposed within respective grid positions defined by the second grid pattern. The plurality of fuel elements of the third subset are disposed within respective overlapping grid positions, the overlapping grid positions falling within both the first grid pattern and the second grid pattern.

According to one or more of these embodiments, each of the plurality of fuel elements has a common circumscribed diameter.

According to one or more of these embodiments, the first grid pattern includes a pattern of square rows and columns. The centerline-to-centerline distance between the rows and columns is the common circumscribed diameter. The second grid pattern includes a pattern of equilateral triangles. A length of each side of each triangle is the common circumscribed diameter.

According to one or more of these embodiments, the fuel assembly also includes additional fuel elements supported by the frame. The additional fuel elements are not disposed within any of the grid positions defined by the first or second grid pattern.

According to one or more of these embodiments, each of the plurality of fuel elements includes: a fuel kernel including fuel material disposed in a matrix of metal non-fuel material, the fuel material including fissile material, and a cladding surrounding the fuel kernel. Each of the fuel elements has a multi-lobed profile that forms spiral ribs.

One or more embodiments of the present invention provide a fuel assembly for use in a core of a nuclear power reactor (e.g., a land-based or marine nuclear reactor). The assembly includes a frame including a lower nozzle that is shaped and configured to mount to the nuclear reactor internal core structure, and a plurality of elongated metal fuel elements supported by the frame. Each of the plurality of fuel elements includes a metal fuel alloy kernel including metal fuel material and a metal non-fuel material. The fuel material includes fissile material. Each fuel element also includes a cladding surrounding the fuel kernel. The plurality of elongated metal fuel elements provide all of the fissile material of the fuel assembly.

According to one or more of these embodiments, the fuel assembly is thermodynamically designed and physically shaped for operation in a land-based nuclear power reactor.

According to one or more embodiments, the fuel assembly may be used in combination with a land-based nuclear power reactor, wherein the fuel assembly is disposed within the land-based nuclear power reactor.

According to one or more of these embodiments, with respect to a plurality of the plurality of fuel elements: the fuel material of the fuel kernel is enriched to 20% or less by uranium-235 and/or uranium-233 and includes between a 20% and 30% volume fraction of the fuel kernel; and the non-fuel metal includes between a 70% and 80% volume fraction of the fuel kernel. With respect to the plurality of the plurality of fuel elements, the fuel material enrichment may be between 15% and 20%. The non-fuel metal of the fuel kernel may include zirconium.

According to one or more of these embodiments, the kernel includes δ-phase $UZr_2$.

According to one or more of these embodiments, with respect to a plurality of the plurality of fuel elements: the fuel material of the fuel kernel includes plutonium; the non-fuel metal of the fuel kernel includes zirconium; and the non-fuel metal of the fuel kernel includes between a 70% and 97% volume fraction of the fuel kernel.

According to one or more of these embodiments, the fuel material includes a combination of: uranium and thorium; plutonium and thorium; or uranium, plutonium, and thorium.

According to one or more of these embodiments, the cladding of a plurality of the plurality of fuel elements is metallurgically bonded to the fuel kernel.

According to one or more of these embodiments, the non-fuel metal of a plurality of the plurality of fuel elements includes aluminum.

According to one or more of these embodiments, the non-fuel metal of a plurality of the plurality of fuel elements includes a refractory metal.

According to one or more of these embodiments, the cladding of a plurality of the plurality of fuel elements includes zirconium.

According to one or more of these embodiments, a plurality of the plurality of fuel elements are manufactured via co-extrusion of the fuel kernel and cladding.

According to one or more of these embodiments, the fuel assembly, one or more fuel elements thereof, and/or one or more fuel kernels thereof includes burnable poison.

According to one or more of these embodiments, the plurality of elongated metal fuel elements provide at least 80% by volume of the overall fissile material of the fuel assembly.

According to one or more of these embodiments, the land-based nuclear power reactor is a conventional nuclear power plant having a reactor design that was in actual use before 2013. The frame may be shaped and configured to fit into the land-based nuclear power reactor in place of a conventional uranium oxide fuel assembly for the reactor.

According to one or more of these embodiments, the kernel may include ceramic fuel material instead of metal fuel material. In one or more such embodiments, the fuel material includes ceramic fuel material disposed in a matrix of metal non-fuel material. Conversely, in one or more metal fuel embodiments, the plurality of elongated, extruded fuel elements include a plurality of elongated, extruded metal fuel elements; the fuel material includes metal fuel material; and the fuel kernel includes a metal fuel alloy kernel including an alloy of the metal fuel material and the matrix of metal non-fuel material.

According to one or more of these embodiments, the frame comprises a shroud such that all of the plurality of fuel elements are disposed inside the shroud, and the fuel assembly comprises at least one corner structure disposed at a corner of the fuel assembly and attached to the shroud. According to one or more of these embodiments, the at least one corner structure comprises a burnable poison. According to one or more of these embodiments, the at least one corner structure abuts at least one of the plurality of elongated fuel elements.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where:

FIGS. 11 and 12 are partial cross-sectional views of a fuel assembly according to an embodiment of the present invention;

FIGS. 39-44 provide the conventional specifications for a 16×16 fuel assembly.

DETAILED DESCRIPTION OF EXEMPLARY EMBODIMENTS OF THE INVENTION

Figure 1:
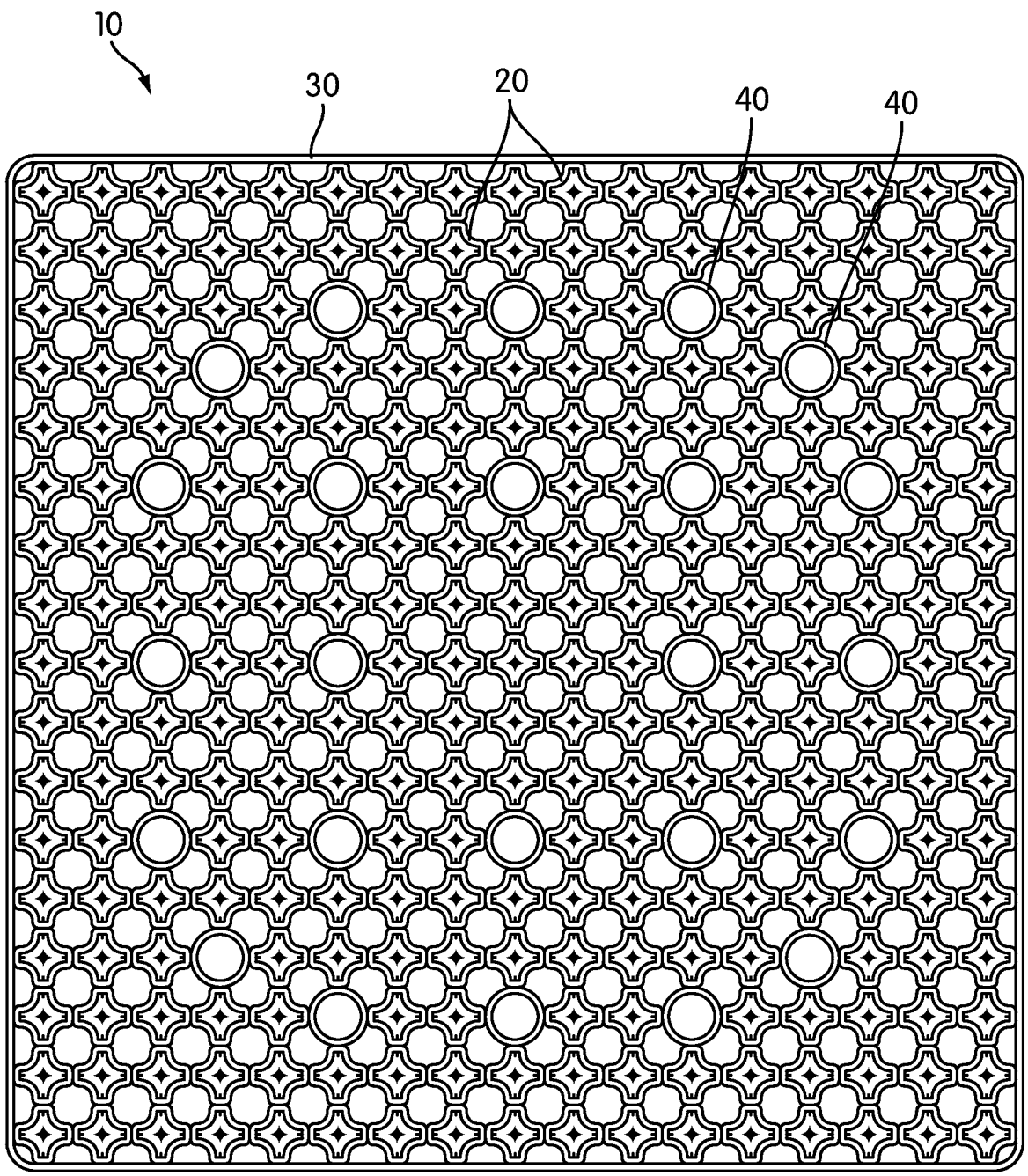
FIG. 1 is a cross-sectional view of a fuel assembly, the cross-section being taken in a self-spacing plane.
Figure 2:
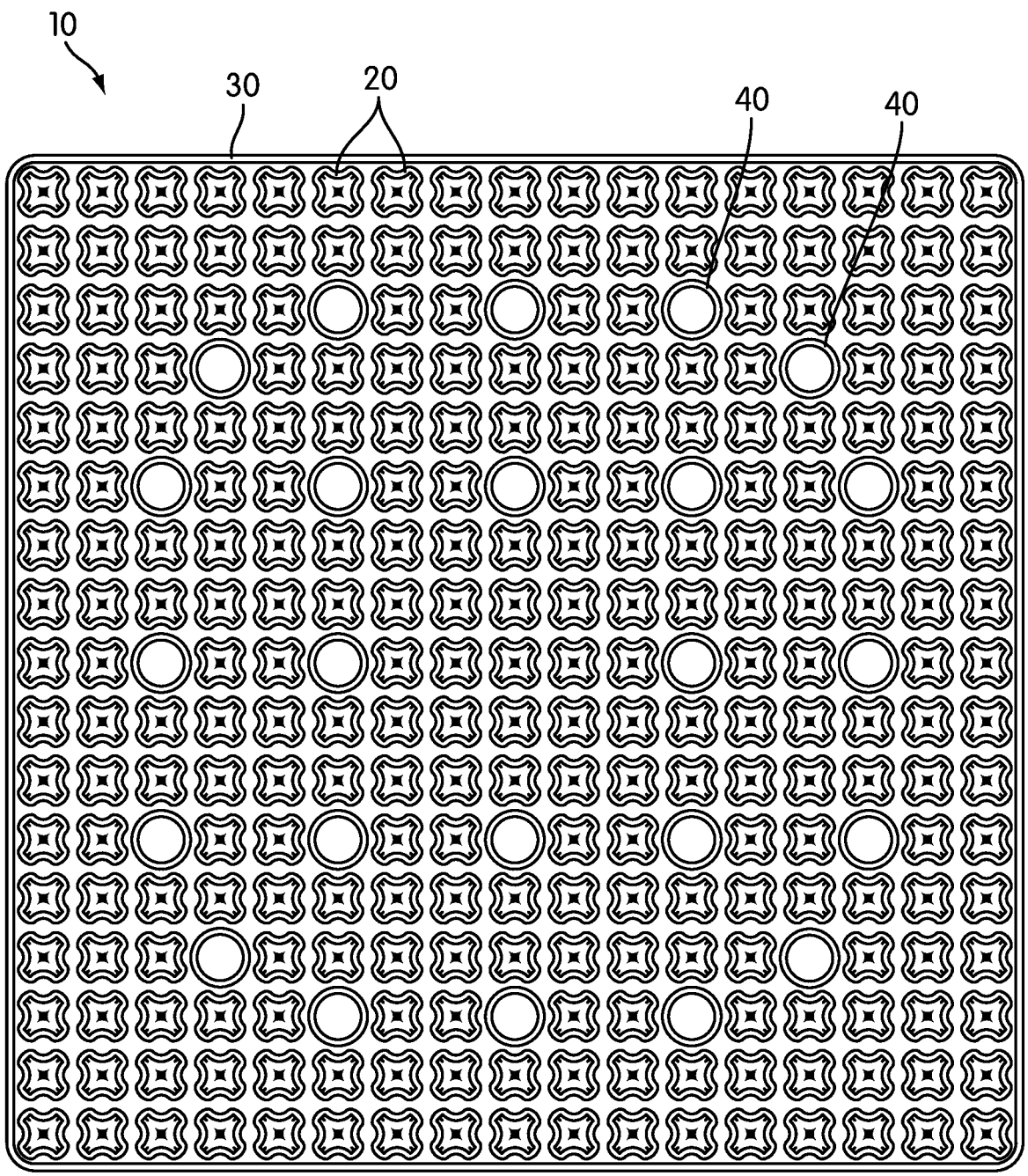
FIG. 2 is a cross-sectional view of the fuel assembly of FIG. 1, the cross-section being taken in a plane that is shifted by ⅛ of a twist of the fuel elements from the view in FIG. 1.
Figure 3:
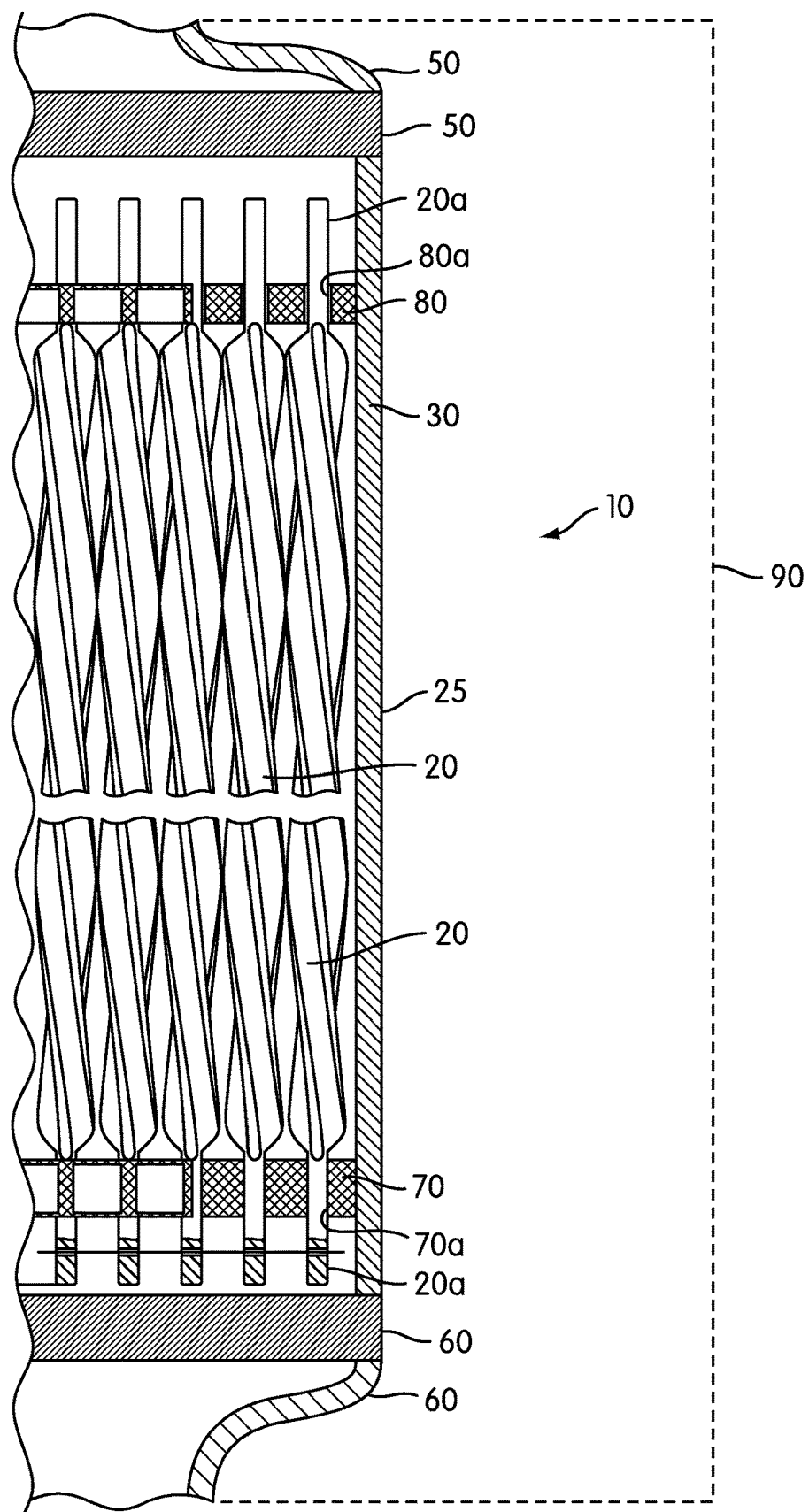
FIG. 3 is a cross-sectional view of the fuel assembly of FIG. 1, taken in a plane that is parallel to the axial direction of the fuel assembly.

FIGS. 1-3 illustrate a fuel assembly 10 according to an embodiment of the present invention. As shown in FIG. 3, the fuel assembly 10 comprises a plurality of fuel elements 20 supported by a frame 25.

As shown in FIG. 3, the frame 25 comprises a shroud 30, guide tubes 40, an upper nozzle 50, a lower nozzle 60, a lower tie plate 70, an upper tie plate 80, and/or other structure(s) that enable the assembly 10 to operate as a fuel assembly in a nuclear reactor. One or more of these components of the frame 25 may be omitted according to various embodiments without deviating from the scope of the present invention.

As shown in FIG. 3, the shroud 25 mounts to the upper nozzle 50 and lower nozzle 60. The lower nozzle 60 (or other suitable structure of the assembly 10) is constructed and shaped to provide a fluid communication interface between the assembly 10 and the reactor 90 into which the assembly 10 is placed so as to facilitate coolant flow into the reactor core through the assembly 10 via the lower nozzle 60. The upper nozzle 50 facilitates direction of the heated coolant from the assembly 10 to the power plant's steam generators (for PWRs), turbines (for BWRs), etc. The nozzles 50, 60 have a shape that is specifically designed to properly mate with the reactor core internal structure.

As shown in FIG. 3, the lower tie plate 70 and upper tie plate 80 are preferably rigidly mounted (e.g., via welding, suitable fasteners (e.g., bolts, screws), etc.) to the shroud 30 or lower nozzle 60 (and/or other suitable structural components of the assembly 10).

Lower axial ends of the elements 20 form pins 20a that fit into holes 70a in the lower tie plate 70 to support the elements 20 and help maintain proper element 20 spacing. The pins 20a mount to the holes 70a in a manner that prevents the elements 20 from rotating about their axes or axially moving relative to the lower tie plate 70. This restriction on rotation helps to ensure that contact points between adjacent elements 20 all occur at the same axial positions along the elements 20 (e.g., at self-spacing planes discussed below). The connection between the pins 20a and holes 70a may be created via welding, interference fit, mating non-cylindrical features that prevent rotation (e.g., keyway and spline), and/or any other suitable mechanism for restricting axial and/or rotational movement of the elements 20 relative to the lower tie plate 70. The lower tie plate 70 includes axially extending channels (e.g., a grid of openings) through which coolant flows toward the elements 20.

Upper axial ends of the elements 20 form pins 20a that freely fit into holes 80a in the upper tie plate 80 to permit the upper pins 20a to freely axially move upwardly through to the upper tie plate 80 while helping to maintain the spacing between elements 20. As a result, when the elements 20 axially grow during fission, the elongating elements 20 can freely extend further into the upper tie plate 80.

Figure 4:
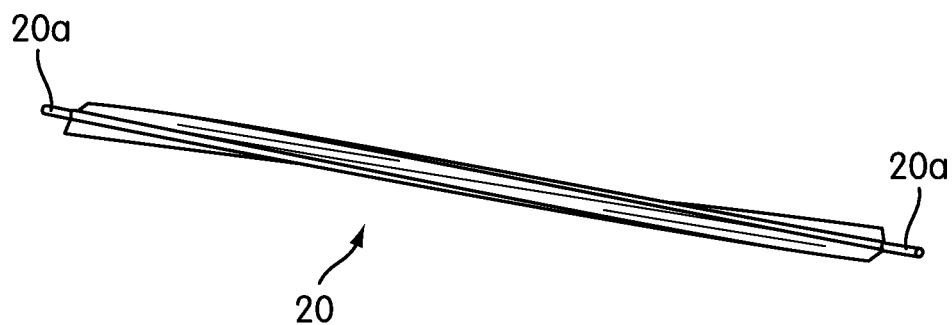
FIG. 4 is a perspective view of a fuel element of the fuel assembly of FIG. 1.

As shown in FIG. 4, the pins 20a transition into a central portion of the element 20.

Figure 5:
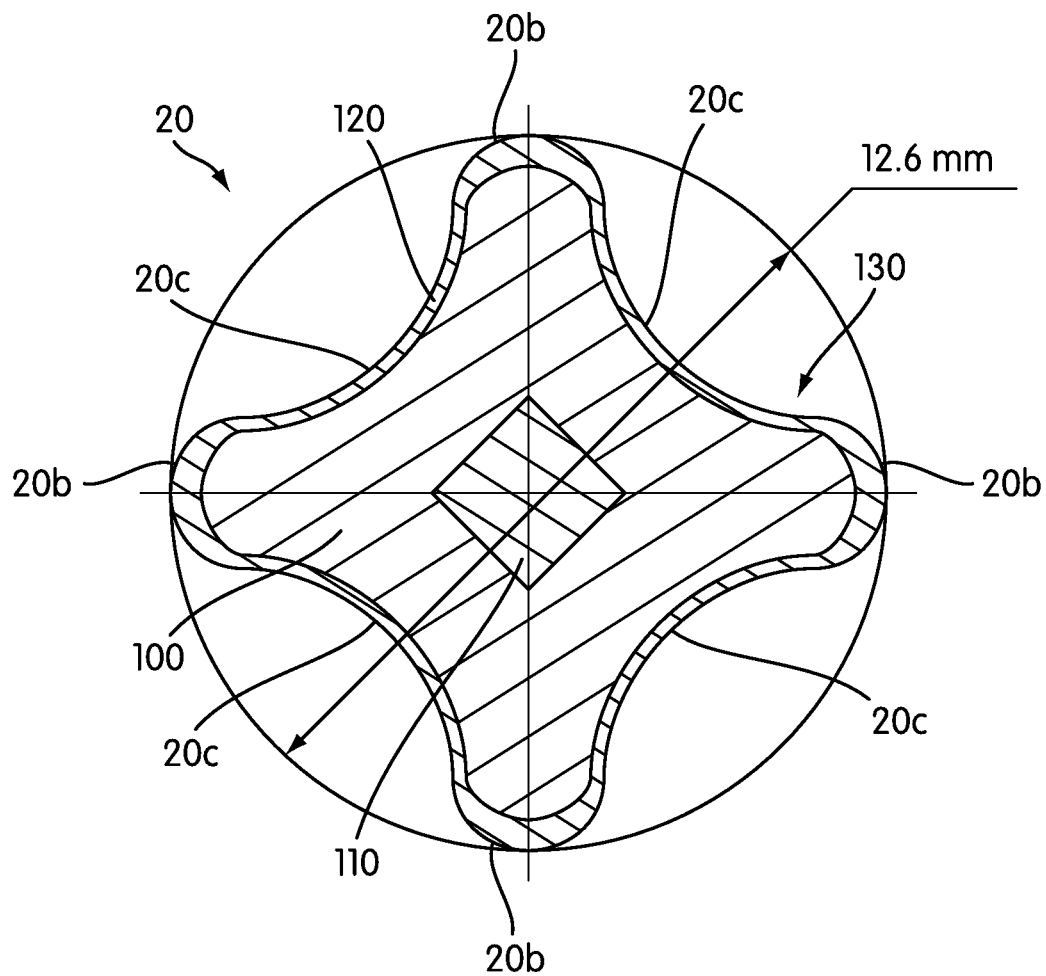
FIG. 5 is a cross-sectional view of the fuel element in FIG. 3.

FIGS. 4 and 5 illustrate an individual fuel element/rod 20 of the assembly 10. As shown in FIG. 5, the elongated central portion of the fuel element 20 has a four-lobed cross-section. A cross-section of the element 20 remains substantially uniform over the length of the central portion of the element 20. Each fuel element 20 has a fuel kernel 100, which includes a refractory metal and fuel material that includes fissile material.

A displacer 110 that comprises a refractory metal is placed along the longitudinal axis in the center of the fuel kernel 100. The displacer 110 helps to limit the temperature in the center of the thickest part of the fuel element 20 by displacing fissile material that would otherwise occupy such space and minimize variations in heat flux along the surface of the fuel element. According to various embodiments, the displacer 110 may be eliminated altogether.

As shown in FIG. 5, the fuel kernel 100 is enclosed by a refractory metal cladding 120. The cladding 120 is preferably thick enough, strong enough, and flexible enough to endure the radiation-induced swelling of the kernel 100 without failure (e.g., without exposing the kernel 100 to the environment outside the cladding 120). According to one or more embodiments, the entire cladding 120 is at least 0.3 mm, 0.4 mm, 0.5 mm, and/or 0.7 mm thick. According to one or more embodiments, the cladding 120 thickness is at least 0.4 mm in order to reduce a chance of swelling-based failure, oxidation based failure, and/or any other failure mechanism of the cladding 120.

The cladding 120 may have a substantially uniform thickness in the annular direction (i.e., around the perimeter of the cladding 120 as shown in the cross-sectional view of FIG. 5) and over the axial/longitudinal length of the kernel 100 (as shown in FIG. 4). Alternatively, as shown in FIG. 5, according to one or more embodiments, the cladding 120 is thicker at the tips of the lobes 20b than at the concave intersection/area 20c between the lobes 20b. For example, according to one or more embodiments, the cladding 120 at the tips of the lobes 20b is at least 10%, 20%, 30%, 40%, 50%, 60%, 70%, 80%, 90%, 100%, 125%, and/or 150% thicker than the cladding 120 at the concave intersections/areas 20c. The thicker cladding 120 at the tips of the lobes 20b provides improved wear resistance at the tips of the lobes 20b where adjacent fuel elements 20 touch each other at the self-spacing planes (discussed below).

The refractory metal used in the displacer 110, the fuel kernel 100, and the cladding 120 comprises zirconium according to one or more embodiments of the invention. As used herein, the term zirconium means pure zirconium or zirconium in combination with other alloy material(s). However, other refractory metals may be used instead of zirconium without deviating from the scope of the present invention (e.g., niobium, molybdenum, tantalum, tungsten, rhenium, titanium, vanadium, chromium, zirconium, hafnium, ruthenium, osmium, iridium, and/or other metals). As used herein, the term "refractory metal" means any metal/alloy that has a melting point above 1800 degrees Celsius (2073K).

Moreover, in certain embodiments, the refractory metal may be replaced with another non-fuel metal, e.g., aluminum. However, the use of a non-refractory non-fuel metal is best suited for reactor cores that operate at lower temperatures (e.g., small cores that have a height of about 1 meter and an electric power rating of 100 MWe or less). Refractory metals are preferred for use in cores with higher operating temperatures.

As shown in FIG. 5, the central portion of the fuel kernel 100 and cladding 120 has a four-lobed profile forming spiral spacer ribs 130. The displacer 110 may also be shaped so as to protrude outwardly at the ribs 130 (e.g., corners of the square displacer 110 are aligned with the ribs 130). According to alternative embodiments of the present invention, the fuel elements 20 may have greater or fewer numbers of ribs 130 without deviating from the scope of the present invention. For example, as generally illustrated in FIG. 5 of U.S. Patent Application Publication No. 2009/0252278 A1, a fuel element may have three ribs/lobes, which are preferably equally circumferentially spaced from each other. The number of lobes/ribs 130 may depend, at least in part, on the shape of the fuel assembly 10. For example, a four-lobed element 20 may work well with a square cross-sectioned fuel assembly 10 (e.g., as is used in the AP-1000). In contrast, a three-lobed fuel element may work well with a hexagonal fuel assembly (e.g., as is used in the VVER).

Figure 9:
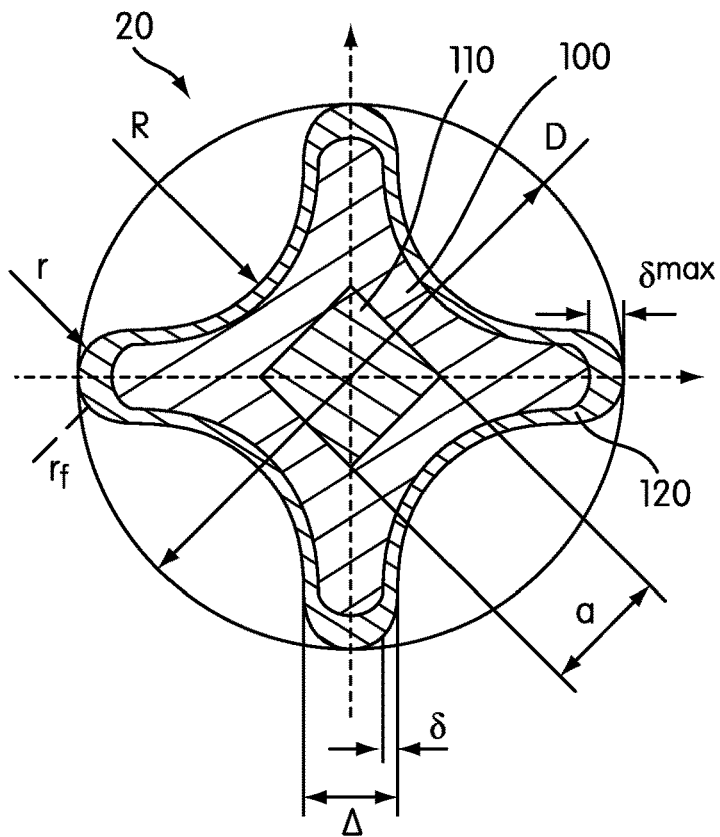
FIG. 9 is a cross-sectional view of the fuel element in FIG. 3.

FIG. 9 illustrates various dimensions of the fuel element 20 according to one or more embodiments. According to one or more embodiments, any of these dimensions, parameters and/or ranges, as identified in the below table, can be increased or decreased by up to 5%, 10%, 15%, 20%, 25%, 30%, 40%, 50%, or more without deviating from the scope of the present invention.

| Fuel Element 20 Parameter | Symbol | Example Values | Unit |
|---|---|---|---|
| Circumscribed diameter | D | 9-14 (e.g., 12.3, 12.4, 12.5, 12.6) | mm |
| Lobe thickness | $\Delta$ | 2.5-3.8 (e.g., 2.5, 2.6, 2.7, 2.8, 2.9, 3.0, 3.1, 3.2, 3.3, 3.4, 3.5, 3.6, 3.7, 3.8), variable | mm |
| Minimum cladding thickness | $\delta$ | 0.4-1.2 (e.g., 0.4, 0.5, 0.6, 0.7, 0.8, 0.9, 1.0, 1.1, 1.2) | mm |
| Cladding thickness at the lobe | $\delta^{max}$ | 0.4-2.2 (e.g., 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2), 1.5$\delta$, 2$\delta$, 2.5$\delta$ | mm |
| Average cladding thickness |  | 0.4-1.8 (e.g., 0.4, 0.5, 0.6, 0.7, 0.8, 0.9, 1.0, 1.1, 1.2, 1.3, 1.4, 1.5, 1.6, 1.7, 1.8), at least 0.4, 0.5, or 0.6 | mm |
| Curvature radius of cladding at lobe periphery | r | $\Delta/2$, $\Delta/1.9$, variable | mm |
| Curvature radius of fuel kernel at lobe periphery | $r_f$ | 0.5-2.0 (e.g., 0.5, 0.6, 0.7, 0.8, 0.9, 1.0, 1.1, 1.2, 1.3, 1.4, 1.5, 1.6, 1.7, 1.8, 1.9, 2.0), ($\Delta$-2$\delta$)/2, variable | mm |
| Radius of curvature between adjacent lobes | R | 2-5 (e.g., 2, 3, 4, 5), variable | mm |
| Central displacer side length | a | 1.5-3.5 (e.g., 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5) | mm |
| Fuel element perimeter |  | 25-60 (e.g., 25, 30, 35, 40, 45, 50, 55, 60) | mm |
| Fuel element area |  | 50-100 (e.g., 50, 60, 70, 80, 90, 100) | mm$^2$ |
| Fuel kernel area, mm$^2$ |  | 30-70 (e.g., 30, 40, 50, 60, 70) | mm$^2$ |
| Enrichment |  | $\leq 19.7$ | w/o |
| U fraction |  | $\leq 25$ | v/o |

As shown in FIG. 5, the displacer 110 has a cross-sectional shape of a square regular quadrilateral with the corners of the square regular quadrilateral being aligned with the ribs 130. The displacer 110 forms a spiral that follows the spiral of the ribs 130 so that the corners of the displacer 110 remain aligned with the ribs 130 along the axial length of the fuel kernel 100. In alternative embodiments with greater or fewer ribs 130, the displacer 110 preferably has the cross-sectional shape of a regular polygon having as many sides as the element 20 has ribs.

Figure 6:
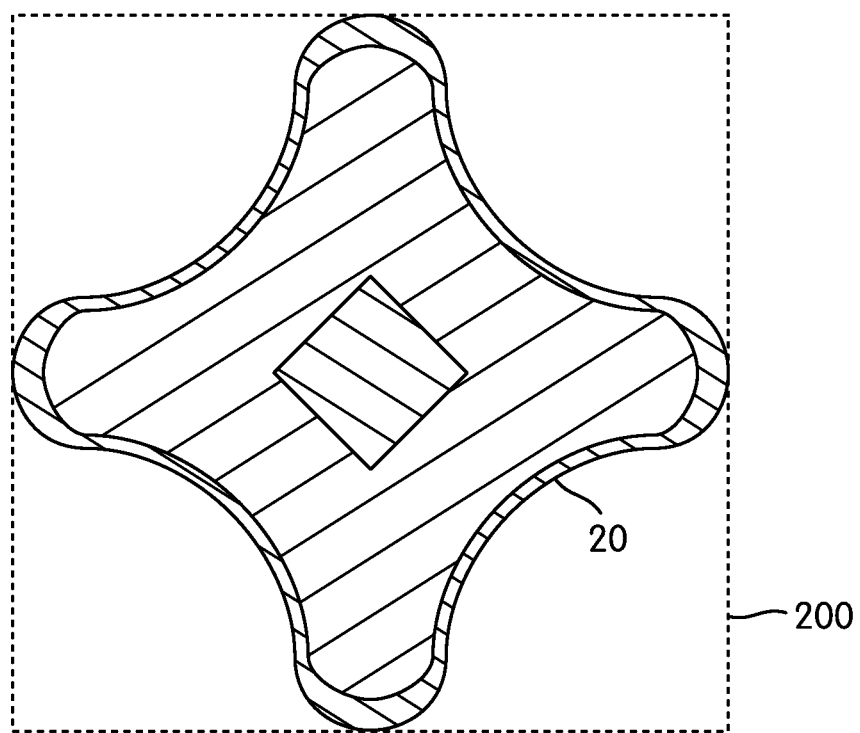
FIG. 6 is a cross-sectional view of the fuel element in FIG. 3, circumscribed within a regular polygon.

As shown in FIG. 6, the cross-sectional area of the central portion of the element 20 is preferably substantially smaller than the area of a square 200 in which the tip of each of the ribs 130 is tangent to one side of the square 200. In more generic terms, the cross-sectional area of an element 20 having n ribs is preferably smaller than the area of a regular polygon having n sides in which the tip of each of the ribs 130 is tangent to one side of the polygon. According to various embodiments, a ratio of the area of the element 20 to the area of the square (or relevant regular polygon for elements 20 having greater or fewer than four ribs 130) is less than 0.7, 0.6, 0.5, 0.4, 0.35, 0.3. As shown in FIG. 1, this area ratio approximates how much of the available space within the shroud 30 is taken up by the fuel elements 20, such that a lower ratio means that more space is advantageously available for coolant, which also acts as a neutron moderator and which increases the moderator-to-fuel ratio (important for neutronics), reduces hydraulic drag, and increases the heat transfer from the elements 20 to the coolant. According to various embodiments, the resulting moderator to fuel ratio is at least 2.0, 2.25, 2.5, 2.75, and/or 3.0 (as opposed to 1.96 when conventional cylindrical uranium oxide rods are used). Similarly, according to various embodiments, the fuel assembly 10 flow area is increased by over 16% as compared to the use of one or more conventional fuel assemblies that use cylindrical uranium oxide rods. The increased flow area may decrease the coolant pressure drop through the assembly 10 (relative to conventional uranium oxide assemblies), which may have advantages with respect to pumping coolant through the assembly 10.

As shown in FIG. 4, the element 20 is axially elongated. In the illustrated embodiment, each element 20 is a full-length element and extends the entire way from lower tie plate 70 at or near the bottom of the assembly 10 to the upper tie plate 80 at or near the top of the assembly 10. According to various embodiments and reactor designs, this may result in elements 20 that are anywhere from 1 meter long (for compact reactors) to over 4 meters long. Thus, for typical reactors, the elements 20 may be between 1 and 5 meters long. However, the elements 20 may be lengthened or shortened to accommodate any other sized reactor without deviating from the scope of the present invention.

While the illustrated elements 20 are themselves full length, the elements 20 may alternatively be segmented, such that the multiple segments together make a full length element. For example, 4 individual 1 meter element segments 20 may be aligned end to end to effectively create the full-length element. Additional tie plates 70, 80 may be provided at the intersections between segments to maintain the axial spacing and arrangement of the segments.

According to one or more embodiments, the fuel kernel 100 comprises a combination of a refractory metal/alloy and fuel material. The refractory metal/alloy may comprise a zirconium alloy. The fuel material may comprise low enriched uranium (e.g., U235, U233), plutonium, or thorium combined with low enriched uranium as defined below and/or plutonium. As used herein, "low enriched uranium" means that the whole fuel material contains less than 20% by weight fissile material (e.g., uranium-235 or uranium-233). According to various embodiments, the uranium fuel material is enriched to between 1% and 20%, 5% and 20%, 10% and 20%, and/or 15% and 20% by weight of uranium-235. According to one or more embodiments, the fuel material comprises 19.7% enriched uranium-235.

According to various embodiments, the fuel material may comprise a 3-10%, 10-40%, 15-35%, and/or 20-30% volume fraction of the fuel kernel 100. According to various embodiments, the refractory metal may comprise a 60-99%, 60-97%, 70-97%, 60-90%, 65-85%, and/or 70-80% volume fraction of the fuel kernel 100. According to one or more embodiments, volume fractions within one or more of these ranges provide an alloy with beneficial properties as defined by the material phase diagram for the specified alloy composition. The fuel kernel 100 may comprise a Zr—U alloy that is a high-alloy fuel (i.e., relatively high concentration of the alloy constituent relative to the uranium constituent) comprised of either δ-phase $UZr_2$, or a combination of δ-phase $UZr_2$ and α-phase Zr. According to one or more embodiments, the δ-phase of the U—Zr binary alloy system may range from a zirconium composition of approximately 65-81 volume percent (approximately 63 to 80 atom percent) of the fuel kernel 100. One or more of these embodiments have been found to result in low volumetric, irradiation-induced swelling of the fuel element 20. According to one or more such embodiments, fission gases are entrained within the metal kernel 100 itself, such that one or more embodiments of the fuel element 20 can omit a conventional gas gap from the fuel element 20. According to one or more embodiments, such swelling may be significantly less than would occur if low alloy (α-phase only) compositions were used (e.g., at least 10%, 20%, 30%, 50%, 75%, 100%, 200%, 300%, 500%, 1000%, 1200%, 1500%, or greater reduction in volume percent swelling per atom percent burnup than if a low alloy α-phase U-10Zr fuel was used). According to one or more embodiments of the present invention, irradiation-induced swelling of the fuel element 20 or kernel 100 thereof may be less than 20, 15, 10, 5, 4, 3, and/or 2 volume percent per atom percent burnup. According to one or more embodiments, swelling is expected to be around one volume percent per atom percent burnup.

According to one or more alternative embodiments of the present invention, the fuel kernel is replaced with a plutonium-zirconium binary alloy with the same or similar volume percentages as with the above-discussed U—Zr fuel kernels 100, or with different volume percentages than with the above-discussed U—Zr fuel kernels 100. For example, the plutonium fraction in the kernel 100 may be substantially less than a corresponding uranium fraction in a corresponding uranium-based kernel 100 because plutonium typically has about 60-70% weight fraction of fissile isotopes, while LEU uranium has 20% or less weight fraction of fissile U-235 isotopes. According to various embodiments, the plutonium volume fraction in the kernel 100 may be less than 15%, less than 10%, and/or less than 5%, with the volume fraction of the refractory metal being adjusted accordingly.

The use of a high-alloy kernel 100 according to one or more embodiments of the present invention may also result in the advantageous retention of fission gases during irradiation. Oxide fuels and low-alloy metal fuels typically exhibit significant fission gas release that is typically accommodated by the fuel design, usually with a plenum within the fuel rod to contain released fission gases. The fuel kernel 100 according to one or more embodiments of the present invention, in contrast, does not release fission gases. This is in part due to the low operating temperature of the fuel kernel 100 and the fact that fission gas atoms (specifically Xe and Kr) behave like solid fission products. Fission gas bubble formation and migration along grain boundaries to the exterior of the fuel kernel 100 does not occur according to one or more embodiments. At sufficiently high temperatures according to one or more embodiments, small (a few micron diameter) fission gas bubbles may form. However, these bubbles remain isolated within the fuel kernel 100 and do not form an interconnected network that would facilitate fission gas release, according to one or more embodiments of the present invention. The metallurgical bond between the fuel kernel 100 and cladding 120 may provide an additional barrier to fission gas release.

According to various embodiments, the fuel kernel 100 (or the cladding 120 or other suitable part of the fuel element 20) of one or more of the fuel elements 20 can be alloyed with a burnable poison such as gadolinium, boron, erbium or other suitable neutron absorbing material to form an integral burnable poison fuel element. Different fuel elements 20 within a fuel assembly 10 may utilize different burnable poisons and/or different amounts of burnable poison. For example, some of fuel elements 20 of a fuel assembly 10 (e.g., less than 75%, less than 50%, less than 20%, 1-15%, 1-12%, 2-12%, etc.) may include kernels 100 with 25, 20, and/or 15 weight percent or less Gd (e.g., 1-25 weight percent, 1-15 weight percent, 5-15 weight percent, etc.). Other fuel elements 20 of the fuel assembly 10 (e.g., 10-95%, 10-50%, 20-50%, a greater number of the fuel elements 20 than the fuel elements 20 that utilize Gd) may include kernels 100 with 10 or 5 weight percent or less Er (e.g., 0.1-10.0 weight percent, 0.1 to 5.0 weight percent etc.).

According to various embodiments, the burnable poison displaces the fuel material (rather than the refractory metal) relative to fuel elements 20 that do not include burnable poison in their kernels 100. For example, according to one embodiment of a fuel element 20 whose kernel 100 would otherwise include 65 volume percent zirconium and 35 volume percent uranium in the absence of a poison, the fuel element 20 includes a kernel 100 that is 16.5 volume percent Gd, 65 volume percent zirconium, and 18.5 volume percent uranium. According to one or more other embodiments, the burnable poison instead displaces the refractory metal, rather than the fuel material. According to one or more other embodiments, the burnable poison in the fuel kernel 100 displaces the refractory metal and the fuel material proportionally. Consequently, according to various of these embodiments, the burnable poison within the fuel kernel 100 may be disposed in the δ-phase of $UZr_2$ or α-phase of Zr such that the presence of the burnable poison does not change the phase of the $UZr_2$ alloy or Zr alloy in which the burnable poison is disposed.

Fuel elements 20 with a kernel 100 with a burnable poison may make up a portion (e.g., 0-100%, 1-99%, 1-50%, etc.)

of the fuel elements 20 of one or more fuel assemblies 10 used in a reactor core. For example, fuel elements 20 with burnable poison may be positioned in strategic locations within the fuel assembly lattice of the assembly 10 that also includes fuel elements 20 without burnable poison to provide power distribution control and to reduce soluble boron concentrations early in the operating cycle. Similarly, select fuel assemblies 10 that include fuel elements 20 with burnable poison may be positioned in strategic locations within the reactor core relative to assemblies 10 that do not include fuel elements 20 with burnable poison to provide power distribution control and to reduce soluble boron concentrations early in the operating cycle. The use of such integral burnable absorbers may facilitate the design of extended operating cycles.

Alternatively and/or additionally, separate non-fuel bearing burnable poison rods may be included in the fuel assembly 10 (e.g., adjacent to fuel elements 20, in place of one or more fuel elements 20, inserted into guide tubes in fuel assemblies 10 that do not receive control rods, etc.). In one or more embodiments, such non-fuel burnable poison rods can be designed into a spider assembly similar to that which is used in the Babcock and Wilcox or Westinghouse designed reactors (referred to as burnable poison rod assemblies (BPRA)). These then may be inserted into the control rod guide tubes and locked into select fuel assemblies 10 where there are no control banks for the initial cycle of operation for reactivity control. When the burnable poison cluster is used it may be removed when the fuel assembly is relocated for the next fuel cycle. According to an alternative embodiment in which the separate non-fuel bearing burnable poison rods are positioned in place of one or more fuel elements 20, the non-fuel burnable poison rods remain in the fuel assembly 10 and are discharged along with other fuel elements 20 when the fuel assembly 10 reaches its usable life.

The fuel elements 20 are manufactured via powder-metallurgy co-extrusion. Typically, the powdered refractory metal and powdered metal fuel material (as well as the powdered burnable poison, if included in the kernel 100) for the fuel kernel 100 are mixed, the displacer 110 blank is positioned within the powder mixture, and then the combination of powder and displacer 110 is pressed and sintered into fuel core stock/billet (e.g., in a mold that is heated to varying extents over various time periods so as to sinter the mixture). The displacer 110 blank may have the same or similar cross-sectional shape as the ultimately formed displacer 110. Alternatively, the displacer 110 blank may have a shape that is designed to deform into the intended cross-sectional shape of the displacer 110 upon extrusion. The fuel core stock (including the displacer 110 and the sintered fuel kernel 100 material) is inserted into a hollow cladding 120 tube that has a sealed tube base and an opening on the other end. The opening on the other end is then sealed by an end plug made of the same material as the cladding to form a billet. The billet may be cylindrically shaped, or may have a shape that more closely resembles the ultimate cross-sectional shape of the element 20, for example, as shown in FIGS. 5 and 9. The billet is then co-extruded under temperature and pressure through a die set to create the element 20, including the finally shaped kernel 100, cladding 110, and displacer 120. According to various embodiments that utilize a non-cylindrical displacer 110, the billet may be properly oriented relative to the extrusion press die so that corners of the displacer 110 align with the lobes 20b of the fuel element 20. The extrusion process may be done by either direct extrusion (i.e., moving the billet through a stationary die) or indirect extrusion (i.e., moving the die toward a stationary billet). The process results in the cladding 120 being metallurgically bonded to the fuel kernel 100, which reduces the risk of delamination of the cladding 120 from the fuel kernel 100. The tube and end plug of the cladding 120 metallurgically bond to each other to seal the fuel kernel 100 within the cladding 120. The high melting points of refractory metals used in the fuel elements 10 tend to make powder metallurgy the method of choice for fabricating components from these metals.

According to one or more alternative embodiments, the fuel core stock of the fuel elements 20 may be manufactured via casting instead of sintering. Powdered or monolithic refractory metal and powdered or monolithic fuel material (as well as the powdered burnable poison, if included in the kernel 100) may be mixed, melted, and cast into a mold. The mold may create a displacer-blank-shaped void in the cast kernel 100 such that the displacer 110 blank may be inserted after the kernel 100 is cast, in the same manner that the cladding 120 is added to form the billet to be extruded. The remaining steps for manufacturing the fuel elements 20 may remain the same as or similar to the above-discuss embodiment that utilizes sintering instead of casting. Subsequent extrusion results in metallurgical bonding between the displacer 110 and kernel 100, as well as between the kernel 100 and cladding 120.

According to one or more alternative embodiments, the fuel elements 20 are manufactured using powdered ceramic fuel material instead of powdered metal fuel material. The remaining manufacturing steps may be the same as discussed above with respect to the embodiments using powdered metal fuel material. In various metal fuel embodiments and ceramic fuel embodiments, the manufacturing process may result in a fuel kernel 100 comprising fuel material disposed in a matrix of metal non-fuel material. In one or more of the metal fuel embodiments, the resulting fuel kernel 100 comprises a metal fuel alloy kernel comprising an alloy of the metal fuel material and the matrix of metal non-fuel material (e.g., a uranium-zirconium alloy). In one or more of the ceramic fuel embodiments, the kernel 100 comprises ceramic fuel material disposed in (e.g., interspersed throughout) the matrix of metal non-fuel material. According to various embodiments, the ceramic fuel material used in the manufacturing process may comprise powdered uranium or plutonium oxide, powdered uranium or plutonium nitride, powdered uranium or plutonium carbide, powdered uranium or plutonium hydride, or a combination thereof. In contrast with conventional $UO_2$ fuel elements in which $UO_2$ pellets are disposed in a tube, the manufacturing process according to one or more embodiments of the present invention results in ceramic fuel being disposed in a solid matrix of non-fuel material (e.g., a zirconium matrix).

As shown in FIG. 4, the axial coiling pitch of the spiral ribs 130 is selected according to the condition of placing the axes of adjacent fuel elements 10 with a spacing equal to the width across corners in the cross section of a fuel element and may be 5% to 20% of the fuel element 20 length. According to one embodiment, the pitch (i.e., the axial length over which a lobe/rib makes a complete rotation) is about 21.5 cm, while the full active length of the element 20 is about 420 cm. As shown in FIG. 3, stability of the vertical arrangement of the fuel elements 10 is provided: at the bottom—by the lower tie plate 70; at the top—by the upper tie plate 80; and relative to the height of the core—by the shroud 30. As shown in FIG. 1, the fuel elements 10 have a circumferential orientation such that the lobed profiles of any two adjacent fuel elements 10 have a common plane of symmetry which passes through the axes of the two adjacent fuel elements 10 in at least one cross section of the fuel element bundle.

As shown in FIG. 1, the helical twist of the fuel elements 20 in combination with their orientation ensures that there exists one or more self-spacing planes. As shown in FIG. 1, in such self spacing planes, the ribs of adjacent elements 20 contact each other to ensure proper spacing between such elements 20. Thus, the center-to-center spacing of elements 20 will be about the same as the corner-to-corner width of each element 20 (12.6 mm in the element illustrated in FIG. 5). Depending on the number of lobes 20b in each fuel element 20 and the relative geometrical arrangement of the fuel elements 20, all adjacent fuel elements 20 or only a portion of the adjacent fuel elements 20 will contact each other. For example, in the illustrated four-lobed embodiment, each fuel element 20 contacts all four adjacent fuel elements 20 at each self-spacing plane. However, in a three-lobed fuel element embodiment in which the fuel elements are arranged in a hexagonal pattern, each fuel element will only contact three of the six adjacent fuel elements in a given self-spacing plane. The three-lobed fuel element will contact the other three adjacent fuel elements in the next axially-spaced self-spacing plane (i.e., ⅙ of a turn offset from the previous self-spacing plane).

In an n-lobed element 20 in which n fuel elements are adjacent to a particular fuel element 20, a self-spacing plane will exist every 1/n helical turn (e.g., every ¼ helical turn for a four-lobed element 20 arranged in a square pattern such that four other fuel elements 20 are adjacent to the fuel element 20; every ⅓ helical turn for a three-lobed element in which three fuel elements are adjacent to the fuel element (i.e., every 120 degrees around the perimeter of the fuel element)). The pitch of the helix may be modified to create greater or fewer self-spacing planes over the axial length of the fuel elements 20. According to one embodiment, each four-lobed fuel element 20 includes multiple twists such that there are multiple self-spacing planes over the axial length of the bundle of fuel elements 20.

In the illustrated embodiment, all of the elements 20 twist in the same direction. However, according to an alternative embodiment, adjacent elements 20 may twist in opposite directions without deviating from the scope of the present invention.

The formula for the number of self-spacing planes along the fuel rod length is as follows:

$N=n*L/h$, where:

L—Fuel rod length
n—Number of lobes (ribs) and the number of fuel elements adjacent to a fuel element
h—Helical twist pitch The formula is slightly different if the number of lobes and the number of fuel elements adjacent to a fuel element are not the same.

As a result of such self-spacing, the fuel assembly 10 may omit spacer grids that may otherwise have been necessary to assure proper element spacing along the length of the assembly 10. By eliminating spacer grids, coolant may more freely flow through the assembly 10, which advantageously increases the heat transfer from the elements 20 to the coolant. However, according to alternative embodiments of the present invention, the assembly 10 may include spacer grid(s) without deviating from the scope of the present invention.

As shown in FIG. 3, the shroud 30 forms a tubular shell that extends axially along the entire length of the fuel elements 20 and surrounds the elements 20. However, according to an alternative embodiment of the present invention, the shroud 30 may comprise axially-spaced bands, each of which surrounds the fuel elements 20. One or more such bands may be axially aligned with the self-spacing planes. Axially extending corner supports may extend between such axially spaced bands to support the bands, maintain the bands' alignment, and strengthen the assembly. Alternatively and/or additionally, holes may be cut into the otherwise tubular/polygonal shroud 30 in places where the shroud 30 is not needed or desired for support. Use of a full shroud 30 may facilitate greater control of the separate coolant flows through each individual fuel assembly 10. Conversely, the use of bands or a shroud with holes may facilitate better coolant mixing between adjacent fuel assemblies 10, which may advantageously reduce coolant temperature gradients between adjacent fuel assemblies 10.

As shown in FIG. 1, the cross-sectional perimeter of the shroud 30 has a shape that accommodates the reactor in which the assembly 10 is used. In reactors such as the AP-1000 that utilize square fuel assemblies, the shroud has a square cross-section. However, the shroud 30 may alternatively take any suitable shape depending on the reactor in which it is used (e.g., a hexagonal shape for use in a VVER reactor (e.g., as shown in FIG. 1 of U.S. Patent Application Publication No. 2009/0252278 A1).

The guide tubes 40 provide for the insertion of control absorber elements based on boron carbide ($B_4C$), silver indium cadmium (Ag, In, Cd), dysprosium titanate ($Dy_2O_3.TiO_2$) or other suitable alloys or materials used for reactivity control (not shown) and burnable absorber elements based on boron carbide, gadolinium oxide ($Gd_2O_3$) or other suitable materials (not shown) and are placed in the upper nozzle 50 with the capability of elastic axial displacement. The guide tubes 40 may comprise a zirconium alloy. For example, the guide tube 40 arrangement shown in FIG. 1 is in an arrangement used in the AP-1000 reactor (e.g., 24 guide tubes arranged in two annular rows at the positions shown in the 17×17 grid).

The shape, size, and features of the frame 25 depend on the specific reactor core for which the assembly 10 is to be used. Thus, one of ordinary skill in the art would understand how to make appropriately shaped and sized frame for the fuel assembly 10. For example, the frame 25 may be shaped and configured to fit into a reactor core of a conventional nuclear power plant in place of a conventional uranium oxide or mixed oxide fuel assembly for that plant's reactor core. The nuclear power plant may comprise a reactor core design that was in actual use before 2010 (e.g., 2, 3 or 4-loop PWRs; BWR-4). Alternatively, the nuclear power plant may be of an entirely new design that is specifically tailored for use with the fuel assembly 10.

As explained above, the illustrated fuel assembly 10 is designed for use in an AP-1000 or EPR reactor. The assembly includes a 17×17 array of fuel elements 20, 24 of which are replaced with guide tubes 40 as explained above for a total of 265 fuel elements 20 in EPR or 264 fuel elements 20 in AP-1000 (in the AP-1000, in addition to the 24 fuel elements being replaced with the guide tubes, a central fuel element is also replaced with an instrumented tube).

The elements 20 preferably provide 100% of the overall fissile material of the fuel assembly 10. Alternatively, some of the fissile material of the assembly 10 may be provided via fuel elements other than the elements 20 (e.g., non-lobed fuel elements, uranium oxide elements, elements having fuel ratios and/or enrichments that differ from the elements 20). According to various such alternative embodiments, the fuel elements 20 provide at least 50%, 60%, 70%, 75%, 80%, 85%, 90%, and/or 95% by volume of the overall fissile material of the fuel assembly 10.

Use of the metal fuel elements 20 according to one or more embodiments of the present invention facilitate various advantages over the uranium oxide or mixed oxide fuel conventionally used in light water nuclear reactors (LWR) (including boiling water reactors and pressurized water reactors) such as the Westinghouse-designed AP-1000, AREVA-designed EPR reactors, or GE-designed ABWR. For example, according to one or more embodiments, the power rating for an LWR operating on standard uranium oxide or mixed oxide fuel could be increased by up to about 30% by substituting the all-metal fuel elements 20 and/or fuel assembly 10 for standard uranium oxide fuel and fuel assemblies currently used in existing types of LWRs or new types of LWRs that have been proposed.

One of the key constraints for increasing power rating of LWRs operating on standard uranium oxide fuel has been the small surface area of cylindrical fuel elements that such fuel utilizes. A cylindrical fuel element has the lowest surface area to volume ratio for any type of fuel element cross-section profile. Another major constraint for standard uranium oxide fuel has been a relatively low burnup that such fuel elements could possibly reach while still meeting acceptable fuel performance criteria. As a result, these factors associated with standard uranium oxide or mixed oxide fuel significantly limit the degree to which existing reactor power rating could be increased.

One or more embodiments of the all-metal fuel elements 20 overcome the above limitations. For example, as explained above, the lack of spacer grids may reduce hydraulic resistance, and therefore increase coolant flow and heat flux from the elements 20 to the primary coolant. The helical twist of the fuel elements 20 may increase coolant intermixing and turbulence, which may also increase heat flux from the elements 20 to the coolant.

Preliminary neutronic and thermal-hydraulic analyses have shown the following according to one or more embodiments of the present invention:

The thermal power rating of an LWR reactor could be increased by up to 30.7% or more (e.g., the thermal power rating of an EPR reactor could be increased from 4.59 GWth to 6.0 GWth).

With a uranium volume fraction of 25% in the uranium-zirconium mixture and uranium-235 enrichment of 19.7%, an EPR reactor core with a four-lobe metallic fuel element 20 configuration could operate for about 500-520 effective full power days (EFPDs) at the increased thermal power rating of 6.0 GWth if 72 fuel assemblies were replaced per batch (once every 18 months) or 540-560 EFPDs if 80 fuel assemblies were replaced per batch (once every 18 months).

Due to the increased surface area in the multi-lobe fuel element, even at the increased power rating of 6.0 GWth, the average surface heat flux of the multi-lobe fuel element is shown to be 4-5% lower than that for cylindrical uranium oxide fuel elements operating at the thermal power rating of 4.59 GWth. This could provide an increased safety margin with respect to critical heat flux (e.g., increased departure from nucleate boiling margin in PWRs or maximum fraction limiting critical power ratio in BWRs). Further, this could allow a possibility of using 12 fuel elements per assembly with burnable poisons. Burnable poisons could be used to remove excess reactivity at the beginning of cycle or to increase the Doppler Effect during the heat-up of the core.

Thus, the fuel assemblies 10 may provide greater thermal power output at a lower fuel operating temperature than conventional uranium oxide or mixed oxide fuel assemblies.

To utilize the increased power output of the assembly 10, conventional power plants could be upgraded (e.g., larger and/or additional coolant pumps, steam generators, heat exchangers, pressurizers, turbines). Indeed, according to one or more embodiments, the upgrade could provide 30-40% more electricity from an existing reactor. Such a possibility may avoid the need to build a complete second reactor. The modification cost may quickly pay for itself via increased electrical output. Alternatively, new power plants could be constructed to include adequate features to handle and utilize the higher thermal output of the assemblies 10.

Further, one or more embodiments of the present invention could allow an LWR to operate at the same power rating as with standard uranium oxide or mixed oxide fuel using existing reactor systems without any major reactor modifications. For example, according to one embodiment:

An EPR would have the same power output as if conventional uranium-oxide fuel were used: 4.59 GWt;

With a uranium volume fraction of 25% in the uranium-zirconium mixture and uranium-235 enrichment of approximately 15%, an EPR reactor core with a four-lobe metallic fuel element 20 configuration could operate for about 500-520 effective full power days (EFPDs) if 72 fuel assemblies were replaced per batch or 540-560 EFPDs if 80 fuel assemblies were replaced per batch.

The average surface heat flux for the elements 20 is reduced by approximately 30% compared to that for cylindrical rods with conventional uranium oxide fuel (e.g., 39.94 v. 57.34 W/cm$^2$). Because the temperature rise of the coolant through the assembly 10 (e.g., the difference between the inlet and outlet temperature) and the coolant flow rate through the assembly 10 remain approximately the same relative to conventional fuel assemblies, the reduced average surface heat flux results in a corresponding reduction in the fuel rod surface temperature that contributes to increased safety margins with respect to critical heat flux (e.g., increased departure from nucleate boiling margin in PWRs or maximum fraction limiting critical power ratio in BWRs).

Additionally and/or alternatively, fuel assemblies 10 according to one or more embodiments of the present invention can be phased/laddered into a reactor core in place of conventional fuel assemblies. During the transition period, fuel assemblies 10 having comparable fissile/neutronic/thermal outputs as conventional fuel assemblies can gradually replace such conventional fuel assemblies over sequential fuel changes without changing the operating parameters of the power plant. Thus, fuel assemblies 10 can be retrofitted into an existing core that may be important during a transition period (i.e., start with a partial core with fuel assemblies 10 and gradually transition to a full core of fuel assemblies 10).

Moreover, the fissile loading of assemblies 10 can be tailored to the particular transition desired by a plant operator. For example, the fissile loading can be increased appropriately so as to increase the thermal output of the reactor by anywhere from 0% to 30% or more higher, relative to the use of conventional fuel assemblies that the assemblies 10 replace. Consequently, the power plant operator can chose the specific power uprate desired, based on the existing plant infrastructure or the capabilities of the power plant at various times during upgrades.

One or more embodiments of the fuel assemblies 10 and fuel elements 20 may be used in fast reactors (as opposed to light water reactors) without deviating from the scope of the present invention. In fast reactors, the non-fuel metal of the fuel kernel 100 is preferably a refractory metal, for example a molybdenum alloy (e.g., pure molybdenum or a combination of molybdenum and other metals), and the cladding 120 is preferably stainless steel (which includes any alloy variation thereof) or other material suitable for use with coolant in such reactors (e.g., sodium). Such fuel elements 20 may be manufactured via the above-discussed co-extrusion process or may be manufactured by any other suitable method (e.g., vacuum melt).

Figure 7A:
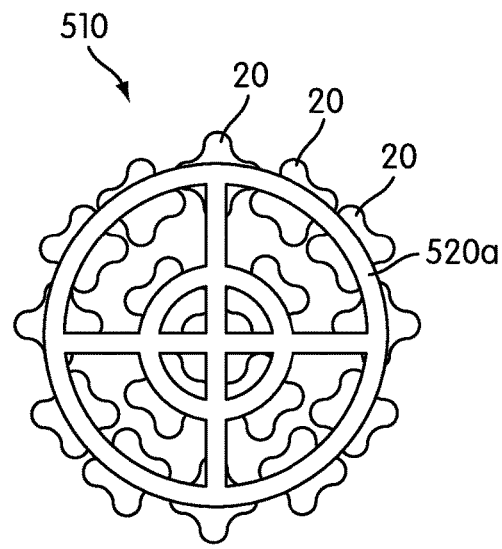
FIG. 7A is an end view of another fuel assembly, for use in a pressurized heavy water reactor.
Figure 7B:
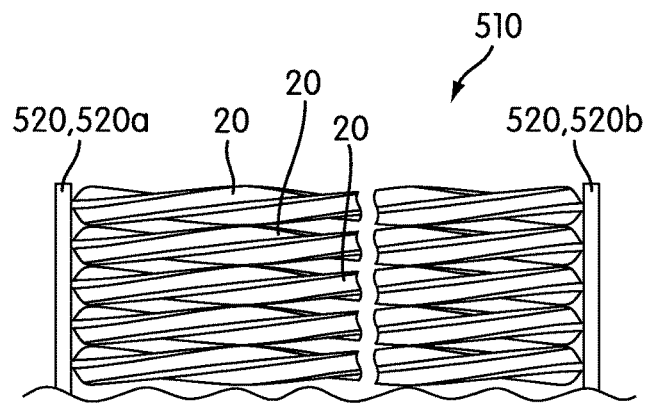
FIG. 7B is a partial side view of the fuel assembly of FIG. 7A.
Figure 8:
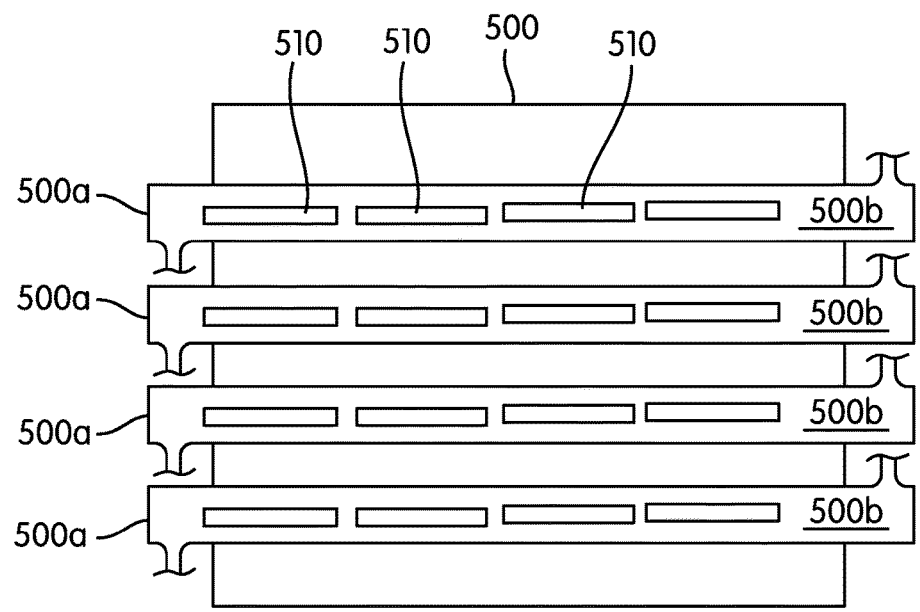
FIG. 8 is a diagram of a pressurized heavy water reactor using the fuel assembly illustrated in FIGS. 7A and 7B

As shown in FIGS. 7A, 7B, and 8, fuel assemblies 510 accordingly to one or more embodiments of the present invention may be used in a pressurized heavy water reactor 500 (see FIG. 8) such as a CANDU reactor.

As shown in FIGS. 7A and 7B, the fuel assembly 510 comprises a plurality of fuel elements 20 mounted to a frame 520. The frame 520 comprises two end plates 520a, 520b that mount to opposite axial ends of the fuel elements 20 (e.g., via welding, interference fits, any of the various types of attachment methods described above for attaching the elements 20 to the lower tie plate 70). The elements 20 used in the fuel assembly 510 are typically much shorter than the elements 20 used in the assembly 10. According to various embodiments and reactors 500, the elements 20 and assemblies 510 used in the reactor 500 may be about 18 inches long.

The elements 20 may be positioned relative to each other in the assembly 510 so that self-spacing planes maintain spacing between the elements 20 in the manner described above with respect to the assembly 10. Alternatively, the elements 20 of the assembly 510 may be so spaced from each other that adjacent elements 20 never touch each other, and instead rely entirely on the frame 520 to maintain element 20 spacing. Additionally, spacers may be attached to the elements 20 or their ribs at various positions along the axial length of the elements 20 to contact adjacent elements 20 and help maintain element spacing 20 (e.g., in a manner similar to how spacers are used on conventional fuel rods of conventional fuel assemblies for pressurized heavy water reactors to help maintain rod spacing).

As shown in FIG. 8, the assemblies 510 are fed into calandria tubes 500a of the reactor 500 (sometimes referred to in the art as a calandria 500). The reactor 500 uses heavy water 500b as a moderator and primary coolant. The primary coolant 500b circulates horizontally through the tubes 500a and then to a heat exchanger where heat is transferred to a secondary coolant loop that is typically used to generate electricity via turbines. Fuel assembly loading mechanisms (not shown) are used to load fuel assemblies 510 into one side of the calandria tubes 500a and push spent assemblies 510 out of the opposite side of the tubes 500a, typically while the reactor 500 is operating.

The fuel assemblies 510 may be designed to be a direct substitute for conventional fuel assemblies (also known as fuel bundles in the art) for existing, conventional pressurized heavy water reactors (e.g., CANDU reactors). In such an embodiment, the assemblies 510 are fed into the reactor 500 in place of the conventional assemblies/bundles. Such fuel assemblies 510 may be designed to have neutronic/thermal properties similar to the conventional assemblies being replaced. Alternatively, the fuel assemblies 510 may be designed to provide a thermal power uprate. In such uprate embodiments, new or upgraded reactors 500 can be designed to accommodate the higher thermal output.

According to various embodiments of the present invention, the fuel assembly 10 is designed to replace a conventional fuel assembly of a conventional nuclear reactor. For example, the fuel assembly 10 illustrated in FIG. 1 is specifically designed to replace a conventional fuel assembly that utilizes a 17×17 array of $UO_2$ fuel rods. If the guide tubes 40 of the assembly 10 are left in the exact same position as they would be for use with a conventional fuel assembly, and if all of the fuel elements 20 are the same size, then the pitch between fuel elements/rods remains unchanged between the conventional $UO_2$ fuel assembly and one or more embodiments of the fuel assembly 10 (e.g., 12.6 mm pitch). In other words, the longitudinal axes of the fuel elements 20 may be disposed in the same locations as the longitudinal axes of conventional $UO_2$ fuel rods would be in a comparable conventional fuel assembly. According to various embodiments, the fuel elements 20 may have a larger circumscribed diameter than the comparable $UO_2$ fuel rods (e.g., 12.6 mm as compared to an outer diameter of 9.5 mm for a typical $UO_2$ fuel rod). As a result, in the self-aligning plane illustrated in FIG. 1, the cross-sectional length and width of the space occupied by the fuel elements 20 may be slightly larger than that occupied by conventional $UO_2$ fuel rods in a conventional fuel assembly (e.g., 214.2 mm for the fuel assembly 10 (i.e., 17 fuel elements 20×12.6 mm circumscribed diameter per fuel element), as opposed to 211.1 mm for a conventional $UO_2$ fuel assembly that includes a 17×17 array of 9.5 min $UO_2$ fuel rods separated from each other by a 12.6 mm pitch). In conventional $UO_2$ fuel assemblies, a spacer grid surrounds the fuel rods, and increases the overall cross-sectional envelope of the conventional fuel assembly to 214 mm×214 mm. In the fuel assembly 10, the shroud 30 similarly increases the cross-sectional envelope of the fuel assembly 10. The shroud 30 may be any suitable thickness (e.g., 0.5 mm or 1.0 mm thick). In an embodiment that utilizes a 1.0 mm thick shroud 30, the overall cross-sectional envelope of an embodiment of the fuel assembly 10 may be 216.2 mm×216.2 mm (e.g., the 214 mm occupied by the 17 12.6 mm diameter fuel elements 20 plus twice the 1.0 mm thickness of the shroud 30). As a result, according to one or more embodiments of the present invention, the fuel assembly 10 may be slightly larger (e.g., 216.2 mm×216.2 mm) than a typical $UO_2$ fuel assembly (214 mm×214 mm). The larger size may impair the ability of the assembly 10 to properly fit into the fuel assembly positions of one or more conventional reactors, which were designed for use with conventional $UO_2$ fuel assemblies. To accommodate this size change, according to one or more embodiments of the present invention, a new reactor may be designed and built to accommodate the larger size of the fuel assemblies 10.

According to an alternative embodiment of the present invention, the circumscribed diameter of all of the fuel elements 20 may be reduced slightly so as to reduce the overall cross-sectional size of the fuel assembly 10. For example, the circumscribed diameter of each fuel element 20 may be reduced by 0.13 mm to 12.47 mm, so that the overall cross-sectional space occupied by the fuel assembly 10 remains comparable to a conventional 214 mm by 214 mm fuel assembly (e.g., 17 12.47 mm diameter fuel elements 20 plus two 1.0 mm thickness of the shroud, which totals about 214 mm). Such a reduction in the size of the 17 by 17 array will slightly change the positions of the guide tubes 40 in the fuel assembly 10 relative to the guide tube positions in a conventional fuel assembly. To accommodate this slight position change in the tube 40 positions, the positions of the corresponding control rod array and control rod drive mechanisms in the reactor may be similarly shifted to accommodate the repositioned guide tubes 40. Alternatively, if sufficient clearances and tolerances are provided for the control rods in a conventional reactor, conventionally positioned control rods may adequately fit into the slightly shifted tubes 40 of the fuel assembly 10.

Alternatively, the diameter of the peripheral fuel elements 20 may be reduced slightly so that the overall assembly 10 fits into a conventional reactor designed for conventional fuel assemblies. For example, the circumscribed diameter of the outer row of fuel elements 20 may be reduced by 1.1 mm such that the total size of the fuel assembly is 214 mm×214 mm (e.g., 15 12.6 mm fuel elements 20 plus 2 11.5 mm fuel elements 20 plus 2 1.0 mm thicknesses of the shroud 30). Alternatively, the circumscribed diameter of the outer two rows of fuel elements 20 may be reduced by 0.55 mm each such that the total size of the fuel assembly remains 214 mm×214 mm (e.g., 13 12.6 mm fuel elements 20 plus 4 12.05 mm fuel assemblies plus 2 1.0 mm thicknesses of the shroud 30). In each embodiment, the pitch and position of the central 13×13 array of fuel elements 20 and guide tubes 40 remains unaltered such that the guide tubes 40 align with the control rod array and control rod drive mechanisms in a conventional reactor.

Figure 10:
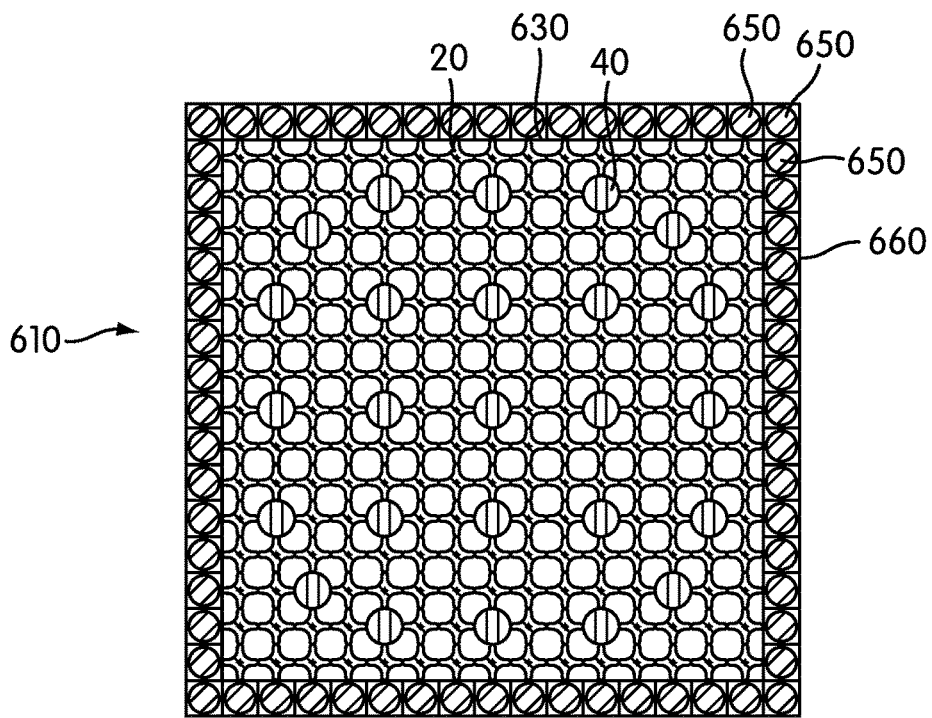
FIG. 10 is a cross-sectional view of another fuel assembly.

FIG. 10 illustrates a fuel assembly 610 according to an alternative embodiment of the present invention. According to various embodiments, the fuel assembly 610 is designed to replace a conventional $UO_2$ fuel assembly in a conventional reactor while maintaining the control rod positioning of reactors designed for use with various conventional $UO_2$ fuel assemblies. The fuel assembly 610 is generally similar to the fuel assembly 10, which is described above and illustrated in FIG. 1, but includes several differences that help the assembly 610 to better fit into one or more existing reactor types (e.g., reactors using Westinghouse's fuel assembly design that utilizes a 17 by 17 array of $UO_2$ rods) without modifying the control rod positions or control rod drive mechanisms.

As shown in FIG. 10, the fuel assembly includes a 17 by 17 array of spaces. The central 15 by 15 array is occupied by 200 fuel elements 20 and 25 guide tubes 40, as described above with respect to the similar fuel assembly 10 illustrated in FIG. 1. Depending on the specific reactor design, the central guide tube 40 may be replaced by an additional fuel element 20 if the reactor design does not utilize a central tube 40 (i.e., 201 fuel elements 20 and 24 guide tubes 40). The guide tube 40 positions correspond to the guide tube positions used in reactors designed to use conventional $UO_2$ fuel assemblies.

The peripheral positions (i.e., the positions disposed laterally outward from the fuel elements 20) of the 17 by 17 array/pattern of the fuel assembly 610 are occupied by 64 $UO_2$ fuel elements/rods 650. As is known in the art, the fuel rods 650 may comprise standard $UO_2$ pelletized fuel disposed in a hollow rod. The $UO_2$ pelletized fuel may be enriched with U-235 by less than 20%, less than 15%, less than 10%, and/or less than 5%. The rods 650 may have a slightly smaller diameter (e.g., 9.50 mm) than the circumscribed diameter of the fuel elements 20, which slightly reduces the overall cross-sectional dimensions of the fuel assembly 610 so that the assembly 610 better fits into the space allocated for a conventional $UO_2$ fuel assembly.

In the illustrated embodiment, the fuel rods/elements 650 comprise $UO_2$ pelletized fuel. However, the fuel rods/elements 650 may alternatively utilize any other suitable combination of one or more fissile and/or fertile materials (e.g., thorium, plutonium, uranium-235, uranium-233, any combinations thereof). Such fuel rods/elements 650 may comprise metal and/or oxide fuel.

According to one or more alternative embodiments, the fuel rods 650 may occupy less than all of the 64 peripheral positions. For example, the fuel rods 650 may occupy the top row and left column of the periphery, while the bottom row and right column of the periphery may be occupied by fuel elements 20. Alternatively, the fuel rods 650 may occupy any other two sides of the periphery of the fuel assembly. The shroud 630 may be modified so as to enclose the additional fuel elements 20 in the periphery of the fuel assembly. Such modified fuel assemblies may be positioned adjacent each other such that a row/column of peripheral fuel elements 650 in one assembly is always adjacent to a row/column of fuel elements 20 in the adjacent fuel assembly. As a result, additional space for the fuel assemblies is provided by the fact that the interface between adjacent assemblies is shifted slightly toward the assembly that includes fuel elements 650 in the peripheral, interface side. Such a modification may provide for the use of a greater number of higher heat output fuel elements 20 than is provided by the fuel assemblies 610.

A shroud 630 surrounds the array of fuel elements 20 and separates the elements 20 from the elements 650. The nozzles 50, 60, shroud 630, coolant passages formed therebetween, relative pressure drops through the elements 20 and elements 650, and/or the increased pressure drop through the spacer grid 660 (discussed below) surrounding the elements 650 may result in a higher coolant flow rate within the shroud 630 and past the higher heat output fuel elements 20 than the flow rate outside of the shroud 630 and past the relatively lower heat output fuel rods 650. The passageways and/or orifices therein may be designed to optimize the relative coolant flow rates past the elements 20, 650 based on their respective heat outputs and designed operating temperatures.

According to various embodiments, the moderator:fuel ratio for the fuel elements 20 of the fuel assembly 610 is less than or equal to 2.7, 2.6, 2.5, 2.4, 2.3, 2.2, 2.1, 2.0, 1.9, and/or 1.8. In the illustrated embodiment, the moderator:fuel ratio equals a ratio of (1) the total area within the shroud 630 available for coolant/moderator (e.g., approximated by the total cross-sectional area within the shroud 630 minus the total cross-sectional area taken up by the fuel elements 20 (assuming the guide tubes 40 are filled with coolant)) to (2) the total cross-sectional area of the kernels 100 of the fuel elements 20 within the shroud 630.

According to an alternative embodiment of the invention, the shroud 630 may be replaced with one or more annular bands or may be provided with holes in the shroud 630, as explained above. The use of bands or holes in the shroud 630 may facilitate cross-mixing of coolant between the fuel elements 20 and the fuel elements 650.

As shown in FIG. 10, the fuel elements 650 are disposed within an annular spacer grid 660 that is generally comparable to the outer part of a spacer grid used in a conventional $UO_2$ fuel assembly. The spacer grid 660 may rigidly connect to the shroud 630 (e.g., via welds, bolts, screws, or other fasteners). The spacer grid 660 is preferably sized so as to provide the same pitch between the fuel elements 650 and the fuel elements 20 as is provided between the central fuel elements 20 (e.g., 12.6 mm pitch between axes of all fuel elements 20, 650). To provide such spacing, the fuel elements 650 may be disposed closer to the outer side of the spacer grid 660 than to the shroud 630 and inner side of the spacer grid 660. The fuel assembly 610 and spacer grid 660 are also preferably sized and positioned such that the same pitch is provided between fuel elements 650 of adjacent fuel assemblies (e.g., 12.6 mm pitch). However, the spacing between any of the fuel elements 20, 650 may vary relative to the spacing between other fuel elements 20, 650 without deviating from the scope of the present invention.

According to various embodiments, the fuel elements 20 provide at least 60%, 65%, 70%, 75%, and/or 80% of a total volume of all fissile-material-containing fuel elements 20, 650 of the fuel assembly 610. For example, according to one or more embodiments in which the fuel assembly 610 includes 201 fuel elements 20, each having a cross-sectional area of about 70 mm², and 64 fuel elements 650, each having a 9.5 mm diameter, the fuel elements 20 provide about 75.6% of a total volume of all fuel elements 20, 650 (201 fuel elements 20×70 mm² equals 14070 mm²; 64 fuel elements 650×π×(9.5/2)²=4534 mm²; fuel element 20, 650 areas are essentially proportional to fuel element volumes; (14070 mm²/(14070 mm²+4534 mm²)=75.6%)).

The height of the fuel assembly 610 matches a height of a comparable conventional fuel assembly that the assembly 610 can replace (e.g., the height of a standard fuel assembly for a Westinghouse or AREVA reactor design).

The illustrated fuel assembly 610 may be used in a 17×17 PWR such as the Westinghouse 4-loop design, AP1000, or AREVA EPR. However, the design of the fuel assembly 610 may also be modified to accommodate a variety of other reactor designs (e.g., reactor designs that utilize a hexagonal fuel assembly, in which case the outer periphery of the hexagon is occupied by UO₂ rods, while the inner positions are occupied by fuel elements 20, or boiling water reactors, or small modular reactors). While particular dimensions are described with regard to particular embodiments, a variety of alternatively dimensioned fuel elements 20, 650 and fuel assemblies 10 may be used in connection with a variety of reactors or reactor types without deviating from the scope of the present invention.

Depending on the specific reactor design, additional rod positions of a fuel assembly may be replaced with UO₂ rods. For example, while the fuel assembly 610 includes UO₂ rods only in the outer peripheral row, the assembly 610 could alternatively include UO₂ rods in the outer two rows without deviating from the scope of the present invention.

According to various embodiments, the portion of the fuel assembly 610 that supports the fuel elements 650 is inseparable from the portion of the fuel assembly 610 that supports the fuel elements 20. According to various embodiments, the fuel elements 20 are not separable as a unit from the fuel elements 650 of the fuel assembly 610 (even though individual fuel elements 20, 650 may be removed from the assembly 610, for example, based on individual fuel element failure). Similarly, there is not a locking mechanism that selectively locks the fuel element 650 portion of the fuel assembly to the fuel element 20 portion of the fuel assembly 610. According to various embodiments, the fuel elements 20 and fuel elements 650 of the fuel assembly 610 have the same designed life cycle, such that the entire fuel assembly 610 is used within the reactor, and then removed as a single spent unit.

According to various embodiments, the increased heat output of the fuel elements 20 within the fuel assembly 610 can provide a power uprate relative to the conventional all UO₂ fuel rod assembly that the assembly 610 replaces.

According to various embodiments, the power uprate is at least 5%, 10%, and/or 15%. The uprate may be between 1 and 30%, 5 and 25%, and/or 10 and 20% according to various embodiments. According to various embodiments, the fuel assembly 610 provides at least an 18-month fuel cycle, but may also facilitate moving to a 24+ or 36+ month fuel cycle. According to an embodiment of the fuel assembly 610, which uses fuel elements 20 having the example parameters discussed above with respect to the element 20 shown in FIG. 10, the assembly 17 provides a 17% uprate relative to a conventional UO₂ fuel assembly under the operating parameters identified in the below tables.

| Operating Parameter for AREVA EPR Reactor | Value | Unit |
|---|---|---|
| Reactor power | 5.37 | GWt |
| Fuel cycle length | 18 | months |
| Reload batch size | ⅓ | core |
| Enrichment of Fuel Element 20 | ≤19.7 | w/o |
| Enrichment of UO₂ of the Rods 650 | ≤5 | w/o |
| Coolant flow rate | 117% | rv |

* rv = reference value

| Fuel Assembly Parameter | Value | Unit |
|---|---|---|
| Fuel assembly design | 17 × 17 | |
| Fuel assembly pitch | 215 | mm |
| Fuel assembly envelope | 214 | mm |
| Active fuel height | 4200 | mm |
| Number of fuel rods | 265 | |
| Fuel element 20 pitch (i.e., axis to axis spacing) | 12.6 | mm |
| Average outer fuel element 20 diameter (circumscribed diameter) | 12.6 | mm |
| Average minimum fuel element 20 diameter | 10.44 | mm |
| Moderator to fuel ratio, seed region (around elements 20) | 2.36 | |
| Moderator to fuel ratio, blanket (around the fuel rods 650) | 1.9 | |

FIGS. 11-13 illustrate a fuel assembly 710 according to an alternative embodiment of the present invention. According to various embodiments, the fuel assembly 710 is designed to replace a conventional UO₂ fuel assembly in a conventional reactor while maintaining the conventional UO₂-fuel based control rod positioning of the reactor. The fuel assembly 710 is generally similar to or identical to the fuel assembly 610, except that the UO₂ rods 650 in the peripheral row of the fuel assembly 610 are replaced with metal fuel elements 730, 740. As explained below, the fuel elements 730, 740 are modified to help the assembly 710 to better fit into one or more existing reactor types (e.g., reactors using Westinghouse's fuel assembly design that utilizes a 17 by 17 array of UO₂ rods) without modifying the control rod positions, control rod drive mechanisms, or outer dimensions of the fuel assembly. The fuel elements 730, 740 define a subset of the overall fuel elements 20, 730, 740 of the fuel assembly 710, wherein the subset is disposed along an outer peripheral row/perimeter/ring of grid positions of the 17 by 17 grid pattern of the fuel assembly 710.

FIG. 11 is a partial cross-sectional view of the fuel assembly 710 shown in a self-spacing plane. The fuel elements 20, 730, 740 are arranged such that their centerline axes are disposed in a square 17 by 17 grid pattern. In the illustrated embodiment, the centerline-to-centerline spacing between any two adjacent fuel elements 20, 730, 740 in the fuel assembly 710 is preferably the same (e.g., 12.6 mm) and matches the circumscribed diameter of the fuel elements 20, 730, 740. To fit into the space envelope available in conventional reactors (e.g., the AP-1000) with conventional guide tube 40 locations, the outer sides of the fuel elements 730, 740 are laterally reduced in size so as to fit within the shroud 750. In FIG. 11, the area of lateral reduction is illustrated by dotted lines.

Figure 13A:
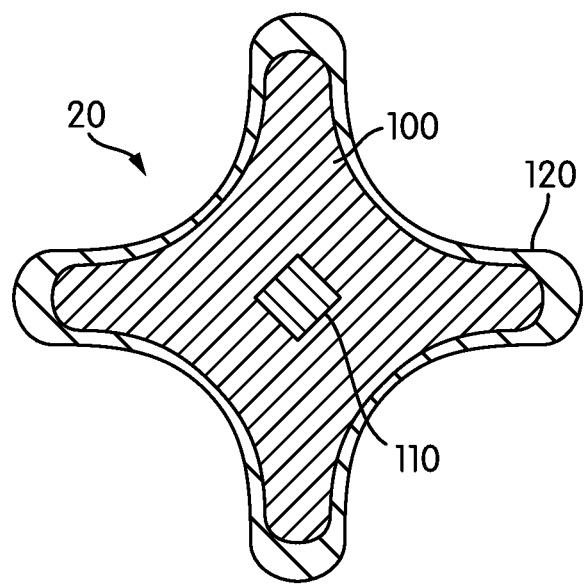
FIGS. 13A and 13B are cross-sectional views of two fuel elements of the fuel assembly in FIGS. 11 and 12.
Figure 13B:
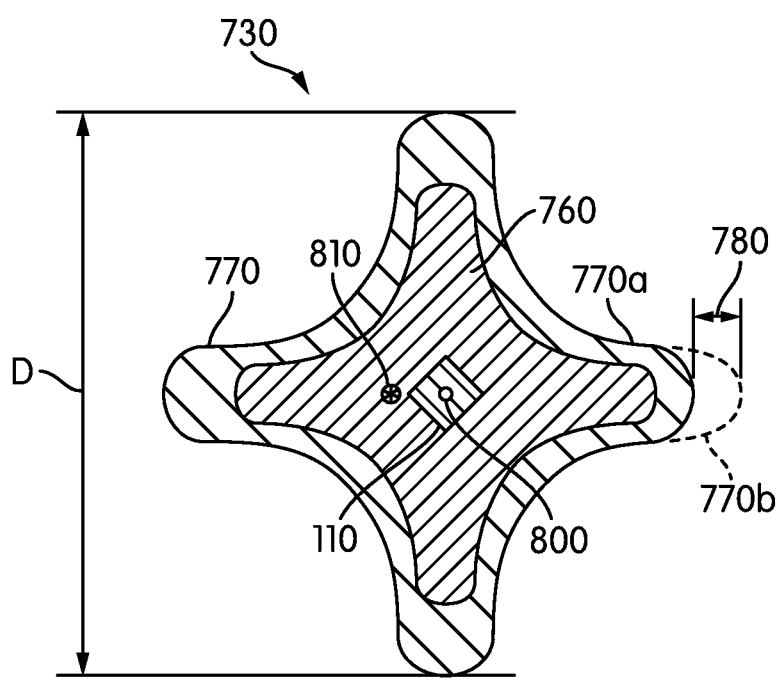

As shown in FIGS. 13A and 13B, the fuel elements 20, 730 are similar, and preferably have the same circumscribed diameter (e.g., 12.6 mm), which facilitates self-spacing between the fuel elements 20, 730. The fuel element 730 may be similar to or identical to the fuel element 20, except that: (1) the fuel kernel 760 of the fuel element 730 is smaller than the fuel kernel 100 of the fuel element 20, (2) the cladding 770 of fuel element 730 is on average thicker than the cladding 120 of the fuel element 20, and (3) one circumferential side 770a of the cladding 770 has been laterally reduced relative to other circumferential sides to remove a portion 770b of the original cladding 770.

Making the fuel kernel 760 smaller and the cladding 770 thicker enables the portion 770b of the cladding 770 to be removed while still ensuring a sufficiently thick layer of cladding 770 around the kernel 760. According to various embodiments, the cladding 700 thickness is at least 0.4, 0.5, and/or 0.6 mm throughout the fuel element 730.

The removed portion 770b is preferably removed after the fuel element 730 is formed into the spiral, lobed shape. The removed portion 770b may be removed in any suitable way (e.g., grinding, honing, milling, etc.). As a result of the spiral, the removed portion 770b will be removed from the circumferentially aligned portions on a plurality of the lobes of the fuel element 730. In other words, portions 770b of lobes of the cladding 770 are removed in the area where the lobe is disposed at the side 770a of the fuel element 730 that will be adjacent to and abut the shroud 750. Due to the helical twist of the fuel elements 730, the cladding 770 is not removed uniformly from the fuel element 730, but rather only at the tips 770a of the lobes that impinge on the assembly 710 envelope boundary, as limited by the shroud 750. According to various embodiments, a radial shortening distance 780 of the removed portion 770b may be at least 2, 3, 4, 5, 6, 7, 8, 9, and/or 10%, and/or less then 30, 20, and/or 15% of the circumscribed diameter D of the fuel element 730. According to various embodiments, the radial shortening distance 780 may be at least 0.5, 0.6, 0.7, 0.8, 0.9, 1.0, 1.1, 1.2, and/or 1.3 mm, and/or less than 4.0, 3.0, 2.0, and/or 1.5 mm.

According to alternative embodiments, the fuel element 730 may be originally formed in its final shape such that the removed portions 770b were never present and need not be removed.

As shown in FIG. 11, the corner fuel element 740 may be essentially identical to the side fuel element 730 except that two circumferentially spaced sides 770a of the cladding 770 of the fuel element 740 (rather than just one side 770a as is done in the fuel element 730) have been laterally reduced to remove portions 770b so that the fuel element 740 appropriately fits in the corner grid position of the fuel assembly 710 and abut the two orthogonal sides of the shroud 750.

Although, according to some non-limiting embodiments, the fuel kernels 760 of the fuel elements 730, 740 have a smaller volume (or area as viewed in cross-section perpendicular to the elongated, axial direction of the fuel assembly) than the kernels 100 of the fuel elements 20, the fuel kernels 730, 740 retain various other benefits provided by the fuel element 20's shape and design, as explained elsewhere herein. According to various embodiments, the fissile loading of the kernels 760 may be increased (e.g., via more highly enriched uranium) relative to the non-peripheral kernels 20 to offset for the smaller kernel 760 volume.

As shown in FIG. 13B, the removal of the removed portion 770b results in a geometric axial centerline 800 (i.e., the center of the circle that circumscribes the helically twisted shape of the fuel element 730) of the fuel elements 730, 740 being offset from the axial center of mass 810 of the fuel elements 730, 740 (and/or the axial center of mass of the cladding 770). According to various non-limiting embodiments, the offset may be at least 0.1, 0.3, 0.4, 0.5, 1.0, 2.0, 3.0, 4.0, and/or 5.0% of the circumscribed diameter D, and/or less then 30, 20, and/or 10% of the circumscribed diameter D. According to various non-limiting embodiments, an axial center of mass of the kernel 760 (see FIG. 13B) remains at the axial centerline 800 of the fuel element 730.

According to various embodiments, the fuel elements 20, 730, 740 are between 1 and 5 meters long (measured in the axial direction) and the circumscribed diameter is between 6 and 40 mm, between 6 and 30 mm, between 6 and 20 mm, between 9 and 15 mm, and/or about 12.6 mm. According to various embodiments, a ratio of the axial length of the fuel elements 730, 740 to their circumscribed diameter D is at least 10:1, 20:1, 30:1, 40:1, 50:1, 100:1, 200:1, and/or 300:1, and/or less than 1000:1.

In the self-spacing plane shown in FIG. 11, the laterally reduced down sides 770a of the fuel elements 730, 740 contact the shroud 750 to facilitate self-spacing of the fuel elements 20, 730, 740.

FIG. 12 is a cross-sectional view of the fuel assembly 710 shown in a plane that is axially disposed (e.g., along the elongated length of the fuel assembly 710) half way between two self-spacing planes. In this plane, none of the cladding 770 has been removed from the fuel elements 730, 740 because the lobes of the fuel elements 730, 740 are sufficiently spaced from the shroud 750 such that the fuel elements 730,740 fit without having material 770b removed at this axial position of the fuel elements 730, 740.

Although the fuel elements 730, 740 and fuel assembly 710 are illustrated as being designed for use in a reactor that utilizes a 17 by 17 square grid pattern fuel assembly with a specific guide tube pattern embedded therein, the fuel assembly 710 and fuel elements 20, 730, 740 may alternatively be used with a variety of other types of reactors (e.g., reactors that utilize 16 by 16 or 14 by 14 grid patterns, reactors with hexagonal fuel element grid patterns and fuel assemblies). For example, if fuel elements 20 would not properly fit into a fuel assembly for use in a reactor designed for hexagonal fuel assemblies and grid patterns, the peripheral row of the hexagonal grid of such a fuel assembly may comprise fuel elements like the fuel elements 730, 740 that have been modified so that their outer side(s) are ground down to fit in the particular required envelope, preferably without having to relocate the guide tube positions of the reactor.

FIGS. 14-20 illustrate a fuel assembly 910 according to an alternative embodiment of the present invention. According to various embodiments, the fuel assembly 910 is designed to replace a conventional UO$_2$ fuel assembly in a conventional reactor while maintaining the control rod positioning of the conventional reactor (e.g., a reactor in use as of 2012). The fuel assembly 910 is generally similar to or identical to the fuel assemblies 610, 710, except that: (1) all of the fuel elements 920a, 920b, 920c, 920d of the fuel assembly 910 are preferably geometrically identical to each other; (2) four fuel elements are removed from the peripheral row; (3) the centerlines 920a' of the fuel elements 920a in the non-corner peripheral row are shifted inwardly to form equilateral triangles with centerlines 920a' of adjacent non-corner peripheral fuel element(s) 920a and the centerline(s) 920c' of the outermost non-peripheral row of fuel element(s) 920c; and (4) the centerline 920b' of the peripheral corner fuel elements 920b is shifted inwardly relative to the fuel elements 740, 650 of the fuel assemblies 610, 710.

Figure 14:
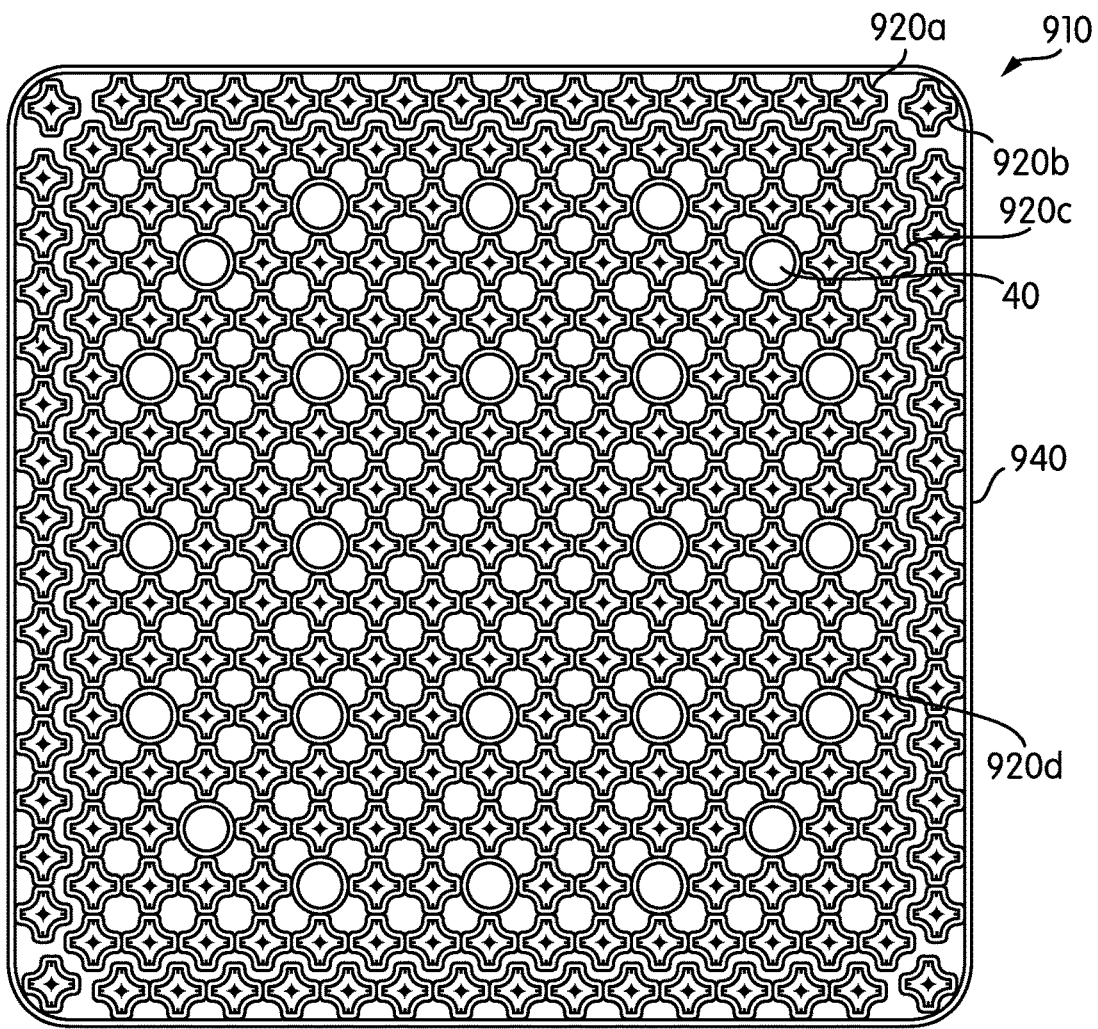
FIG. 14 is a cross-sectional view of a fuel assembly according to an alternative embodiment.

As shown in FIG. 14, all of the fuel elements 920, 920a, 920b, 920c may be geometrically identical to each other, and may all comprise fuel elements 20 as discussed above. However, the fissile loading of different ones of the fuel elements 920, 920a, 920b, 920c may be different (e.g., to level out the heat load generated across the fuel assembly 910). Each of the fuel elements 920a, 920b, 920c, 920d have the same circumscribed diameter (e.g., 12.6 mm). According to alternative embodiments, the fuel elements 920a, 920b, 920c, 920d are not geometrically identical to each other.

By shifting the outer peripheral row/subset of fuel elements 920a, 920b laterally inwardly, sufficient space is provided such that fuel elements 920a, 920b, 920c, 920d with a circumscribed diameter that is the same as the centerline-to-centerline spacing between fuel elements 920a, 920b, 920c, 920d can be used while fitting within the envelope of space provided in the above-discussed conventional reactors.

As shown in FIG. 14, the central 15 by 15 square pattern of grid positions for the central fuel elements 920c, 920d and guide tubes 40 matches the central 15 by 15 square pattern and positions of conventional fuel assemblies for the reactor.

The outer peripheral row of fuel elements 920a, 920c are shifted laterally inwardly toward the center of the fuel assembly 910. The inward shifting helps the assembly 910 to better fit into one or more existing reactor types (e.g., reactors using Westinghouse's fuel assembly design that utilizes a 17 by 17 array of $UO_2$ rods) without modifying the control rod/guide tube 40 positions, control rod drive mechanisms, or fuel assembly dimensions.

Figure 16:
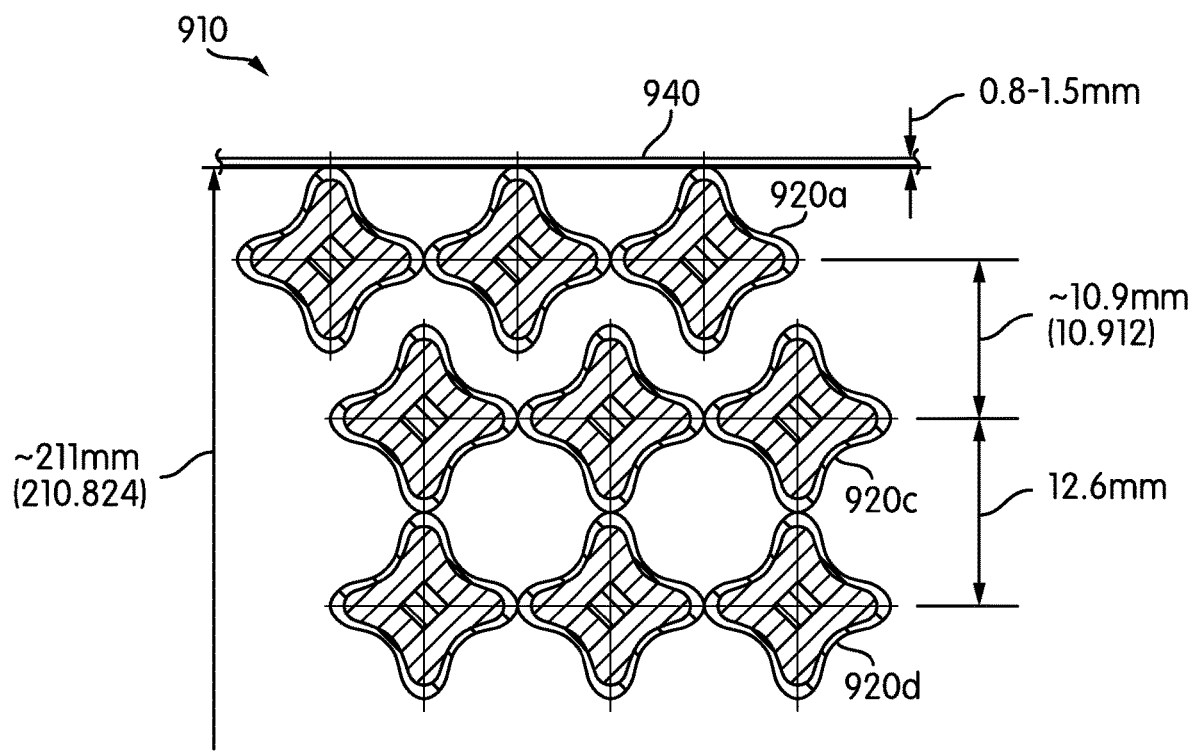
Figure 17:
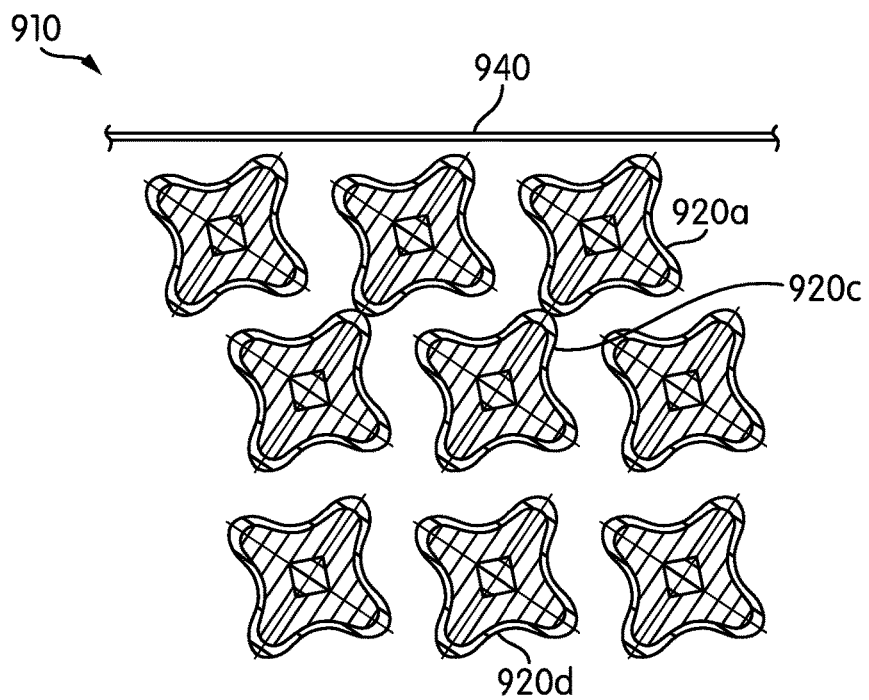
Figure 18:
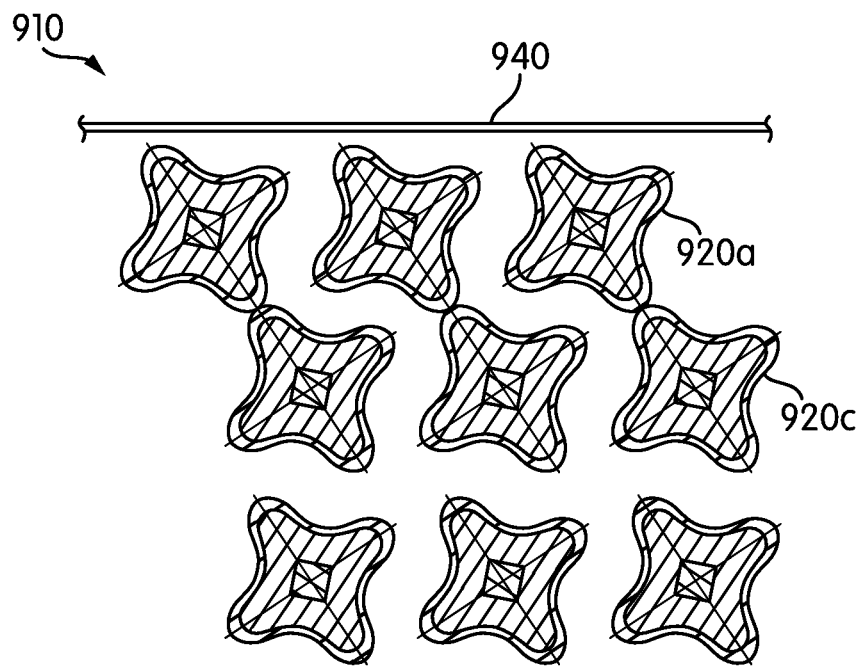

In the embodiment illustrated in FIG. 16, the 12.6 mm circumscribed diameter fuel elements 920a are shifted laterally inwardly such that a center-to-center distance between the centerlines 920a' of the fuel elements 920a and the centerlines 920c' of the fuel elements 920c are offset by about 10.9 mm as projected in the row/column grid direction of the central 15 by 15 grid pattern. Had the fuel elements 920a maintained the positions of the conventional 17 by 17 grid pattern, the offset would have been 12.6 mm, rather than 10.9 mm. The inward shifting of the fuel elements 920a results in an overall row or column width of about 211 mm (15 total 12.6 mm pitches plus 2 total 10.9 mm pitches), which fits within the about 211 mm row and column envelope within the shroud 940. When the thickness of the shroud 940 is added, the overall row and column width of the fuel assembly 910 fits within the 214 mm envelope provided by an exemplary conventional reactor into which the fuel assembly 910 is designed to fit.

Four fuel elements are omitted from the outer peripheral row/ring relative to a conventional fuel assembly so as to facilitate the inward shifting of the fuel elements 920a, 920b. In the embodiment illustrated in FIG. 14, the outer peripheral row/ring of fuel elements includes 56 fuel elements 920a and 4 fuel elements 920b for a total of 60 fuel elements. For reference, a conventional 17 by 17 fuel assembly would include 64 fuel elements in the outer peripheral row/ring of grid positions.

Figure 15:
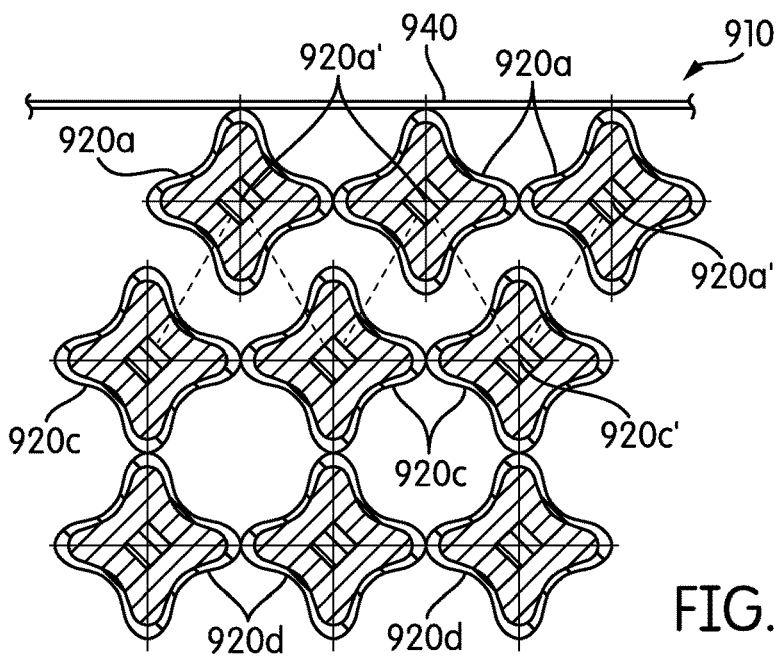
FIGS. 15-20 are partial cross-sectional views of the fuel assembly of FIG. 14.

As shown in FIG. 15, the axial centerlines 920c' of the fuel elements 920c in the next-to-peripheral row and the axial centerlines 920a' of the non-corner peripheral row fuel elements 920a form equilateral triangles in which the center-to-center distances equal the circumscribed diameter of the fuel elements 920a, 920c.

As shown in FIGS. 15-18, the fuel elements 920a, 920c and shroud 940 have a variety of different partial self-spacing planes at different axial positions along the fuel assembly 910. In the cross section shown in FIGS. 15 and 16, the fuel elements 920a abut and self-space with each other and the shroud 940. In the cross-sections shown in FIGS. 17 and 18, each fuel element 920a abuts and self-spaces with one of the fuel elements 920c. In total, as viewed in the orientation shown in FIG. 15, each fuel element 920a has a self-spacing point at: 0 degrees with the shroud 940 (shown in FIG. 15); 90 degrees and 270 degrees with adjacent fuel elements 920a (shown in FIG. 15); 150 degrees with one inner fuel element 920c (shown in FIG. 18); and 210 degrees with another inner fuel element 920c (shown in FIG. 17). This combination of partial self-spacing planes combine to provide proper self-spacing of the fuel elements 920a.

As shown in FIGS. 14 and 15, the plurality of fuel elements 920, 920a, 920c are arranged into a mixed grid pattern that comprises: (1) a first grid pattern (the middle 15 by 15 array of fuel elements 920c, 920d) made of squarely arranged rows and columns having a centerline-to-centerline distance between the rows and columns that equals the common circumscribed diameter D of the fuel elements 920a, 920b, 920c, 920d, and (2) a second grid pattern (the outer two peripheral rows made up of the fuel elements 920a, 920c) made up of equilateral triangles in which a length of each side of each triangle (i.e., the centerline-to-centerline distance between adjacent fuel elements defining the corners of each triangle) is the common circumscribed diameter D of the fuel elements 920a, 920b, 920c, 920d. Thus, the second/triangular grid pattern is different from the first/square grid pattern. According to alternative embodiments, additional and/or alternative grid patterns could also be used (e.g., rectangular grid patterns, isometric triangle patterns, parallelogram patterns, other regular repeating patterns) without deviating from the scope of the present invention.

The fuel elements 920a, 920b, 920c, 920d include non-overlapping first (the fuel elements 920d), second (the fuel elements 920a), third (the fuel elements 920c), and fourth (the fuel elements 920b) subsets. The first subset (the fuel elements 920d) are disposed within respective grid positions defined by the first/square grid pattern. The second subset (the fuel elements 920a) are disposed within respective grid positions defined by the second/triangular grid pattern. The third subset (the fuel elements 920c) are disposed within respective overlapping grid positions that each fall within both the first/square grid pattern and the second/triangular grid pattern. The fourth subset (the fuel elements 920b) are not disposed within any of the grid positions defined by the first or second grid pattern.

Figure 19:
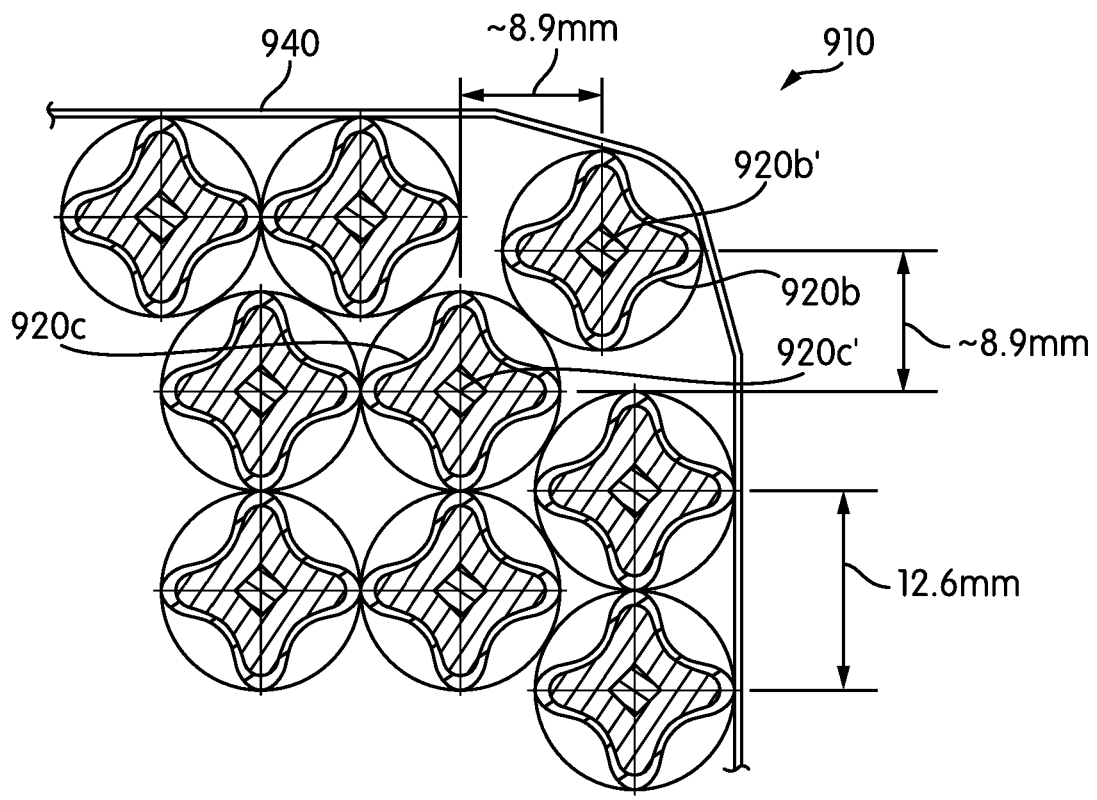
Figure 20:
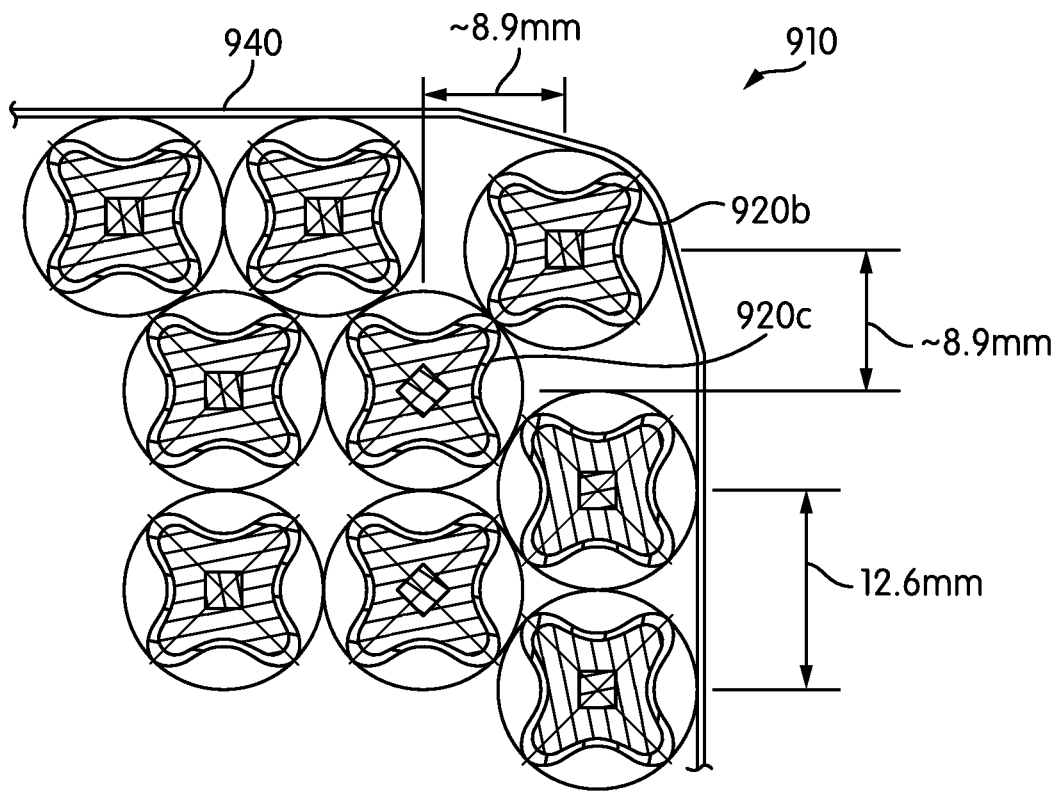

As shown in FIG. 19, the peripheral corner fuel elements 920b have a centerline 920b'-to-centerline 920c' distance of about 8.9 mm, as projected into the row and column direction. As shown in FIG. 20, for a 12.6 mm circumscribed fuel element 920b, this provides a partial self-spacing plane between the fuel element 920b and the inner, adjacent fuel element 920c at the fuel element 920b's 225 degree position. As shown in FIG. 19, the corner of the shroud 940 may be shaped to provide a two-point partial self-spacing plane between the fuel element 920c and shroud 940 at about the fuel element 920b's 0 and 90 degree positions. This combination of partial self-spacing planes combine to provide proper self-spacing of the fuel elements 920b.

While various exemplary diameters, center-to-center spacing, grid sizes, and other dimensions are described with respect to the fuel assembly 910, these exemplary values are non-limiting. Rather, those of ordinary skill in the art would understand that a variety of alternative values could be used without deviating from the scope of the present invention.

Figure 21:
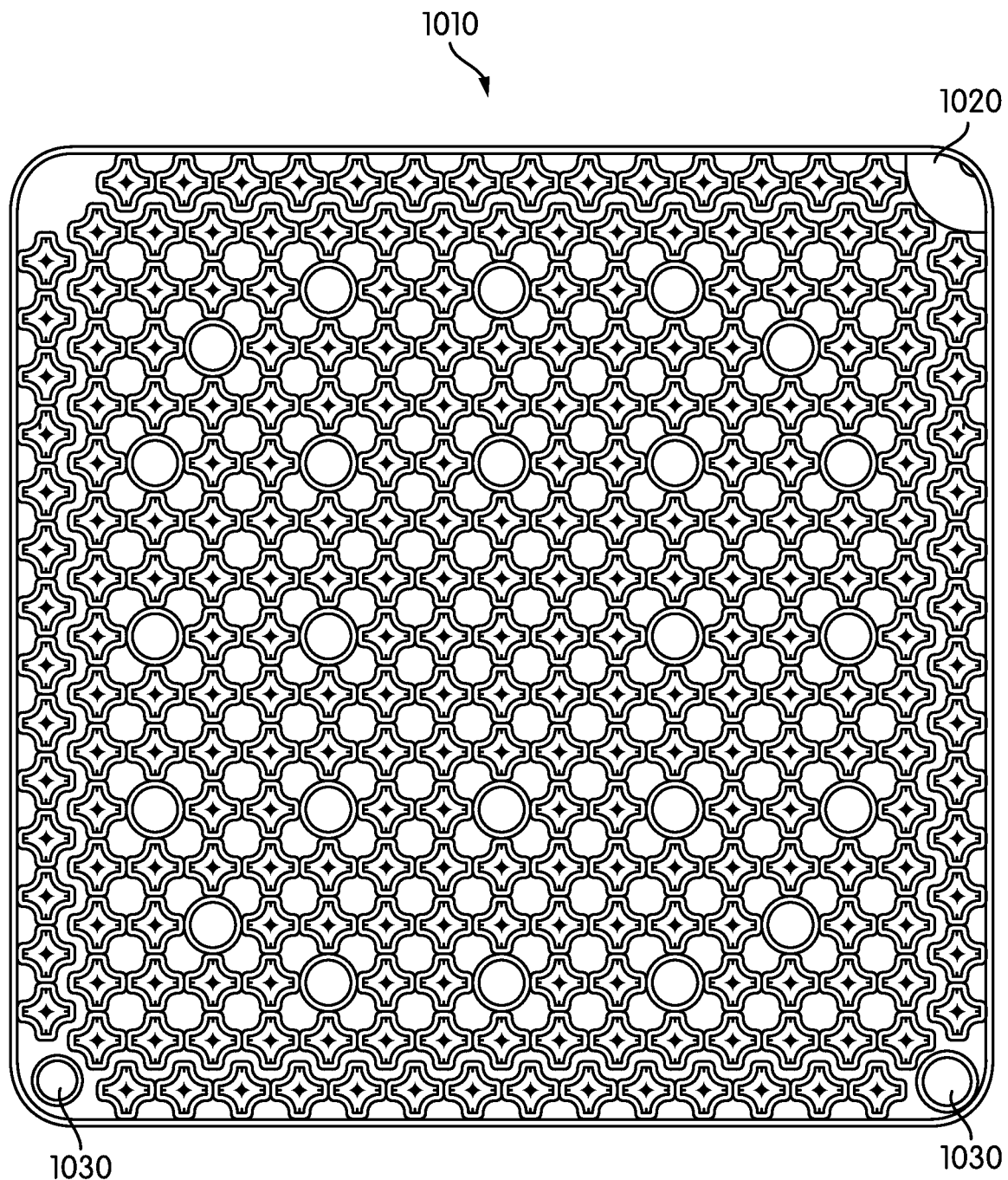
FIG. 21 is a cross-sectional view of a fuel assembly according to an alternative embodiment.

FIG. 21 illustrates a fuel assembly 1010, which is generally similar to the fuel assembly 910, except that the four outer corner fuel elements 920b present in the fuel assembly 910 are omitted and/or replaced by guide tubes 1020, 1030.

FIGS. 22-38 illustrate various embodiments of fuel assemblies 1110, 1210, 1310, 1410, 1510, 1610, 1710, 1810, 1910, 2010 that may be used in place of conventional/standard 16×16 fuel assemblies of the type described in FIGS. 39-44. Various embodiments of these assemblies 1110, 1210, 1310, 1410, 1510, 1610, 1710, 1810, 1910, 2010 are designed to replace a conventional 16×16 Combustion Engineering (CE) $UO_2$ fuel assembly in a conventional light water, PWR reactor while maintaining the control rod positioning of the conventional CE reactor (e.g., a reactor in use as of 2012).

Figure 22:
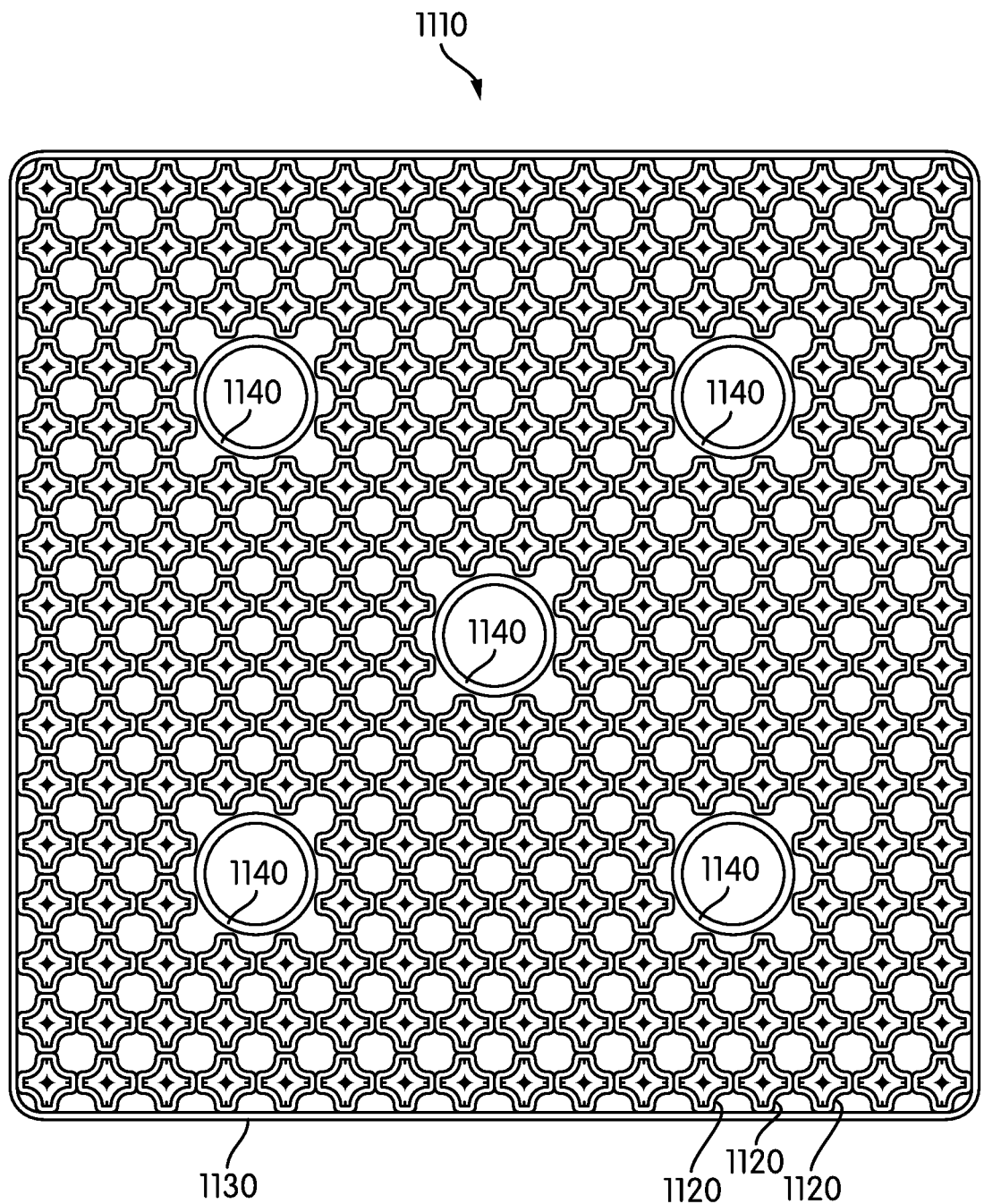
FIG. 22 is a cross-sectional view of a fuel assembly according to an alternative embodiment.

FIG. 22 illustrates a fuel assembly 1110 according to an alternative embodiment that is directed toward a 16×16 fuel assembly design. The assembly 1110 comprises 236 fuel elements 1120, which may be similar to or identical to the above-discussed elements 20, such that a redundant discussion of the common aspects of the elements 20, 1120 is omitted. According to various embodiments, all of the fuel elements 1120 of the fuel assembly 1110 are geometrically identical to each other. In the reactor space available for an assembly 1110 that replaces a conventional 16×16 assembly (e.g., as described in FIGS. 39-44), there is a relatively large initial water gap between adjacent fuel assemblies (e.g., 5.3 mm), with a fuel assembly pitch of 207.8 mm. As a result, according to various embodiments, the assembly 1110 may comprise identical or substantially identical fuel elements 1120 arranged in a square array/arrangement in all 16 rows without changing the existing positioning of the conventionally-positioned guide tubes and while maintaining the existing rod-to-rod pitch of, for example 0.506 inches (12.852 mm). According to various embodiments, the assembly 1110 includes a shroud 1130 that is generally similar to the shroud 940, but is sized for a 16×16 fuel assembly. According to various embodiments, the shroud thickness is between 0.1 and 2.0 mm, between 0.2 and 0.8 mm, between 0.3 and 0.7 mm, and/or approximately 0.48 mm. The relatively thin shroud 1130 provides sufficient spacing for the fuel elements 1120 and water gap while remaining suitably adapted for use in place of conventional 16×16 fuel assemblies. According to one or more embodiments, the assembly 1110 fits within a reactor that permits a maximum fuel assembly envelope/width of 8.134 inches (206.6 mm), with the water gap of 1.2 mm. For example, according to one or more such embodiments in which the fuel element pitch and width is 12.852 mm and the shroud 1130 is 0.48 mm thick, the width of the fuel assembly 1110 is 206.95 mm ((12.852 mm/element×16 elements)+(2×0.48 mm/shroud side)), which fits within a 206.6 mm envelope.

Figure 23:
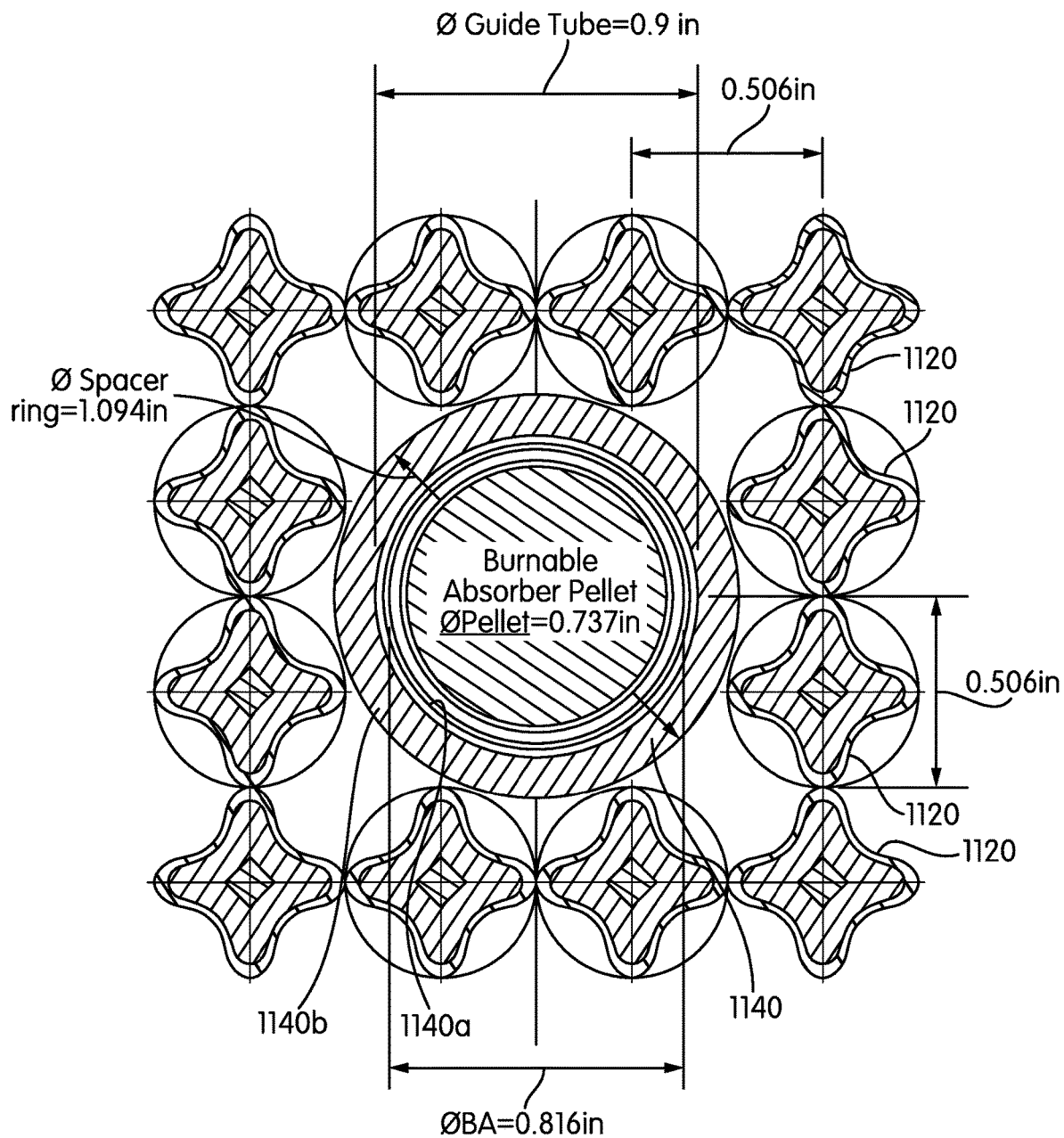
FIGS. 23-25 are partial cross-sectional views of a fuel assembly of FIG. 22.

As shown in FIG. 22, the assembly 1110 includes five guide tubes 1140 for control rods. As shown in FIG. 23, each guide tube 1140 comprises an inner guide tube portion 1140a and an outer spacer ring portion 1140b. The inner and outer portions 1140a, 1140b may be integrally formed, or may be separately formed and attached to each other. According to various embodiments, an inner diameter of the inner guide tube portion 1140a is slightly larger than an outside diameter of control rod tube to be inserted therein. For example, according to various embodiments, the inside diameter of the inner guide tube portion 1140a is about 0.9 inches, and is configured to accommodate therein a control rod that has an outside diameter of 0.816 inches and contains burnable absorber/poison material (e.g., having a diameter of 0.737 inches).

Figure 24:
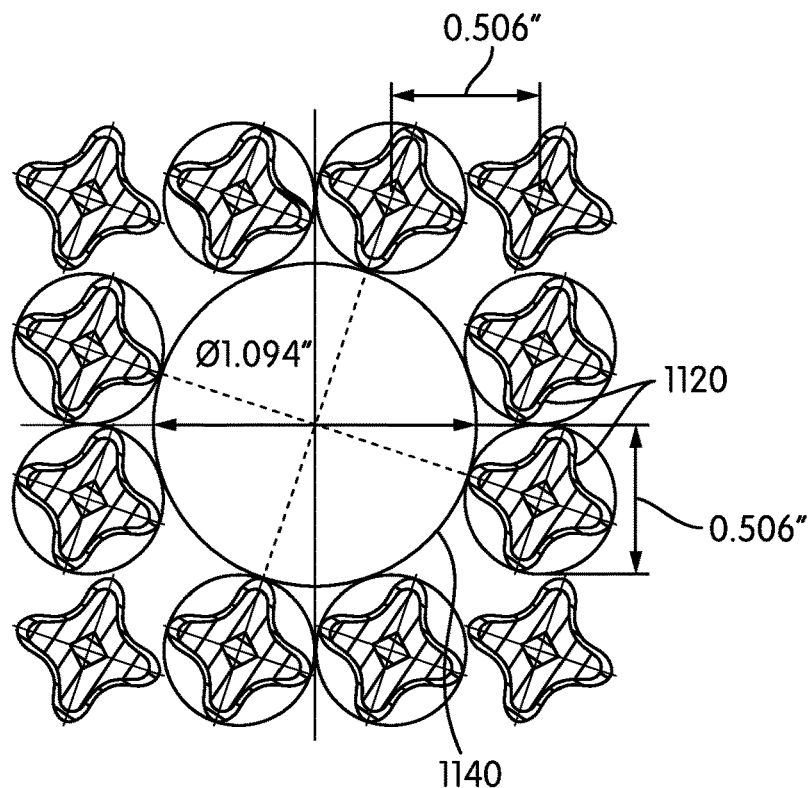
Figure 25:
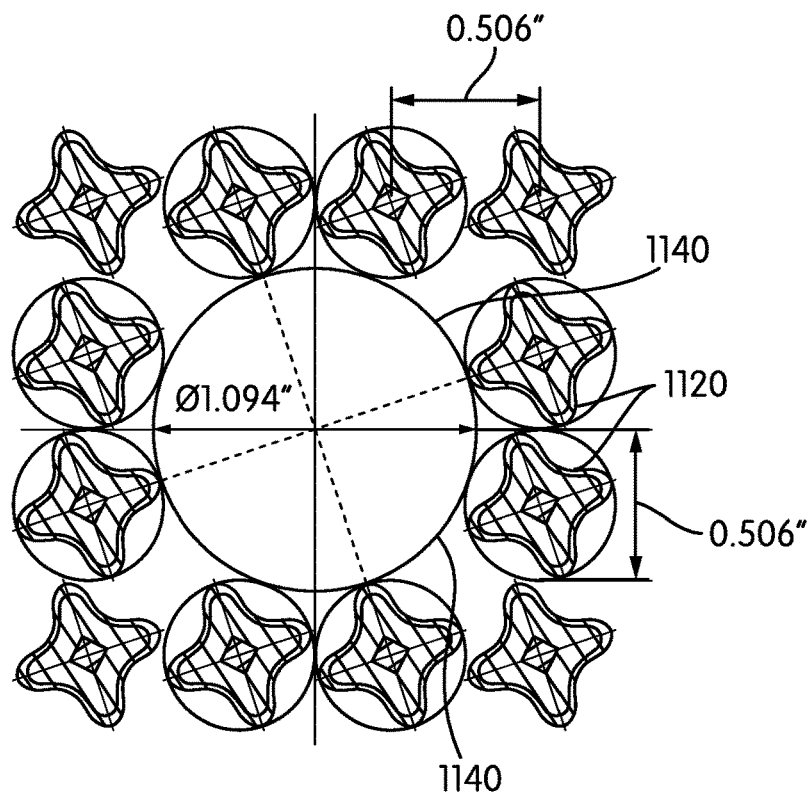

As shown in FIG. 23, the outer spacer ring portion 1140b has an outer diameter that abuts the circles (shown in FIG. 23) defined by the outer diameter of the fuel elements 1120 and define the outer extents of the fuel elements 1120 over the spiral twist of the fuel elements 1120. For example, in an embodiment in which the fuel elements 1120 have an outer diameter of 0.506 inches and the guide tube 1140 has an outer diameter of 1.094 inches, the circumscribed circles have a 0.506 inch diameter and are centered on the centerline position of the grid/array position of the respective fuel elements 1120. Consequently, the eight fuel elements 1120 that are in the rows and columns adjacent to the guide tube 1140 abut the guide tube 1140 at a variety of positions along the axial length of each fuel element 1120 (e.g., one fuel-element-to-guide-tube contact point for each of the four ribs for each full 360 degree twist of the fuel element 1120). FIGS. 24 and 25 illustrate the cross-sections in which different combinations of four adjacent fuel elements 1120 abut the guide tube 1140. If the cross-section illustrated in FIG. 23 is considered a home or 0 degree position, FIG. 24 illustrates a cross-section in a plane in which the fuel elements 1120 are rotated/twisted clockwise by about 18° (i.e., a plane that is offset from the home/0 position plane by about 1/20 of a full 360° twist of the element 1120). Similarly, FIG. 25 illustrates a cross-section that is offset from the home/0 position plane by a 72° twist of the elements 1120 and about 1/5 of a full 360° twist of the element 120.

Figure 30:
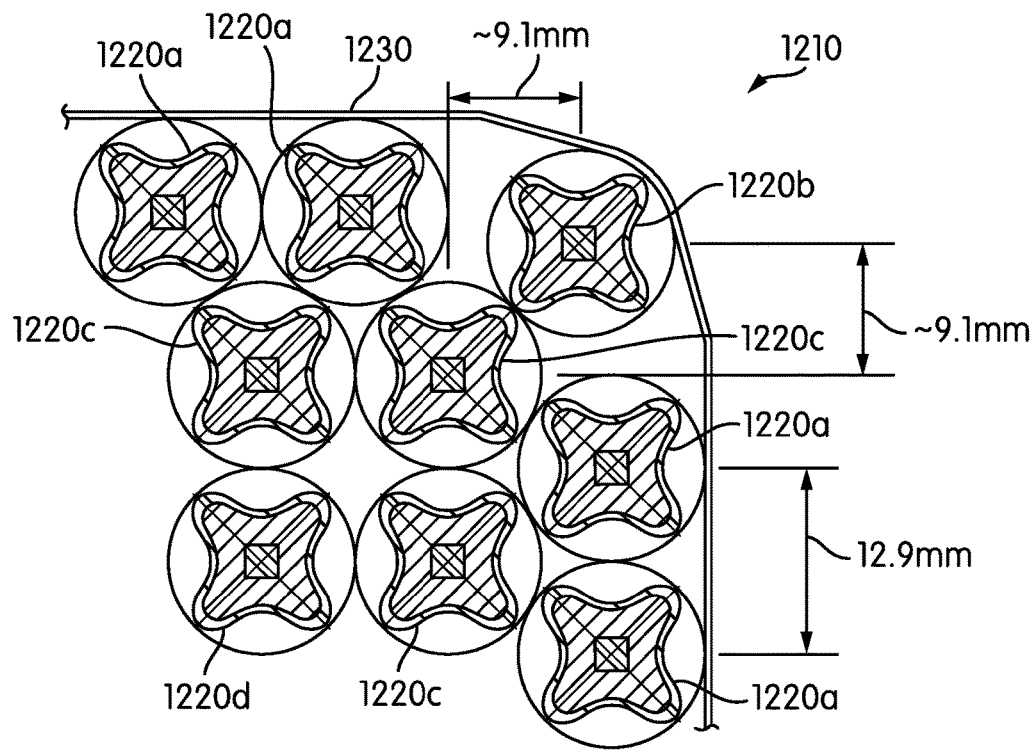

FIGS. 26-30 illustrate a fuel assembly 1210 according to an alternative embodiment. The assembly 1210 comprises a central 14×14 array of fuel elements 1220c, 1220d and guide tubes 1240 that are similar or identical to the position, shape, and structure of the central 14×14 array of fuel elements 1120 and guide tubes 1140 of the assembly 1110. However, the number and positions of the outermost peripheral ring (i.e., in rows 1 and 16 and columns 1 and 16) of fuel elements 1220a in the assembly 1210 differs from that of the assembly 1110. Instead of being arranged in grid positions within a square 16×16 array, the outer peripheral ring of fuel elements 1220, the fuel elements 1220a are arranged so as to form equilateral triangles with the fuel elements 1220c in the same manner as described above for the comparable 17×17 fuel assembly 910. Also as in the assembly 910, as best illustrated in FIG. 30, the assembly 1210 includes corner fuel elements 1220b and a shroud 1230 that are positioned relative to the other fuel elements such that the fuel elements 1220b contact the shroud 1230 at least two different positions (or a continuous arc) and contact a corner one of the fuel elements 1220c so as to provide three contact points to maintain the fuel elements 1220b in their proper positions.

Figure 26:
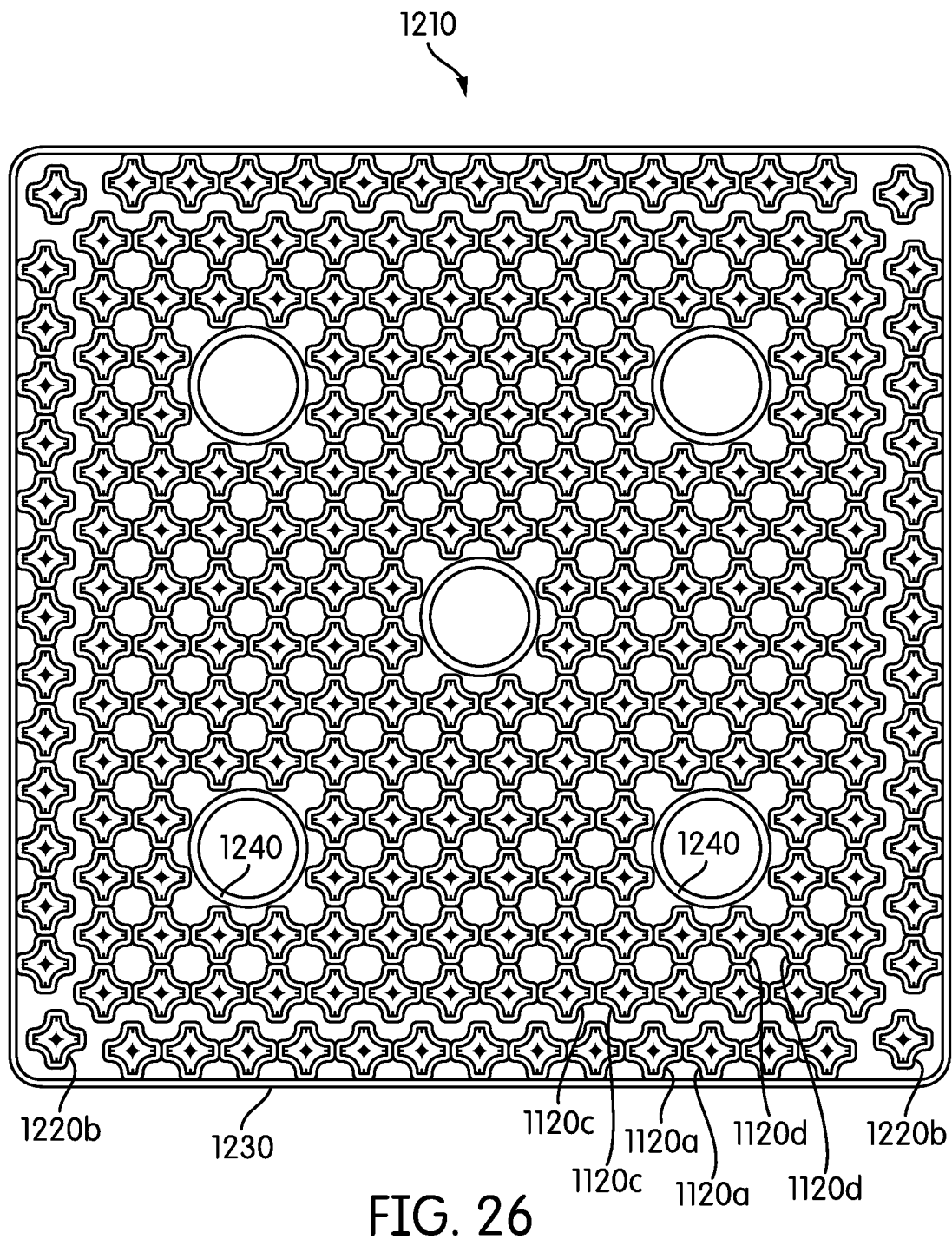
FIG. 26 is a cross-sectional view of a fuel assembly according to an alternative embodiment.

As shown in FIG. 26, each of the fuel elements 1220a, b, c, d may be identical or substantially identical to each other according to various non-limiting embodiments, and may be identical to or substantially identical to the fuel elements 20. As shown in FIG. 26, according to various embodiments, the assembly 1210 comprises 232 fuel elements 1220a,b,c,d.

Figure 27:
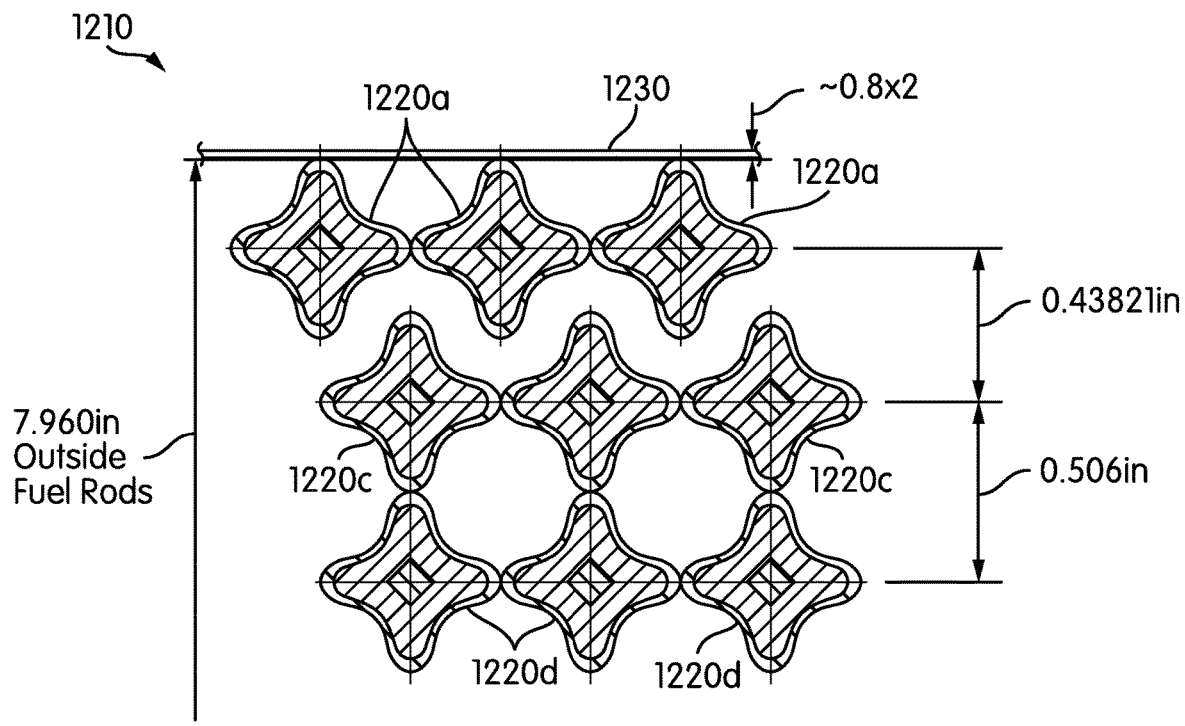
FIGS. 27-30 are partial cross-sectional views of a fuel assembly of FIG. 26.
Figure 28:
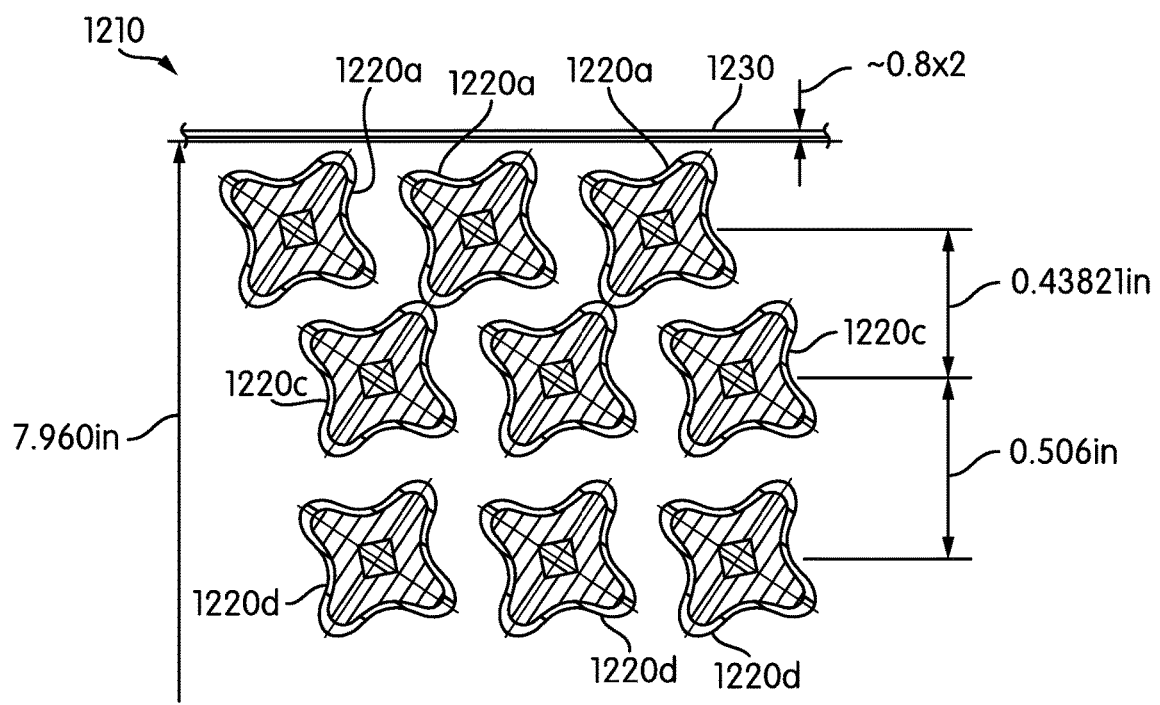
Figure 29:
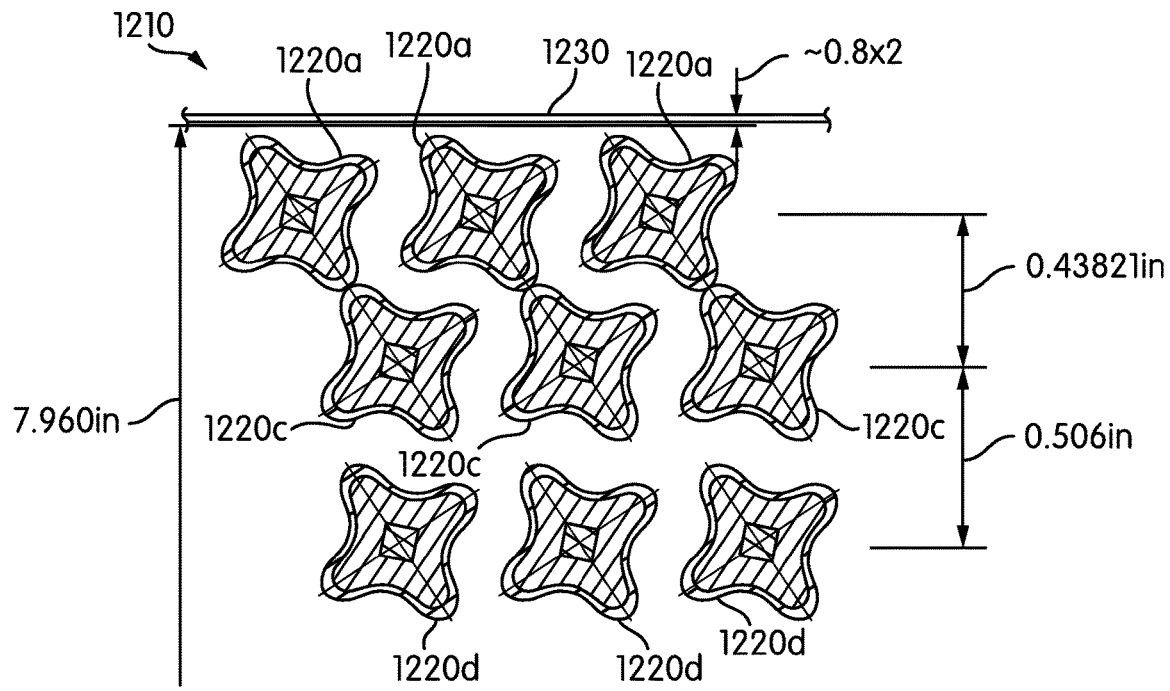

If the cross-sectional plane illustrated in FIG. 27 is considered a home/0° plane, the cross-section illustrated in FIG. 28 corresponds to a cross-sectional plane that is offset from the home/0° plane by 30° of twist in the elements 1220 (i.e., ¹⁄₁₂ of a complete 360° twist of the elements 1220). Similarly, FIG. 29 corresponds to a cross-sectional plane that is offset from the home/0° plane by 60° of twist in the elements 1220 (i.e., ⅙ of a complete 360° twist of the elements 1220). Similarly, FIG. 30 corresponds to a cross-sectional plane that is offset from the home/0° plane by 45° of twist in the elements 1220 (i.e., ⅛ of a complete twist of the elements 1220).

According to various embodiments, the use of a triangular grid along the outer perimeter of the assembly 1210 facilitates the use of (a) a thicker, stronger shroud 1230 than is possible according to various embodiments in which all elements are disposed in a square 16×16 grid/array (e.g., one or more embodiments of the assembly 1110 illustrated in FIG. 22), and/or (b) a larger water gap. According to various embodiments, a thickness of the shroud 1230 is between 0.4 and 4 mm, between 0.4 and 3 mm, between 0.5 and 2.5 mm, between 1 and 2 mm, and/or about 2 mm.

According to various embodiments, all of the fuel elements 1220a,b,c,d of the fuel assembly 1210 are geometrically identical to each other, and may be identical to or substantially identical to the elements 20.

Figure 31:
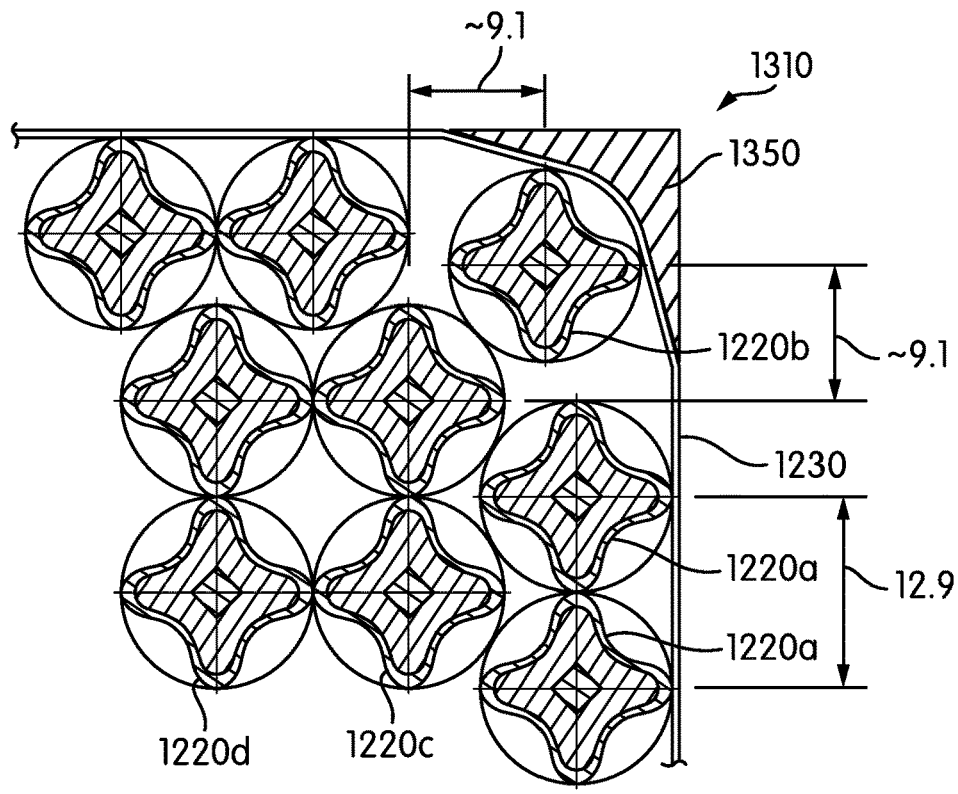
FIGS. 31-36 are partial cross-sectional views of fuel assemblies according to alternative embodiments.

FIG. 31 illustrates a fuel assembly 1310 which is generally identical to the fuel assembly 1210, except that a corner structure 1350 is disposed outside of and attached to the shroud 1230. As shown in FIG. 31, the corner structure 1350 has a cross-sectional shape that generally follows the curved contour of the corner of the shroud 1230 and fits within a square that would be defined by the shroud 1230 if the corners of the shroud 1230 were not curved. According to various embodiments, the corner structure 1350 extends over the full axial length of the fuel assembly 1310 (or a full axial length of the fuel elements 1220 and/or shroud 1230). Alternatively, the corner structure 1350 may be axially shorter than the assembly 1310, shroud 1230, and/or fuel elements 1220 (including fuel elements 1220a, b, c, and d). The corner structure 1350 may retain the cross-sectional shape illustrated in FIG. 31 over its full axial length, or the cross-sectional shape may vary over the axial length of the corner structure 1350.

Use of the corner structure 1350 may enable the fuel assembly 1310 to take advantage of the available space disposed outside of the shroud 1230.

Figure 32:
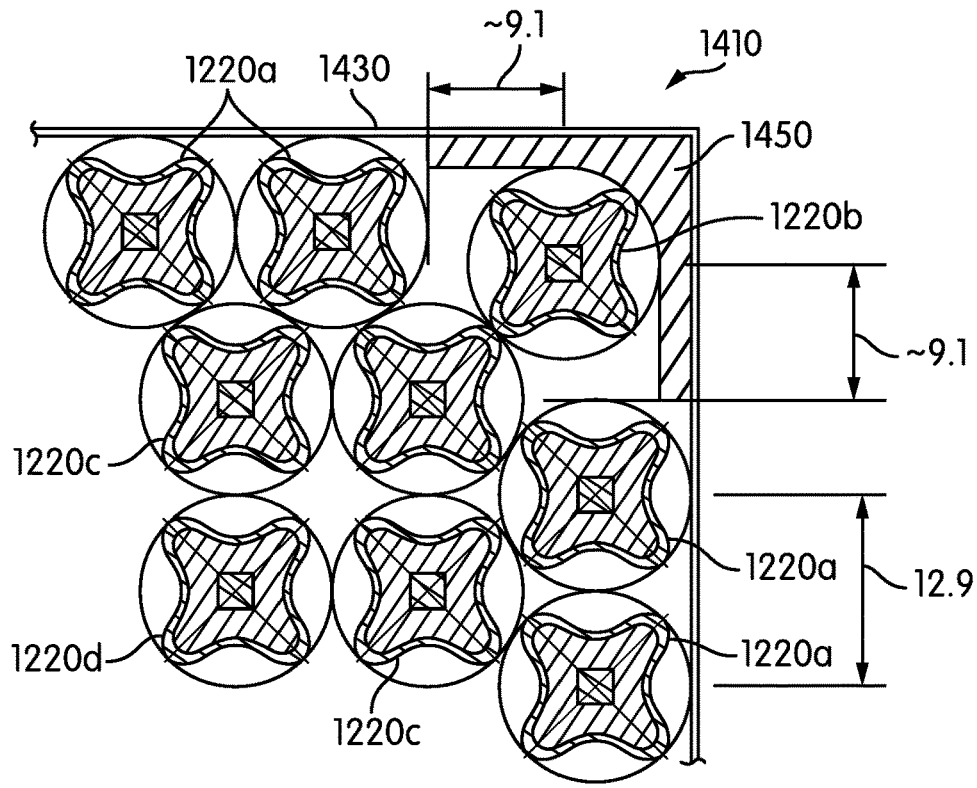

FIG. 32 illustrates a fuel assembly 1410 that is substantially similar to the fuel assembly 1310, except that a corner structure 1450 of the assembly 1410 is disposed inside of a shroud 1430 of the assembly 1410, as opposed to outside of the shroud 1230 as is shown with respect to the assembly 1310. The corner structure 1450 is attached to the inner corner of the shroud 1430. The shroud 1430 is generally similar to the shroud 1230, except that the corners of the shroud 1430 are sharper (i.e., less curved/chamfered) than in the shroud 1230.

As shown in FIG. 32, an inner contour of the corner structure 1450 is partially-cylindrical so as to abut the fuel element 1220b at multiple places (or continuously over an arc defined by the partial cylinder). According to various embodiments, the partial cylinder shape covers about a 90 degree arc and has a radius that matches the radius of the fuel element 1220b so as to maintain the fuel element 1220b in its correct position.

Use of the corner structure 1450 enables the fuel assembly 1310 to take advantage of the available space disposed inside one or more of the corners of the shroud 1430.

Figure 33:
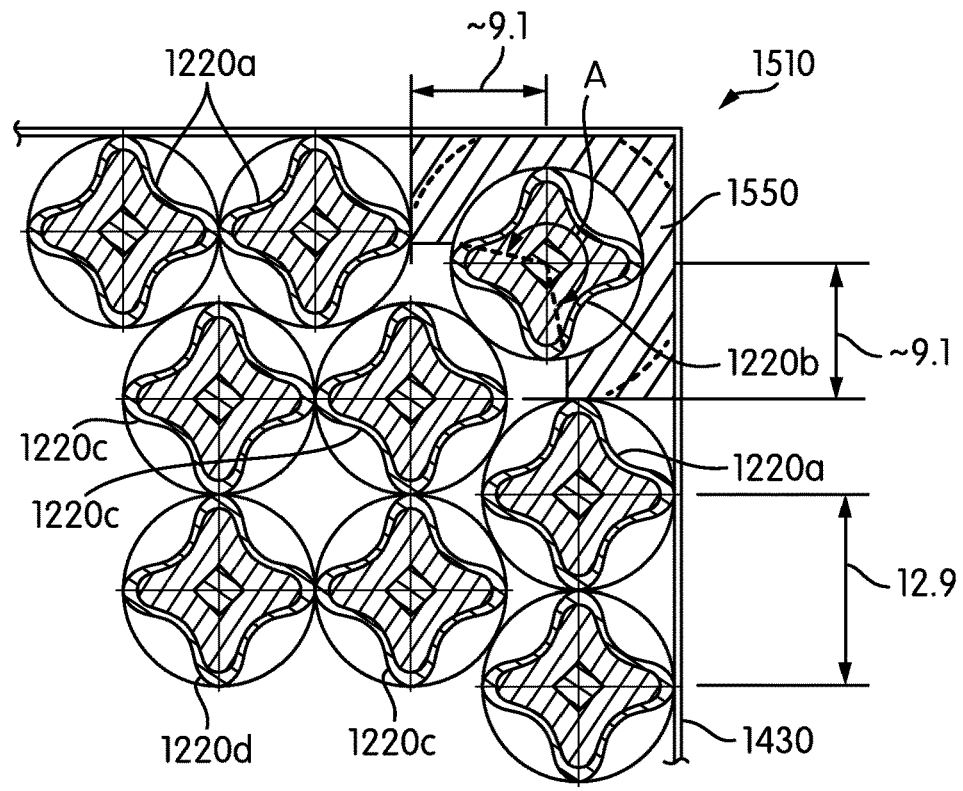

FIG. 33 illustrates a fuel assembly 1510 that is substantially similar to the fuel assembly 1410, except that a partially-cylindrical inner surface a corner structure 1550 of the assembly 1410 extends over a larger arc A than the corner structure 1450 of the assembly 1410. According to various embodiments, the arc A is between 90° and 310° degrees, between 120° and 310° degrees, between 150° and 310° degrees, between 180° and 310° degrees, and/or about 270°. As shown in FIG. 33, according to various embodiments, the corner structure 1450 also abuts the adjacent fuel elements 1220a so as to maintain the fuel elements 1220a in their correct positions.

Use of the corner structure 1550 may enable the fuel assembly 1510 to take advantage of the available space disposed inside one or more of the corners of the shroud 1430.

Figure 34:
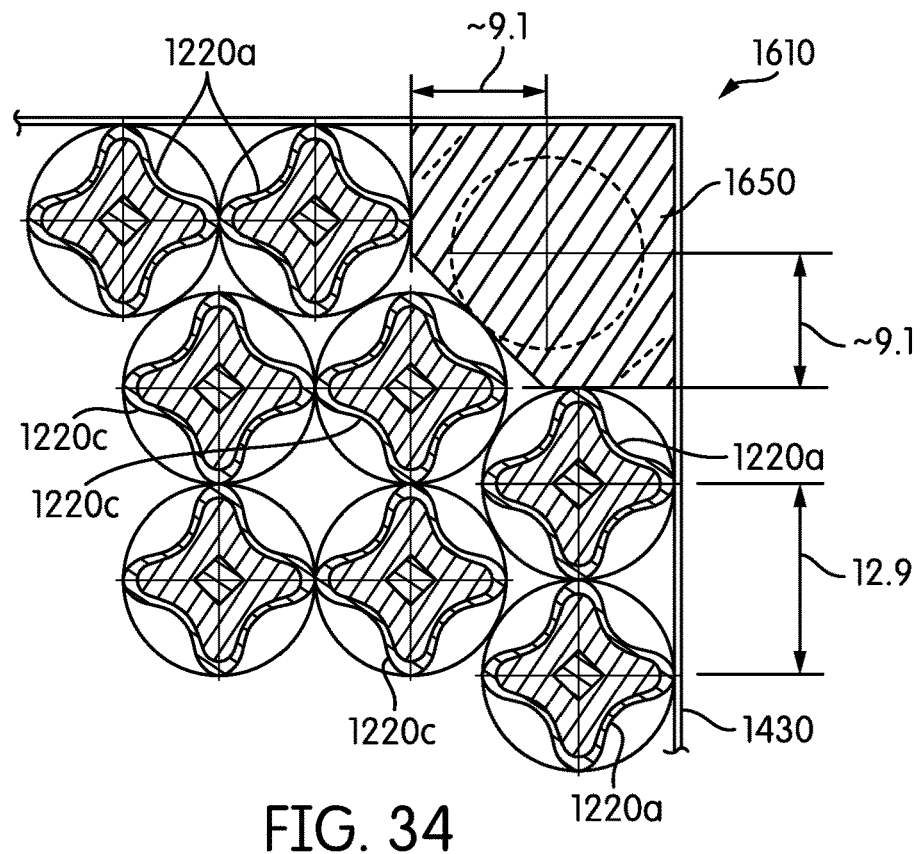

FIG. 34 illustrates a fuel assembly 1610 that is substantially similar to the fuel assembly 1510, except that corner fuel elements in the outer perimeter are omitted entirely (e.g., the fuel element 1220b present in the assembly 1510 is omitted), and the corner structure 1650 is expanded to take up the space that would otherwise be taken by such a corner fuel element 1220b. As shown in FIG. 34, the corner structure 1650 abuts two adjacent fuel elements 1220a and the adjacent fuel element 1220c to maintain these three elements 1220a, c in their correct positions.

Use of the corner structure 1650 may enable the fuel assembly 1610 to take advantage of the available space disposed inside one or more of the corners of the shroud 1430.

Figure 35:
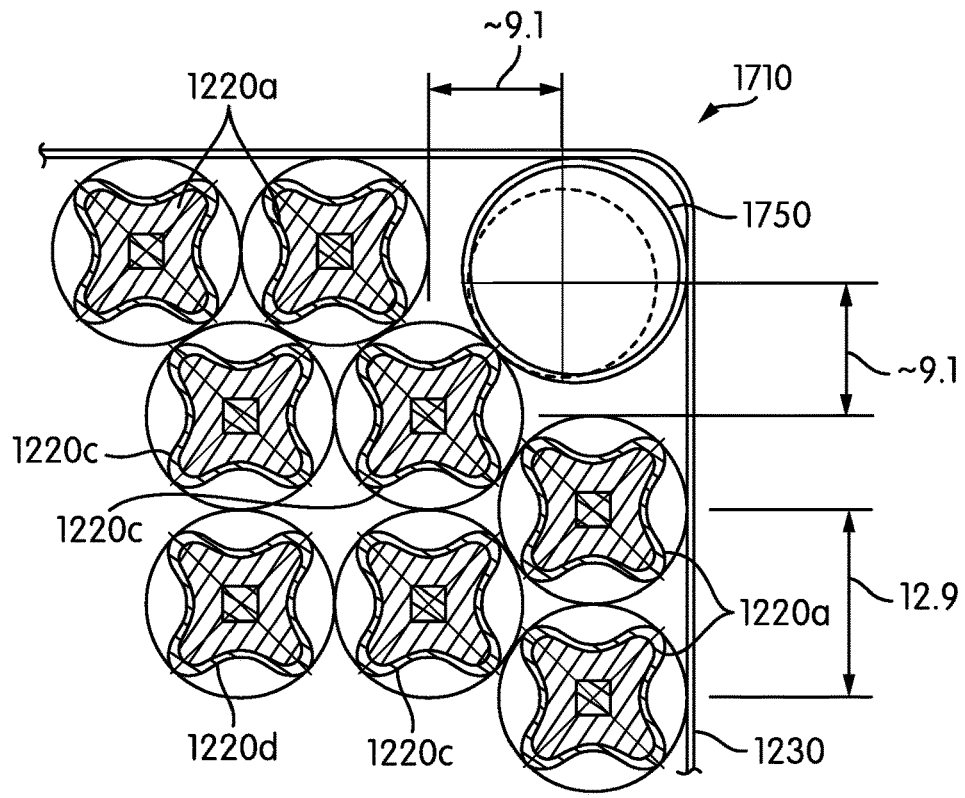

FIG. 35 illustrates a fuel assembly 1710 that is substantially similar to the fuel assembly 1210, except that the corner fuel element 1220b of the assembly 1210 is replaced with a corner structure 1750. According to various embodiments, the structure 1750 is tubular and has a diameter (e.g., 15 mm) that causes it to abut multiple points on the shroud 1230 and the corner fuel element 1220c to keep the corner fuel element 1220c in its correct position. The corner structure 1750 may comprise a tube that is helically wrapped with material such a wire that is attached to the tube (e.g., via welding) so that the corner structure maintains the adjacent fuel elements in their correct position in the same or similar way that the spiral twists of adjacent fuel elements do so, as discussed above.

Use of the corner structure 1750 may enable the fuel assembly 1710 to take advantage of the available space disposed inside one or more of the corners of the shroud 1230.

Figure 36:
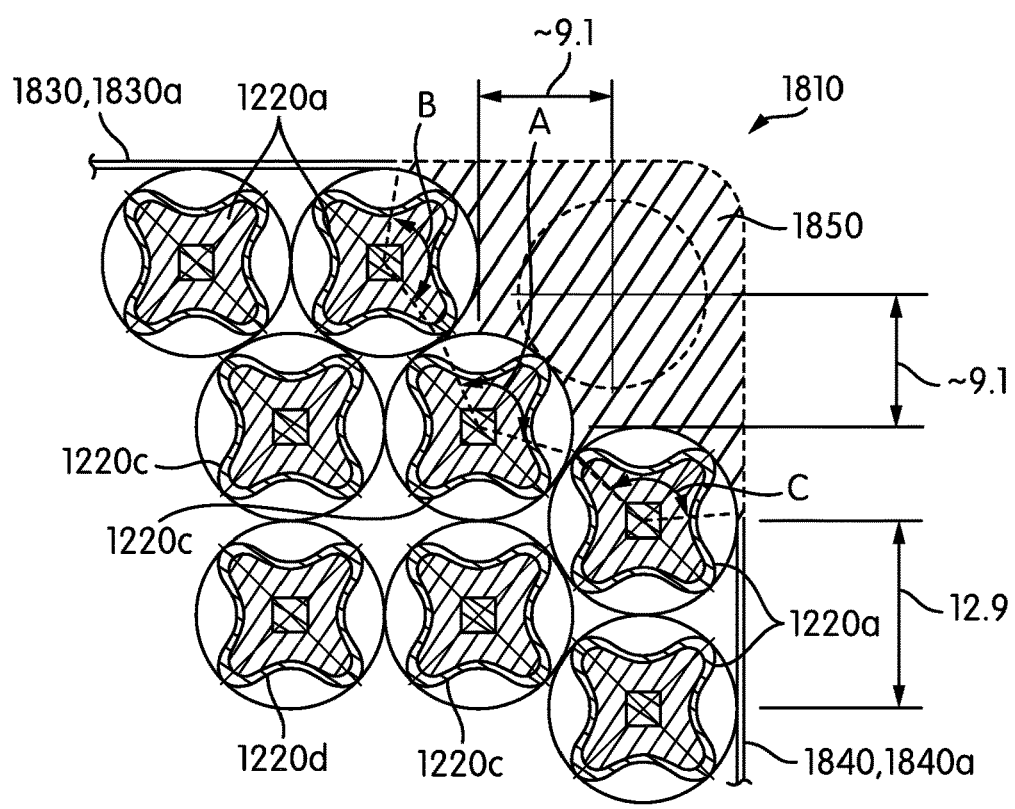

FIG. 36 illustrates a fuel assembly 1810 that is substantially similar to the fuel assembly 1610, except that the corner structure 1850 has three concave, partially-cylindrically shaped surfaces, one abutting each of the adjacent fuel elements 1220a and adjacent corner fuel element 1220c. A radius and position of the three concave, partially-cylindrically shaped surfaces matches the radii and positions of the mating fuel elements 1220a, 1220c such that the corner structure 1810 abuts the fuel elements 1220a, 1220c over extended arcs A, B, C. The extended arcs A, B, C of contact maintain the abutting fuel elements 1220a, 1220c in their correct positions.

As shown in FIG. 36, the corner structure 1850 may define a corner of the shroud 1830. For example, the shroud 1830 may comprise plates 1830a whose ends connect to the corner structures 1850. Alternatively, the shroud 1830 may be similar to or identical to the shroud 1230, and the corner structure 1850 may be disposed inside of and mounted to the shroud 1830.

Use of the corner structure 1850 may enable the fuel assembly 1810 to take advantage of the available space disposed inside one or more of the corners of the assembly 1810.

According to various embodiments, a corner structure 1350, 1450, 1550, 1650, 1750, 1850 is disposed at each of the four corners of the fuel assembly 1310, 1410, 1510, 1610, 1710, 1810. However, according to alternative embodiments, the corner structure 1350, 1450, 1550, 1650, 1750, 1850 may be disposed at just 1, 2, and/or 3 of the 4 corners of the assembly 1310, 1410, 1510, 1610, 1710, 1810.

According to various embodiments, the corner structure 1350, 1450, 1550, 1650, 1750, 1850 may comprise one or more of a burnable poison, steel, alloys or ceramics of zirconium, and/or uranium, and/or plutonium, and/or thorium and/or none of these materials. According to various embodiments, the corner structure 1350, 1450, 1550, 1650, 1750, 1850 may be solid. According to various embodiments, the corner structure 1350, 1450, 1550, 1650, 1750, 1850 may comprise a hollow structure (e.g., made of tubular steel and/or zirconium metals or alloys) that may be (1) open-ended and empty to permit flow therethrough, (2) closed-ended and empty, and/or (3) closed-ended and partially or fully filled with material (e.g., oxide fuel, burnable poison, etc. in pellet or other form)).

Although the corner structures 1350, 1450, 1550, 1650, 1750, 1850 and associated shrouds 1230, 1430, 1830 are illustrated with respect to fuel assemblies 1310, 1410, 1510, 1610, 1710, 1810 that are designed for use in place of conventional 16×16 fuel assemblies, such corner structures 1350, 1450, 1550, 1650, 1750, 1850 and associated shroud configurations could alternatively be applied to the above-discussed fuel assemblies 910, 1010 that are designed for use in place of conventional 17×17 fuel assemblies without deviating from the scope of the present invention.

Figure 37:
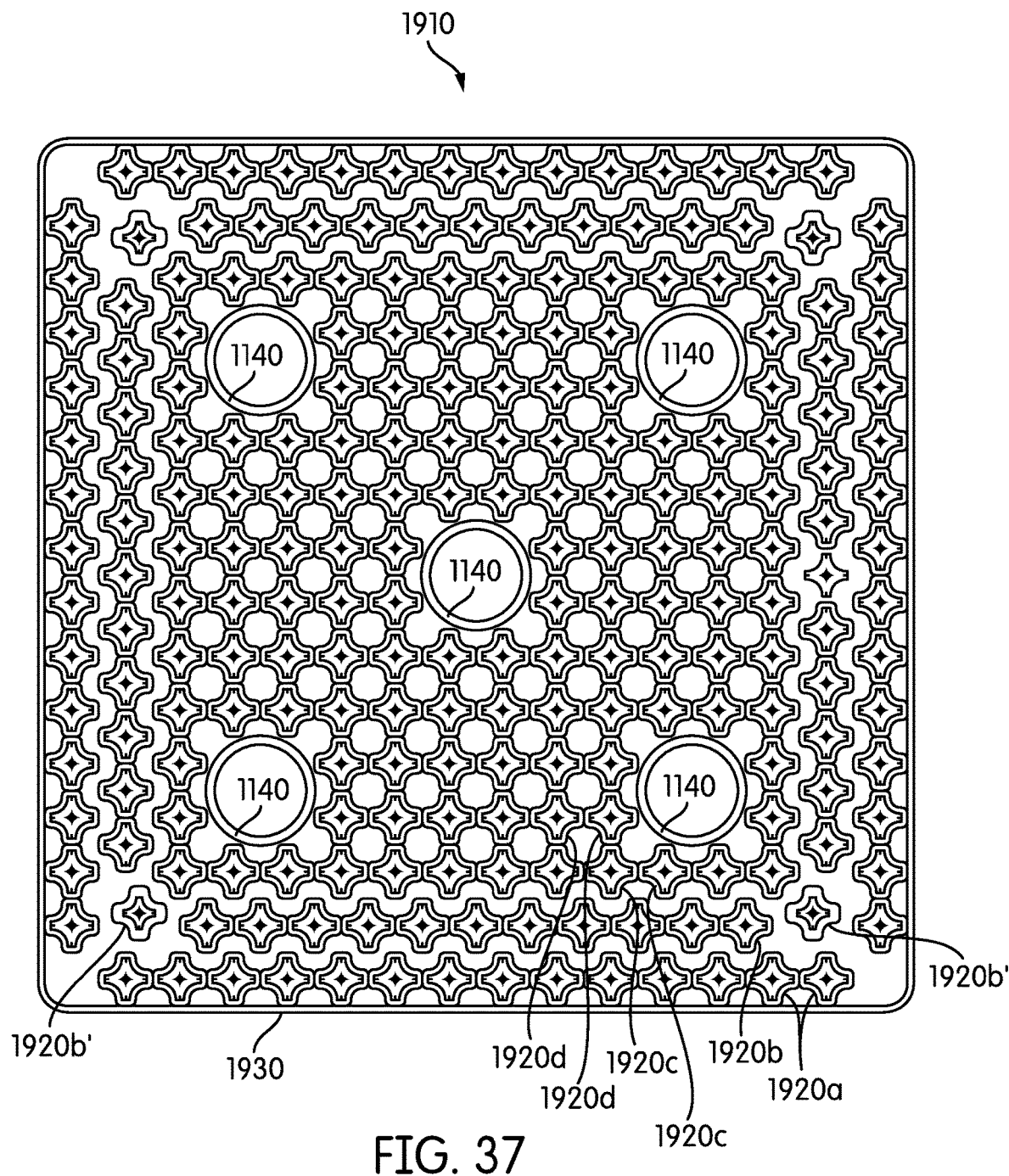
FIG. 37 is a cross-sectional view of a fuel assembly according to an alternative embodiment.

FIG. 37 illustrates a fuel assembly 1910 that is substantially similar to the fuel assembly 1210, except that both the outermost ring of fuel elements 1920*a* and the second outermost ring of fuel elements 1920*b* (rather than just the outer ring as in the assembly 1210) are shifted inwardly into an equilateral triangle grid array with the third outermost ring of elements 1920*c*. The third outermost ring of elements 1920*c* and the central 10×10 array of elements 1920*d* (collectively a central 12×12 array of elements 1920*c*, 1920*d*) are arranged in a square grid/array.

As shown in FIG. 37, fuel elements are omitted from the corners of the outermost ring of fuel elements 1920*a* (i.e., omitting four fuel elements relative to the number of fuel elements in an assembly in which each grid position within the outermost ring is occupied by a fuel element (e.g., as illustrated in FIG. 22 with respect to assembly 1110). Four fuel elements are similarly omitted from the second outermost ring of elements 1920*b* relative to the number of fuel elements in an assembly in which each grid position within the second outermost ring is occupied by a fuel element (e.g., as illustrated in FIG. 22 with respect to assembly 1110). A remaining fuel element 1920*b*' of the second outermost ring of fuel elements 1920*b* is disposed at each of the corners of the second outermost ring of fuel elements 1920*b*.

According to various embodiments, spacers and/or corner structures may be added to help maintain the correct positions of the fuel elements 1920*a* that are adjacent to the corners and the fuel elements 1920*b*'.

According to various embodiments, use of the equilateral triangle spacing in two outer rings of elements (as opposed to just one ring as in the assembly of FIG. 26) provides additional space within the envelope available for the fuel assembly 1910. Such space may be used, for example, for a thicker shroud 1930 or a larger water gap.

According to various embodiments, all of the fuel elements 1920*a*, 1920*b*, 1920*b*', 1920*c*, 1920*d* of the fuel assembly 1910 are geometrically identical to each other, and may be identical to or substantially identical to the elements 20. As shown in FIG. 37, according to various embodiments, the assembly 1910 comprises 228 fuel elements 1920*a,b,b',c,d*.

Figure 38:
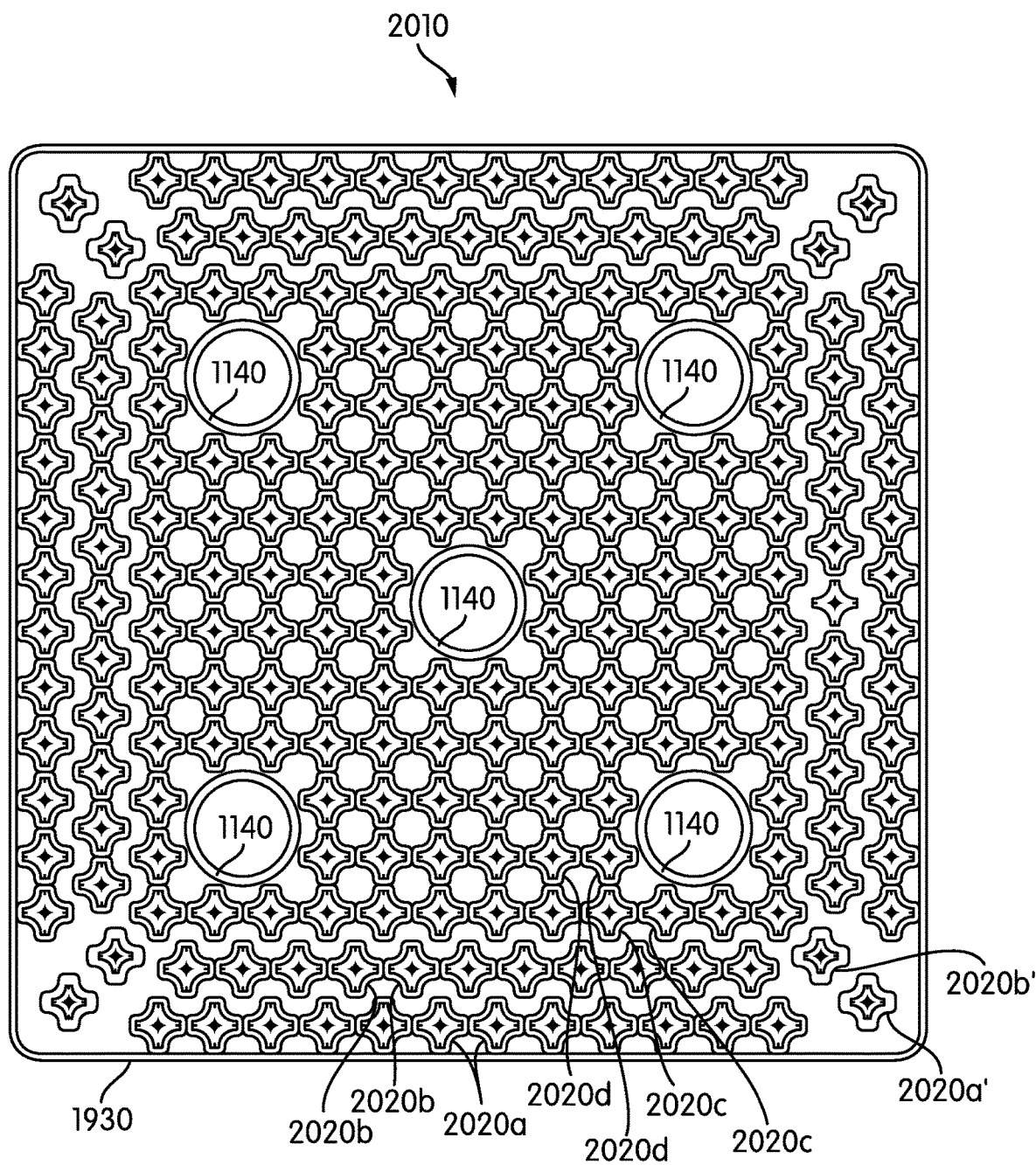
FIG. 38 is a cross-sectional view of a fuel assembly according to an alternative embodiment.
Figure 40:
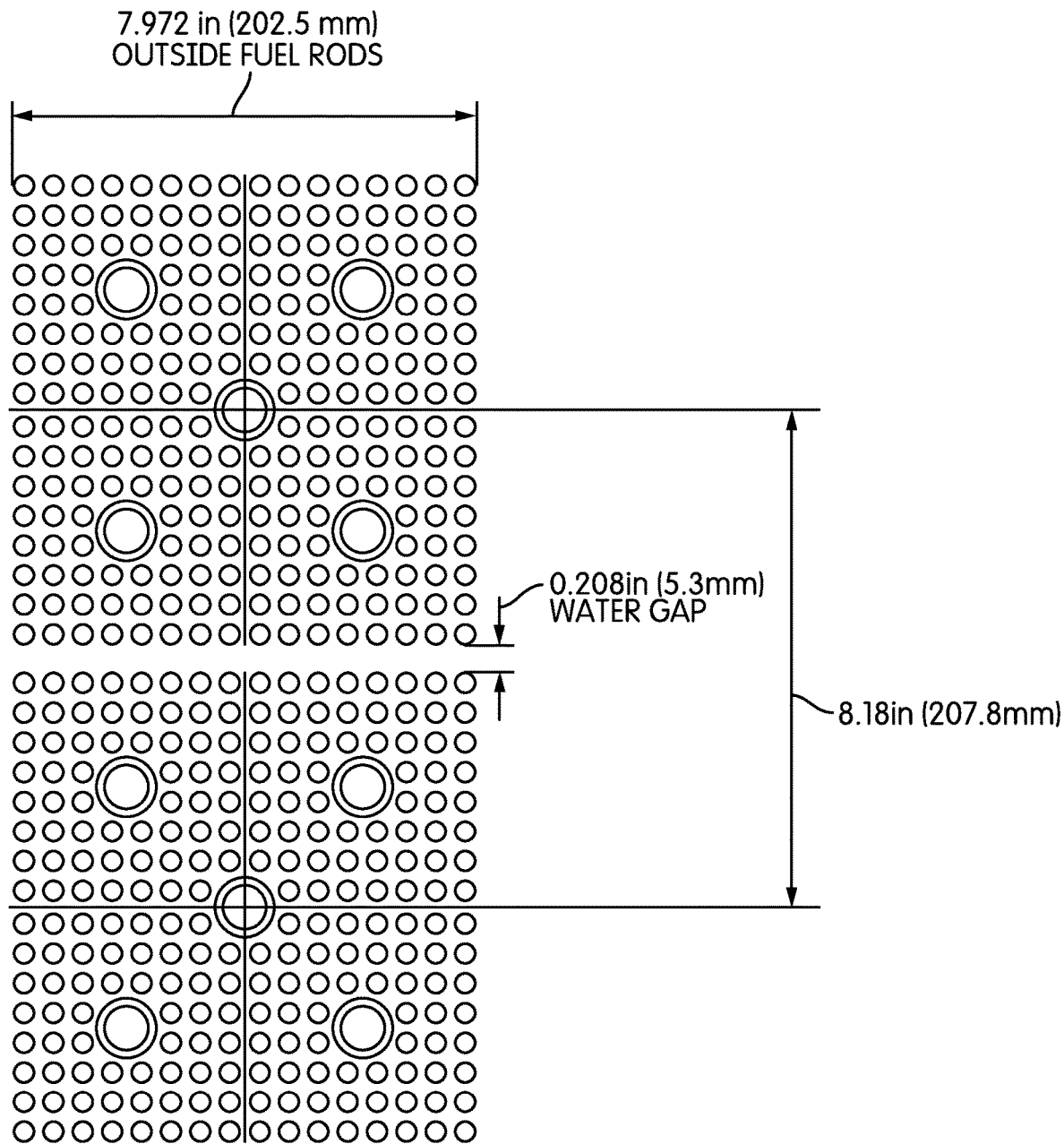

FIG. 38 illustrates a fuel assembly 2010 that is substantially similar to the fuel assembly 1910, except that a single corner fuel element 2020*a*' is used in the outermost ring of elements 2020*a*, instead of the two fuel elements 1920*a* that are disposed adjacent to the corner in the assembly 1910 illustrated in FIG. 37. As a result, the fuel assembly 2010 has four fewer fuel elements than are present in the fuel assembly 1910. As shown in FIG. 38, according to various embodiments, the assembly 2010 comprises 224 fuel elements 2020*a,a',b, b',c,d*.

According to various embodiments, all of the fuel elements 2020*a*, 2020*a*', 2020*b*, 2020*b*', 2020*c*, 2020*d* of the fuel assembly 2010 are geometrically identical to each other, and may be identical to or substantially identical to the elements 20.

While various dimensions are illustrated in various of the figures, it should be understood that such dimensions are exemplary only, and do not limit the scope of the invention. Rather, these dimensions may be modified in a variety of ways (larger or smaller, or qualitatively different) without deviating from the scope of the invention.

The fuel assemblies 10, 510, 610, 710, 910, 1010, 1110, 1210, 1310, 1410, 1510, 1610, 1710, 1810, 1910, 2010 are preferably thermodynamically designed for and physically shaped for use in a land-based nuclear power reactor 90, 500 (e.g., land-based LWRS (including BWRs and PWRs), land-based fast reactors, land-based heavy water reactors) that is designed to generate electricity and/or heat that is used for a purpose other than electricity (e.g., desalinization, chemical processing, steam generation, etc.). Such land-based nuclear power reactors 90 include, among others, VVER, AP-1000, EPR, APR-1400, ABWR, BWR-6, CANDU, BN-600, BN-800, Toshiba 4S, Monju, CE, etc. However, according to alternative embodiments of the present invention, the fuel assemblies 10, 510, 610, 710, 910, 1010, 1110, 1210, 1310, 1410, 1510, 1610, 1710, 1810, 1910, 2010 may be designed for use in and used in marine-based nuclear reactors (e.g., ship or submarine power plants; floating power plants designed to generate power (e.g., electricity) for onshore use) or other nuclear reactor applications.

The fuel assemblies 10, 510, 610, 710, 910, 1010, 1110, 1210, 1310, 1410, 1510, 1610, 1710, 1810, 1910, 2010 and the associated reactor cores are designed and configured so that the fuel assemblies 10, 510, 610, 710, 910, 1010, 1110, 1210, 1310, 1410, 1510, 1610, 1710, 1810, 1910, 2010 are disposed directly adjacent to other fuel assemblies having matching geometric envelopes (e.g., a plurality of directly adjacent fuel assemblies 10, 510, 610, 710, 910, 1010, 1110, 1210, 1310, 1410, 1510, 1610, 1710, 1810, 1910, 2010). According to various embodiments, a plurality of fuel assemblies 10, 510, 610, 710, 910, 1010, 1110, 1210, 1310, 1410, 1510, 1610, 1710, 1810, 1910, 2010 are disposed adjacent to each other in the fuel assembly grid pattern defined by the reactor core (e.g., in a square pattern for a reactor core designed to accept square fuel assemblies (e.g., AP-1000, CE), in a triangular/hexagonal pattern for a reactor core designed to accept hexagonal fuel assemblies (e.g., VVER)).

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A fuel assembly for use in a core of a nuclear power reactor, the assembly comprising:
    a frame comprising a lower nozzle that is shaped and configured to mount to an internal core structure of the nuclear power reactor; and
    a plurality of elongated, extruded fuel elements supported by the frame, each of said plurality of fuel elements comprising:
        a fuel kernel comprising fuel material disposed in a matrix of metal non-fuel material, the fuel material comprising fissile material, and
        a cladding surrounding the fuel kernel;
    wherein each of the fuel elements has a multi-lobed profile that forms spiral ribs,
    wherein the plurality of fuel elements provide all of the fissile material of the fuel assembly,
    wherein each of the plurality of fuel elements is disposed in a different grid position of a grid pattern defined by the frame such that a subset of the plurality of fuel elements are disposed along an outer perimeter of the grid pattern,
    wherein the cladding at a tip of at least one spiral rib of at least one outer side of the cladding on at least some of the fuel elements disposed along an outer perimeter of the grid pattern is thinner than the cladding at other tips of the same fuel element.

2. The fuel assembly of claim 1, wherein:
    the frame comprises a shroud such that all of the plurality of fuel elements are disposed inside the shroud, and
        the laterally shortened outer sides of the cladding contact the shroud.

3. The fuel assembly of claim 1, wherein, in a cross section of the fuel assembly that is perpendicular to an axial direction of the fuel elements, an area of each of the fuel kernels of the at least some of the fuel elements disposed along an outer perimeter of the grid pattern is smaller than an area of at least one of the fuel kernels of in a remainder of the plurality of fuel elements.

4. The fuel assembly of claim 1, wherein the fuel material comprises ceramic fuel material disposed in the matrix of metal non-fuel material.

5. The fuel assembly of claim 1, wherein the cladding is at least 0.4 mm thick throughout each of the plurality of fuel elements.

6. The fuel assembly of claim 1, wherein:
    the fuel assembly is thermodynamically designed and physically shaped for operation in a conventional land-based nuclear power reactor of a conventional nuclear power plant having a reactor design that was in actual use before 2013; and
    the frame is shaped and configured to fit into the land-based nuclear power reactor in place of a conventional uranium oxide fuel assembly for said reactor.

7. The fuel assembly of claim 1, wherein the spiral ribs of adjacent ones of the plurality of fuel elements periodically contact each other over the axial length of the fuel elements, such contact helping to maintain the spacing of the fuel elements relative to each other.

8. The assembly of claim 1, wherein a portion of the fuel assembly that supports the subset of the elongated fuel elements is inseparable from a portion of the fuel assembly that supports the rest of the plurality of fuel elements.

9. The fuel assembly of claim 1, wherein:
    the grid pattern defines a 17×17 pattern of grid positions; and
    guide tubes occupy grid positions at row, column positions: 3,6; 3,9; 3,12; 4,4; 4;14; 6,3; 6,15; 9,3; 9,15; 12,3; 12,15; 14,4; 14,14; 15,6; 15,9; and 15,12.

10. A fuel assembly for use in a core of a nuclear power reactor, the assembly comprising:
    a frame comprising a lower nozzle that is shaped and configured to mount to an internal core structure of the nuclear power reactor; and
    a plurality of elongated, extruded fuel elements supported by the frame, each of said plurality of fuel elements comprising:
        a fuel kernel comprising fuel material disposed in a matrix of metal non-fuel material, the fuel material comprising fissile material, and
        a cladding surrounding the fuel kernel;
    wherein each of the fuel elements has a multi-lobed profile that forms spiral ribs,
    wherein the plurality of fuel elements provide all of the fissile material of the fuel assembly,
    wherein each of the plurality of fuel elements is disposed in a different grid position of a grid pattern defined by the frame such that a subset of the plurality of fuel elements are disposed along an outer perimeter of the grid pattern,
    wherein the cladding at a tip of at least one spiral rib of at least one outer side of the cladding on at least some of the fuel elements disposed along an outer perimeter of the grid pattern is thinner than the cladding at other tips of the same fuel element,
    wherein at least some of the plurality of fuel elements are separated from adjacent fuel elements by a common centerline-to-centerline distance, and
    wherein a circumscribed diameter of the at least some of the plurality of fuel elements equals the centerline-to-centerline distance.

* * * * *